United States Patent
Yoo et al.

(10) Patent No.: US 11,979,552 B2
(45) Date of Patent: *May 7, 2024

(54) IMAGE CODING METHOD AND DEVICE USING TRANSFORM SKIP FLAG

(71) Applicant: Rosedale Dynamics LLC, Wilmington, DE (US)

(72) Inventors: Sunmi Yoo, Seoul (KR); Jungah Choi, Seoul (KR); Jangwon Choi, Seoul (KR); Seunghwan Kim, Seoul (KR)

(73) Assignee: Rosedale Dynamics LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,441

(22) Filed: May 15, 2023

(65) Prior Publication Data

US 2023/0370580 A1    Nov. 16, 2023

Related U.S. Application Data

(63) Continuation of application No. 17/669,044, filed on Feb. 10, 2022, now Pat. No. 11,695,917, which is a
(Continued)

(51) Int. Cl.
*H04N 19/103* (2014.01)
*H04N 19/176* (2014.01)
*H04N 19/61* (2014.01)

(52) U.S. Cl.
CPC ......... *H04N 19/103* (2014.11); *H04N 19/176* (2014.11); *H04N 19/61* (2014.11)

(58) Field of Classification Search
CPC .............................. H04N 19/103; H04N 19/61
See application file for complete search history.

(56) References Cited

U.S. PATENT DOCUMENTS

| 10,917,637 B2 | 2/2021 | Yoo et al. |
| 11,297,310 B2 | 4/2022 | Yoo et al. |

(Continued)

FOREIGN PATENT DOCUMENTS

| AU | 2017261992 | 11/2018 |
| CN | 104041048 | 9/2014 |

(Continued)

OTHER PUBLICATIONS

Bross et al., "Non-CE8: Unified Transform Type Signaling and Residual Coding for Transform Skip," Joint Video Experts Team (JVET), 13th Meeting: Marrakech, MA, JVET-M0464-v3, Jan. 9-18, 2019, 13 pages.

(Continued)

*Primary Examiner* — Jerry T Jean Baptiste
(74) *Attorney, Agent, or Firm* — Fish & Richardson P.C.

(57) ABSTRACT

A method for decoding an image according to the present document includes obtaining prediction mode information and residual related information from a bitstream, deriving prediction samples of a current block by performing prediction based on the prediction mode information, deriving residual samples of the current block based on the residual related information, and generating reconstruction samples of the current block based on the prediction samples and the residual samples, and the residual related information includes a transform skip flag based on a size of the current block and a maximum transform skip size, the transform skip flag represents whether a transform skip is applied to the current block, and information about the maximum transform skip size is obtained from the bitstream.

12 Claims, 21 Drawing Sheets

Related U.S. Application Data continuation of application No. 17/138,494, filed on Dec. 30, 2020, now Pat. No. 11,297,310, which is a continuation of application No. 16/852,735, filed on Apr. 20, 2020, now Pat. No. 10,917,637, which is a continuation of application No. PCT/KR2020/000757, filed on Jan. 15, 2020.

(60) Provisional application No. 62/792,423, filed on Jan. 15, 2019.

(56) References Cited

U.S. PATENT DOCUMENTS

| | | | |
|---|---|---|---|
| 11,695,917 | B2 | 7/2023 | Yoo et al. |
| 2014/0023138 | A1 | 1/2014 | Chen |
| 2014/0241641 | A1 | 8/2014 | Jeon et al. |
| 2015/0139305 | A1* | 5/2015 | Sato ............... H04N 19/12 375/240.03 |
| 2015/0334396 | A1 | 11/2015 | Lim et al. |
| 2016/0227244 | A1 | 8/2016 | Rosewarne |
| 2016/0269730 | A1* | 9/2016 | Jeon ............... H04N 19/127 |
| 2019/0104322 | A1* | 4/2019 | Tsukuba ............... H04N 19/517 |
| 2019/0281298 | A1 | 9/2019 | Ohkawa et al. |
| 2020/0260070 | A1 | 8/2020 | Yoo et al. |
| 2021/0120231 | A1 | 4/2021 | Yoo et al. |
| 2022/0174269 | A1 | 6/2022 | Yoo et al. |

FOREIGN PATENT DOCUMENTS

| | | |
|---|---|---|
| CN | 104380734 | 2/2015 |
| CN | 104488270 | 4/2015 |
| CN | 105684442 | 6/2015 |
| CN | 109076222 | 12/2018 |
| JP | 2015504289 | 2/2015 |
| JP | 6143866 | 6/2017 |
| KR | 101462637 | 11/2014 |
| KR | 1020150034131 | 4/2015 |
| KR | 1020150143585 | 12/2015 |
| WO | WO 2017195476 | 11/2017 |
| WO | WO 2018123322 | 7/2018 |
| WO | WO 2018128322 | 7/2018 |

OTHER PUBLICATIONS

Egilmez et al., Joint Video Experts Team (JVET) of ITU-T SG 16 WP 3 and ISO/IEC JTC1/SC29/WG11, 13th Meeting; Marrakesh, MA Jan. 9-18, 2019, Qualcomm Incorporated, "CE6: MTS support for large rectangular blocks," JVETM0522-v2, (10 pages).

EP Extended European Search Report in European Appln. No. 20719552.0, dated Jul. 29, 2020, 8 pages.

International Preliminary Report on Patentability in International Appln. No. PCT/KR2020/000757, dated Jul. 29, 2021, 11 pages (with Machine Translation).

International Search Report and Written Opinion in International Appln. No. PCT/KR2020/000757, dated Apr. 22, 2020, 15 pages (with Machine Translation).

K. Sharman et al., "Transform Skip and Scaling Lists," Joint Collaborative Team on Video Coding (JCT-VG) of ITU-T SG 16 WP 3 and ISO/IEC JTC 1/SC 29/WG 11, Oct. 23-Nov. 1, 2013, JCTVC-O0067.

MideaTek Inc., "AHG9: Signaling lossless slices," Joint Collaborative Team on Video Coding (JCT-VC) of ITU-T SG 16 WP3 and ISO/IEC JTC 1/SC 29/WG 11, Oct. 23-Nov. 1, 2013, JCTVC-O0228.

ITU-T: Telecommunication Standardization Sector of ITU-Series H: Audiovisual and Multimedia Systems, Infrastructure of audiovisual services—Coding of Moving Video, High efficiency video coding, Oct. 2014, (p. 82).

* cited by examiner

FIG. 18

Table 48

Coding unit semantics

The following assignments are made for x = x0..x0 + cbWidth − 1 and y = y0..y0 + cbHeight − 1:

CbPosX[ x ][ y ] = x0

CbPosY[ x ][ y ] = y0

CbWidth[ x ][ y ] = cbWidth

CbHeight[ x ][ y ] = cbHeight cu_skip_flag[ x0 ][ y0 ] equal to 1 specifies that for the current coding unit, when decoding a P or B tile group, no more syntax elements except one or more of the following are parsed after cu_skip_flag[ x0 ][ y0 ]: the merge plus MVD flag mmvd_flag[ x0 ][ y0 ], the merge plus MVD index mmvd_merge_flag[ x0 ][ y0 ], the merge plus MVD distance index mmvd_distance_idx[ x0 ][ y0 ], the merge plus MVD direction index mmvd_direction_idx[ x0 ][ y0 ], the merging candidate index merge_idx[ x0 ][ y0 ] the subblock-based merge flag merge_subblock_flag[ x0 ][ y0 ], the subblock-based merging candidate index merge_subblock_idx[ x0 ][ y0 ], the merge triangle flag merge_triangle_flag[ x0 ][ y0 ], and the merge triangle index merge_triangle_index[ x0 ][ y0 ]. cu_skip_flag[ x0 ][ y0 ] equal to 0 specifies that the coding unit is not skipped. The array indices x0, y0 specify the location ( x0, y0 ) of the top-left luma sample of the considered coding block relative to the top-left luma sample of the picture.

When cu_skip_flag[ x0 ][ y0 ] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:

– If pred_mode_flag is equal to 0, CuPredMode[ x ][ y ] is set equal to MODE_INTER.

Otherwise (pred_mode_flag is equal to 1), CuPredMode[ x ][ y ] is set equal to MODE_INTRA.

When pred_mode_flag is not present, the variable CuPredMode[ x ][ y ] is inferred to be equal to MODE_INTRA for x = x0..x0 + cbWidth − 1 and y = y0..y0 + cbHeight − 1.

The variable MaxMtsIdx is derived as specified in the following Table.

Table – Specification of MaxMtsIdx.

| MaxMtsIdx | CuPredMode[ x0 ][ y0 ] == MODE_INTER && sps_mts_inter_enabled_flag | CuPredMode[ x0 ][ y0 ] == MODE_INTRA && sps_mts_intra_enabled_flag | transform_skip_enabled_flag && ( log2TbWidth <= MaxTsSize && log2TbHeight <= MaxTsSize ) |
|---|---|---|---|
| 0 | 0 | 0 | 0 |
| 1 | 0 | 0 | 1 |
| 4 | 0 | 1 | 0 |
| 4 | 1 | 0 | 0 |
| 5 | 0 | 1 | 1 |
| 5 | 1 | 0 | 1 | pcm_flag[ x0 ][ y0 ] equal to 1 specifies that the pcm_sample( ) syntax structure is present and the transform_tree( ) syntax structure is not present in the coding unit including the luma coding block at the location ( x0, y0 ). pcm_flag[ x0 ][ y0 ] equal to 0 specifies that pcm_sample( ) syntax structure is not present. When pcm_flag[ x0 ][ y0 ] is not present, it is inferred to be equal to 0.

The value of pcm_flag[ x0 + i ][ y0 + j ] with i = 1..cbWidth − 1, j = 1..cbHeight − 1 is inferred to be equal to pcm_flag[ x0 ][ y0 ].

pcm_alignment_zero_bit is a bit equal to 0.

FIG. 19

Table 49

| Coding unit semantics |
|---|
| intra_luma_ref_idx[ x0 ][ y0 ] specifies the intra prediction reference line index IntraLumaRefLineIdx[ x ][ y ] for x = x0..x0 + cbWidth − 1 and y = y0..y0 + cbHeight − 1 as specified in the following Table. |
| When intra_luma_ref_idx[ x0 ][ y0 ] is not present it is inferred to be equal to 0. |

Table – Specification of IntraLumaRefLineIdx[ x ][ y ] based on intra_luma_ref_idx[ x0 ][ y0 ].

| intra_luma_ref_idx[ x0 ][ y0 ] | IntraLumaRefLineIdx[ x ][ y ]<br>x = x0..x0 + cbWidth − 1<br>y = y0..y0 + cbHeight − 1 |
|---|---|
| 0 | 0 |
| 1 | 1 |
| 2 | 3 |

The syntax elements intra_luma_mpm_flag[ x0 ][ y0 ], intra_luma_mpm_idx[ x0 ][ y0 ] and intra_luma_mpm_remainder[ x0 ][ y0 ] specify the intra prediction mode for luma samples. The array indices x0, y0 specify the location ( x0, y0 ) of the top-left luma sample of the considered coding block relative to the top-left luma sample of the picture. When intra_luma_mpm_flag[ x0 ][ y0 ] is equal to 1, the intra prediction mode is inferred from a neighbouring intra-predicted coding unit according to clause 8.3.2.

When intra_luma_mpm_flag[ x0 ][ y0 ] is not present, it is inferred to be equal to 1.

intra_chroma_pred_mode[ x0 ][ y0 ] specifies the intra prediction mode for chroma samples. The array indices x0, y0 specify the location ( x0, y0 ) of the top-left luma sample of the considered coding block relative to the top-left luma sample of the picture.

mvp_l0_flag[ x0 ][ y0 ] specifies the motion vector predictor index of list 0 where x0, y0 specify the location ( x0, y0 ) of the top-left luma sample of the considered coding block relative to the top-left luma sample of the picture.

When mvp_l0_flag[ x0 ][ y0 ] is not present, it is inferred to be equal to 0.

mvp_l1_flag[ x0 ][ y0 ] has the same semantics as mvp_l0_flag, with l0 and list 0 replaced by l1 and list 1, respectively.

inter_pred_idc[ x0 ][ y0 ] specifies whether list0, list1, or bi-prediction is used for the current coding unit according to the following Table. The array indices x0, y0 specify the location ( x0, y0 ) of the top-left luma sample of the considered coding block relative to the top-left luma sample of the picture.

Table – Name association to inter prediction mode

| inter_pred_idc | Name of inter_pred_idc | |
|---|---|---|
| | ( cbWidth + cbHeight ) != 8 | ( cbWidth + cbHeight ) == 8 |
| 0 | PRED_L0 | PRED_L0 |
| 1 | PRED_L1 | PRED_L1 |
| 2 | PRED_BI | n.a. |

When inter_pred_idc[ x0 ][ y0 ] is not present, it is inferred to be equal to PRED_L0.

ref_idx_l0[ x0 ][ y0 ] specifies the list 0 reference picture index for the current coding unit. The array indices x0, y0 specify the location ( x0, y0 ) of the top-left luma sample of the considered coding block relative to the top-left luma sample of the picture.

When ref_idx_l0[ x0 ][ y0 ] is not present it is inferred to be equal to 0.

It is a requirement of bitstream conformance that when the reference picture corresponding to ref_idx_l0[ x0 ][ y0 ] for the current coding unit is the current decoded picture, inter_pred_idc[ x0 ][ y0 ] shall be equal to 0.

FIG. 20

Table 50

| Coding unit semantics |
|---|
| ref_idx_l1[ x0 ][ y0 ] has the same semantics as ref_idx_l0, with l0 and list 0 replaced by l1 and list 1, respectively. |
| inter_affine_flag[ x0 ][ y0 ] equal to 1 specifies that for the current coding unit, when decoding a P or B tile group, affine model based motion compensation is used to generate the prediction samples of the current coding unit. inter_affine_flag[ x0 ][ y0 ] equal to 0 specifies that the coding unit is not predicted by affine model based motion compensation. When inter_affine_flag[ x0 ][ y0 ] is not present, it is inferred to be equal to 0. |
| cu_affine_type_flag[ x0 ][ y0 ] equal to 1 specifies that for the current coding unit, when decoding a P or B tile group, 6-parameter affine model based motion compensation is used to generate the prediction samples of the current coding unit. cu_affine_type_flag[ x0 ][ y0 ] equal to 0 specifies that 4-parameter affine model based motion compensation is used to generate the prediction samples of the current coding unit. |
| MotionModelIdc[ x ][ y ] represents motion model of a coding unit as illustrated in the following Table. The array indices x, y specify the luma sample location ( x, y ) relative to the top-left luma sample of the picture. |
| The variable MotionModelIdc[ x ][ y ] is derived as follows for $x = x0..x0 + cbWidth - 1$ and $y = y0..y0 + cbHeight - 1$: |
| -- If merge_flag[ x0 ][ y0 ] is equal to 1, the following applies: |
|     MotionModelIdc[ x ][ y ] = merge_subblock_flag[ x0 ][ y0 ] |
| -- Otherwise (merge_flag[ x0 ][ y0 ] is equal to 0), the following applies: |
|     MotionModelIdc[ x ][ y ] = inter_affine_flag[ x0 ][ y0 ] + cu_affine_type_flag[ x0 ][ y0 ] |

Table – Interpretation of MotionModelIdc[ x0 ][ y0 ]

| MotionModelIdc[ x ][ y ] | Motion model for motion compensation |
|---|---|
| 0 | Translational motion |
| 1 | 4-parameter affine motion |
| 2 | 6-parameter affine motion |

| |
|---|
| It is a requirement of bitstream conformance that when the reference picture corresponding to ref_idx_l0[ x0 ][ y0 ] for the current coding unit is the current decoded picture, MotionModelIdc[ x ][ y ] shall be equal to 0. |
| amvr_flag[ x0 ][ y0 ] specifies the resolution of motion vector difference. The array indices x0, y0 specify the location ( x0, y0 ) of the top-left luma sample of the considered coding block relative to the top-left luma sample of the picture. amvr_flag[ x0 ][ y0 ] equal to 0 specifies that the resolution of the motion vector difference is 1/4 of a luma sample. amvr_flag[ x0 ][ y0 ] equal to 1 specifies that the resolution of the motion vector difference is further specified by amvr_4pel_flag[ x0 ][ y0 ]. |
| When amvr_flag[ x0 ][ y0 ] is not present, it is inferred as follows: |
| -- If sps_cpr_enabled_flag is equal to 1, amvr_flag[ x0 ][ y0 ] is inferred to be equal to 1. |
| -- Otherwise ( sps_cpr_enabled_flag is equal to 0 ), amvr_flag[ x0 ][ y0 ] is inferred to be equal to 0. |
| amvr_4pel_flag[ x0 ][ y0 ] equal to 1 specifies that the resolution of the motion vector difference is four luma samples. The array indices x0, y0 specify the location ( x0, y0 ) of the top-left luma sample of the considered coding block relative to the top-left luma sample of the picture. |
| When amvr_4pel_flag[ x0 ][ y0 ] is not present, it is inferred to be equal to 0. |
| The variable MvShift is set equal to ( amvr_flag[ x0 ][ y0 ] + amvr_4pel_flag[ x0 ][ y0 ] ) << 1 and the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows: |
|     MvdL0[ x0 ][ y0 ][ 0 ] = MvdL0[ x0 ][ y0 ][ 0 ] << ( MvShift + 2 ) |
|     MvdL0[ x0 ][ y0 ][ 1 ] = MvdL0[ x0 ][ y0 ][ 1 ] << ( MvShift + 2 ) |
|     MvdL1[ x0 ][ y0 ][ 0 ] = MvdL1[ x0 ][ y0 ][ 0 ] << ( MvShift + 2 ) |
|     MvdL1[ x0 ][ y0 ][ 1 ] = MvdL1[ x0 ][ y0 ][ 1 ] << ( MvShift + 2 ) |

FIG. 21

Table 55

| Transform unit semantics |
|---|
| The transform coefficient levels are represented by the arrays TransCoeffLevel[ x0 ][ y0 ][ cIdx ][ xC ][ yC ]. The array indices x0, y0 specify the location ( x0, y0 ) of the top-left luma sample of the considered transform block relative to the top-left luma sample of the picture. The array index cIdx specifies an indicator for the colour component; it is equal to 0 for Y, 1 for Cb, and 2 for Cr. The array indices xC and yC specify the transform coefficient location ( xC, yC ) within the current transform block. When the value of TransCoeffLevel[ x0 ][ y0 ][ cIdx ][ xC ][ yC ] is not specified in clause 7.3.4.12, it is inferred to be equal to 0. |
| tu_cbf_luma[ x0 ][ y0 ] equal to 1 specifies that the luma transform block contains one or more transform coefficient levels not equal to 0. The array indices x0, y0 specify the location ( x0, y0 ) of the top-left luma sample of the considered transform block relative to the top-left luma sample of the picture. |
| When tu_cbf_luma[ x0 ][ y0 ] is not present, its value is inferred to be equal to 0. |
| tu_cbf_cb[ x0 ][ y0 ] equal to 1 specifies that the Cb transform block contains one or more transform coefficient levels not equal to 0. The array indices x0, y0 specify the top-left location ( x0, y0 ) of the considered transform block. |
| When tu_cbf_cb[ x0 ][ y0 ] is not present, its value is inferred to be equal to 0. |
| tu_cbf_cr[ x0 ][ y0 ] equal to 1 specifies that the Cr transform block contains one or more transform coefficient levels not equal to 0. The array indices x0, y0 specify the top-left location ( x0, y0 ) of the considered transform block. |
| When tu_cbf_cr[ x0 ][ y0 ] is not present, its value is inferred to be equal to 0. |
| cu_qp_delta_abs specifies the absolute value of the difference CuQpDeltaVal between the quantization parameter of the current coding unit and its prediction. |
| cu_qp_delta_sign_flag specifies the sign of CuQpDeltaVal as follows: |
| -- If cu_qp_delta_sign_flag is equal to 0, the corresponding CuQpDeltaVal has a positive value. |
| -- Otherwise (cu_qp_delta_sign_flag is equal to 1), the corresponding CuQpDeltaVal has a negative value. |
| When cu_qp_delta_sign_flag is not present, it is inferred to be equal to 0. |
| When cu_qp_delta_abs is present, the variables IsCuQpDeltaCoded and CuQpDeltaVal are derived as follows: |
|     IsCuQpDeltaCoded = 1 |
|     CuQpDeltaVal = cu_qp_delta_abs * ( 1 − 2 * cu_qp_delta_sign_flag ) |
| The value of CuQpDeltaVal shall be in the range of −( 32 + QpBdOffsetY / 2 ) to +( 31 + QpBdOffsetY / 2 ), inclusive. |
| tu_mts_idx[ x0 ][ y0 ] specifies which transform kernels are applied to the residual samples along the horizontal and vertical direction of the associated luma transform block. The array indices x0, y0 specify the location ( x0, y0 ) of the top-left luma sample of the considered transform block relative to the top-left luma sample of the picture. |
| When tu_mts_idx[ x0 ][ y0 ] is not present, it is inferred to be equal to 1. |
| The variable TrHorType specifying the horizontal transform kernel and the variable TrVerType specifying the vertical transform kernel are derived in the following Table depending on tu_mts_idx[ xTbY ][ yTbY ]. |

Table— Specification of TrHorType and TrVerType depending on tu_mts_idx[ x0 ][ y0 ]

| tu_mts_idx[ x0 ][ y0 ] | | | TrHorType | TrVerType | IsTraFoSkip |
|---|---|---|---|---|---|
| MaxMtsIdx == 1 | MaxMtsIdx == 4 | MaxMtsIdx == 5 | | | |
| 0 | - | 0 | −1 | −1 | 1 |
| 1 | 0 | 1 | 0 | 0 | 0 |
| - | 1 | 2 | 1 | 1 | 0 |
| - | 2 | 3 | 2 | 1 | 0 |
| - | 3 | 4 | 1 | 2 | 0 |
| - | 4 | 5 | 2 | 2 | 0 |

IMAGE CODING METHOD AND DEVICE USING TRANSFORM SKIP FLAG

CROSS-REFERENCE TO RELATED APPLICATIONS

This application is a continuation application of Ser. No. 17/669,044, filed Feb. 10, 2022, which is a continuation application of Ser. No. 17/138,494, filed Dec. 30, 2020, now U.S. Pat. No. 11,297,310, which is a continuation application of Ser. No. 16/852,735, filed Apr. 20, 2020, now U.S. Pat. No. 10,917,637, which is continuation of International Application PCT/KR2020/000757, with an international filing date of Jan. 15, 2020, which claims the benefit of U.S. Provisional Application No. 62/792,423 filed on Jan. 15, 2019, the contents of which are all hereby incorporated by reference herein in their entirety.

BACKGROUND OF THE DISCLOSURE

Field of the Disclosure

The present document relates to an image coding technology, and more particularly, to an image coding method and device using a transform skip flag in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present document provides a method and a device for enhancing image coding efficiency.

The present document provides a method and a device for enhancing the efficiency of residual coding.

The present document provides a method and a device for enhancing the efficiency of the residual coding according to whether to apply a transform skip.

The present document provides a method and a device for enhancing the efficiency of the residual coding by variably setting a maximum transform skip size.

According to an embodiment of the present document, a method for decoding an image performed by a decoding apparatus is provided. The method includes obtaining prediction mode information and residual related information from a bitstream, deriving prediction samples of a current block by performing prediction based on the prediction mode information, deriving residual samples of the current block based on the residual related information, and generating reconstruction samples of the current block based on the prediction samples and the residual samples, and the residual related information includes a transform skip flag based on a size of the current block and a maximum transform skip size, the transform skip flag represents whether a transform skip is applied to the current block, and information about the maximum transform skip size is obtained from the bitstream.

According to another embodiment of the present document, a decoding apparatus which performs an image decoding is provided. The decoding apparatus includes an entropy decoder which obtains prediction mode information and residual related information from a bitstream, a predictor which derives prediction samples of a current block by performing prediction based on the prediction mode information, a residual processor which derives residual samples of the current block based on the residual related information, and an adder which generates reconstruction samples of the current block based on the prediction samples and the residual samples, and the residual related information includes a transform skip flag based on a size of the current block and a maximum transform skip size, the transform skip flag represents whether a transform skip is applied to the current block, and information about the maximum transform skip size is obtained from the bitstream.

According to still another embodiment of the present document, a method for encoding a video performed by an encoding apparatus is provided. The method includes deriving prediction samples by performing prediction on a current block, deriving residual samples for the current block, and encoding image information including prediction mode information about the prediction and residual related information about the residual samples, and the residual related information includes a transform skip flag based on a size of the current block and a maximum transform skip size, the transform skip flag represents whether a transform skip is applied to the current block, and the image information includes information about the maximum transform skip size.

According to yet another embodiment of the present document, a video encoding apparatus is provided. The encoding apparatus includes a predictor which derives prediction samples by performing prediction on a current block, a residual processor which derives residual samples for the current block, and an entropy encoder which encodes image information including prediction mode information about the prediction and residual related information about the residual samples, and the residual related information includes a transform skip flag based on a size of the current block and a maximum transform skip size, the transform skip flag represents whether a transform skip is applied to the current block, and the image information includes information about the maximum transform skip size.

According to still yet another embodiment of the present document, a computer readable digital storage medium is provided. The computer readable digital storage medium stores image information which causes the decoding method to be performed.

According to a further embodiment of the present document, a computer readable digital storage medium is provided. The computer readable digital storage medium stores image information generated by the encoding method.

According to the present document, it is possible to enhance the overall image/video compaction efficiency.

According to the present document, it is possible to enhance the efficiency of the residual coding by using the transform skip presence/absence flag.

According to the present document, it is possible to enhance the efficiency of the residual coding by variably setting the maximum transform skip size.

According to the present document, it is possible to enhance the coding efficiency by efficiently transmitting the residual signal represented by the pixel domain having the characteristics different from those of the residual signal of the general transform domain.

BRIEF DESCRIPTION OF THE DRAWINGS

FIG. 18 illustrates Table 48.
FIG. 19 illustrates Table 49.
FIG. 20 illustrates Table 50.
FIG. 21 illustrates Table 55.

DESCRIPTION OF EXEMPLARY EMBODIMENTS

Figure 1:
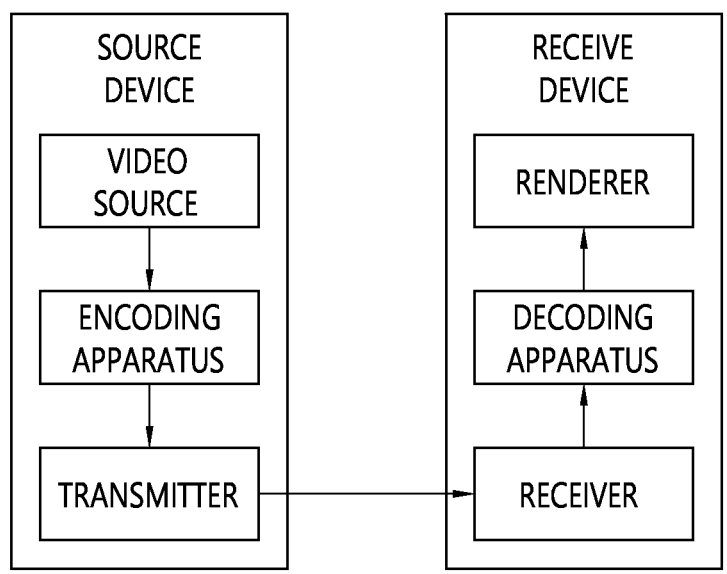
FIG. 1 is a diagram schematically illustrating an example of a video/image coding system to which the present document may be applied.

The present document may be modified in various forms, and specific embodiments thereof will be described and illustrated in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to represent that features, numbers, steps, operations, elements, components, or combinations thereof used in the following description exist and it should be thus understood that the possibility of existence or addition of one or more different features, numbers, steps, operations, elements, components, or combinations thereof is not excluded.

Each of the components in the drawings described in the present document are illustrated independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of the present document without departing from the spirit of the present document.

Hereinafter, exemplary embodiments of the present document will be described in detail with reference to the accompanying drawings. Hereinafter, the same reference numerals are used for the same components in the drawings, and redundant description of the same components is omitted.

FIG. 1 illustrates an example of a video/image coding system to which embodiments of the present specification may be applied.

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The reception device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, the method/embodiment disclosed in the present document may be applied to the method disclosed in the versatile video coding (VVC) standard, the EVC (essential video coding) standard, the AOMedia Video 1 (AV1) standard, the 2nd generation of audio video coding standard (AVS2), or the next generation video/image coding standard (ex. H.267 or H.268, etc.).

The present document presents various embodiments of video/image coding, and the embodiments may be performed in combination with each other unless otherwise mentioned.

In the present document, a video may mean a set of a series of images over time. A picture generally means a unit representing one image in a specific time zone, and a slice/tile is a unit configuring a part of the picture in coding. The slice/tile may include one or more coding tree units (CTUs). One picture may be composed of one or more slices/tiles. One picture may be composed of one or more tile groups. One tile group may include one or more tiles. A brick may represent a rectangular region of CTU rows within a tile in a picture. A tile may be partitioned into multiple bricks, each of which consists of one or more CTU rows within the tile. A tile that is not partitioned into multiple bricks may be also referred to as a brick. A tile which is not partitioned into multiple bricks may also be referred to as a brick. A brick scan may represent a specific sequential ordering of the CTUs partitioning a picture in which the CTUs may be ordered in a CTU raster scan within the brick, the bricks within the tile may be ordered consecutively in the raster scan of the bricks of the tile, and tiles in a picture may be ordered consecutively in the raster scan of the tiles of the picture. A tile is a rectangular region of CTUs within a particular tile column and a particular tile row. The tile column is a rectangular region of CTUs having a height equal to the height of the picture, and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in a CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. The tile group and the slice may be used interchangeably in the present document. For example, in the present document, the tile group/tile group header may be referred to as a slice/slice header.

A pixel or a pel may mean a smallest unit constituting one picture (or image). In addition, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present document, the term "I" and "," should be interpreted to represent "and/or." For instance, the expression "A/B" may mean "A and/or B." Further, "A, B" may mean "A and/or B." Further, "A/B/C" may mean "at least one of A, B, and/or C." In addition, "A/B/C may mean "at least one of A, B, and/or C.")

Further, in the present document, the term "or" should be interpreted to represent "and/or." For instance, the expression "A or B" may comprise 1) only A, 2) only B, and/or 3) both A and B. That is, the term "or" in the present document should be interpreted to represent "additionally or alternatively."

Figure 2:
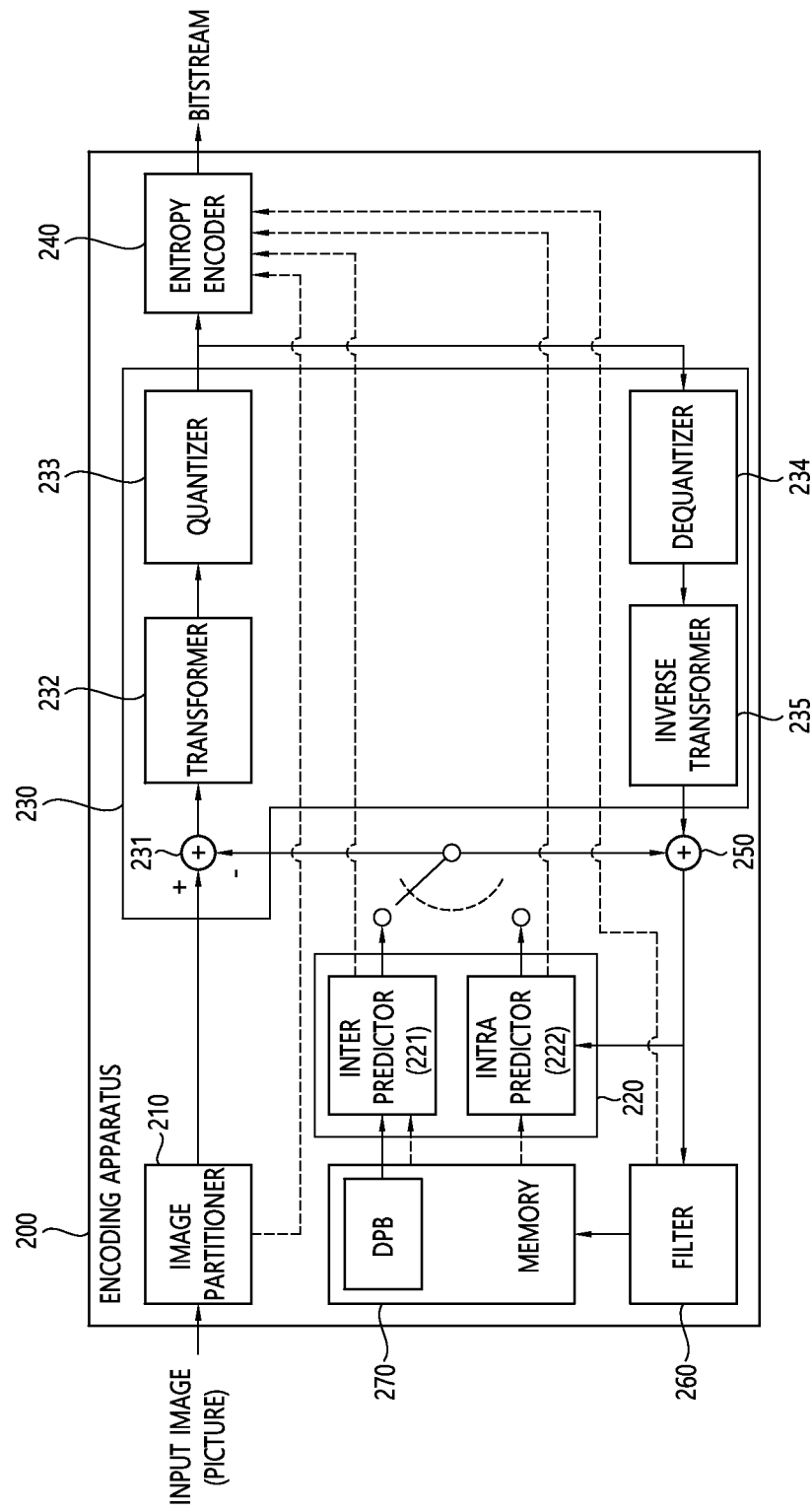
FIG. 2 is a diagram schematically explaining a configuration of a video/image encoding apparatus to which the present document may be applied.

FIG. 2 is a diagram schematically explaining a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a predictor (PU) or a transformer (TU). In this case, the predictor and the transformer may be split or partitioned from the aforementioned final coding unit. The predictor may be a unit of sample prediction, and the transformer may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction samples array) output from the inter predictor 221 or the intra predictor 222 is subtracted from an input image signal (original block, original sample array) to generate a residual signal residual block, residual sample array), and the generated residual signal is transmitted to the transformer 232. In this case, as illustrated, a unit for subtracting a prediction signal (predicted block, prediction samples array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information about the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information representing which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be represented by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information about the palette table and the palette index.

The prediction signal generated through the predictor (including the inter predictor 221 and/or the intra predictor 222) may be used to generate a reconstructed signal or may be used to generate a residual signal. The transformer 232 may generate transform coefficients by applying a transform technique to the residual signal. For example, the transform technique may include at least one of a Discrete Cosine Transform (DCT), a Discrete Sine Transform (DST), a Karhunen-Loève Transform (KLT), a Graph-Based Transform (GBT), or a Conditionally Non-linear Transform (CNT). Here, the GBT means a transform obtained from a graph when the relationship information between pixels is graphically represented. The CNT means a transform obtained by generating the prediction signal by using all previously reconstructed pixels and based on the prediction signal. In addition, the transform process may also be applied to pixel blocks having the same size of a square, or may also be applied to blocks of variable sizes other than the square.

The quantizer 233 may quantize the transform coefficients and transmit them to the entropy encoder 240 and the entropy encoder 240 may encode the quantized signal (information about the quantized transform coefficients) and output a bitstream. The information about the quantized transform coefficients may be referred to as residual information. The quantizer 233 may rearrange block type quantized transform coefficients into a one-dimensional vector form based on a coefficient scanning order and generate information about the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. In the present document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not illustrated) transmitting a signal output from the entropy encoder 240 and/or a storage unit (not illustrated) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
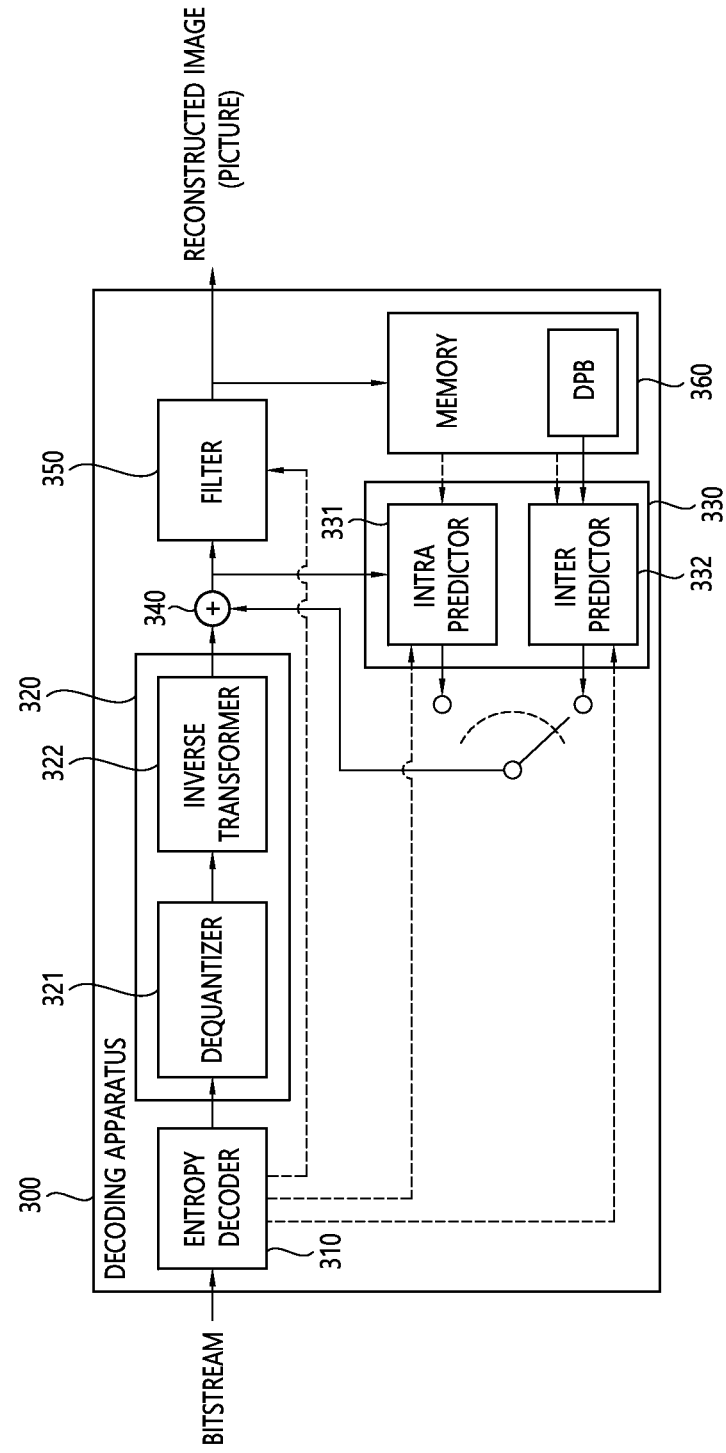
FIG. 3 is a diagram schematically explaining a configuration of a video/image decoding apparatus to which the present document may be applied.

FIG. 3 is a diagram schematically explaining a configuration of a video/image decoding apparatus to which the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transformers may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information about various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information about the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information about filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a component of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information about the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information about the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information about the prediction may include information representing a mode of inter prediction on the current block.

The adder 340 may generate a reconstructed signal (reconstructed picture, reconstructed block, reconstructed sample array) by adding the obtained residual signal to the prediction signal (predicted block, prediction samples array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to increase compression efficiency. Therefore, a predicted block including the prediction samples for the current block which is a coding target block may be generated. Here, the predicted block includes the prediction samples in a spatial domain (or pixel domain). The predicted block is derived identically in the encoding apparatus and the decoding apparatus, and the encoding apparatus may signal information about the residual (residual information) between the original block and the predicted block, rather than the original sample value itself of the original block, to the decoding apparatus, thereby increasing image coding efficiency. The decoding apparatus may derive a residual block including residual samples based on the residual information, generate a reconstructed block including reconstructed samples by summing the residual block and the predicted block, and generate a reconstructed picture including the reconstructed blocks.

The residual information may be generated through transform and quantization procedures. For example, the encoding apparatus may signal related residual information (through a bitstream) to the decoding apparatus by deriving the residual block between the original block and the predicted block, deriving transform coefficients by performing the transform procedure for the residual samples (residual sample array) included in the residual block, and deriving quantized transform coefficients by performing the quantization procedure for the transform coefficients. Here, the residual information may include information such as value information, position information, transform technique, transform kernel, and quantization parameter of the quantized transform coefficients. The decoding apparatus may perform dequantization/inverse transform procedures based on the residual information and derive the residual samples (or residual blocks). The decoding apparatus may generate a reconstructed picture based on the predicted block and the residual block. The encoding apparatus may also dequantize/inversely transform the quantized transform coefficients for reference for the inter prediction of the post-picture to derive the residual block, and generate the reconstructed picture based thereon.

In the present document, the transformer, the quantizer, the dequantizer or the inverse transformer of the encoding apparatus in FIG. 2, or the dequantizer or the inverse transformer of the decoding apparatus in FIG. 3 will be described in detail. Here, the encoding apparatus may derive a bitstream from information transformed and quantized through entropy encoding, and the decoding apparatus may derive the transformed and quantized information from the bitstream through entropy decoding. Hereinafter, the dequantizer and the inverse transformer will be described, and the transformer and the quantizer may inversely perform the same operation as in the dequantizer and the inverse transformer. In addition, the dequantizer and the inverse transformer may be represented by a dequantization and inverse transformer, and the transformer and the quantizer may also be represented by a transform and quantizer.

In addition, in the present document, Multiple Transform Selection (MTS) may mean a method for performing transform by using at least two transform types. This may also be expressed as an Adaptive Multiple Transform (AMT) or an Explicit Multiple Transform (EMT), and likewise, mts_idx may also be expressed as AMT_idx, EMT_idx, AMT_TU_idx, EMT_TU_idx, transform index, transform combination index, or the like, and the present document is not limited to such expression.

Figure 4:
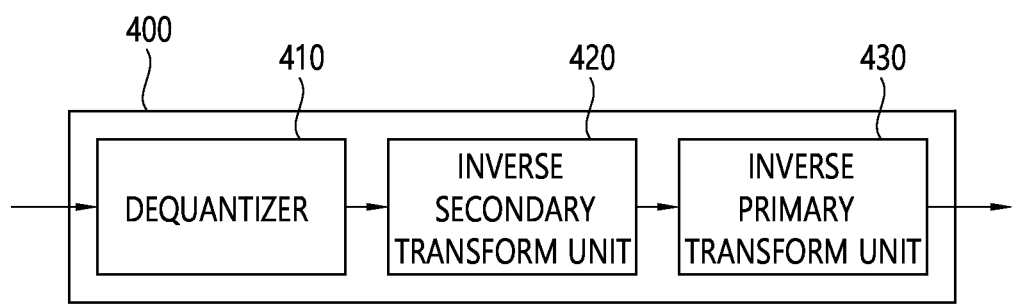
FIG. 4 is a diagram illustrating an example of a dequantization and inverse transformer.

FIG. 4 illustrates an example of the dequantization and inverse transformer.

Referring to FIG. 4, the dequantization and inverse transformer 400 may include a dequantizer 410, an inverse secondary transform unit 420, and an inverse primary transform unit 430.

The dequantizer 410 may obtain a transform coefficient by performing the dequantization for an entropy decoded signal (or quantized transform coefficient) by using quantization step size information, and the inverse secondary transform unit 420 may perform an inverse secondary transform for the transform coefficient. In addition, the inverse primary transform unit 430 may perform an inverse primary transform for the inverse secondary transformed signal or block (or transform coefficient), and a residual signal decoded through the inverse primary transform may be obtained. Here, the inverse secondary transform may represent an inverse transform of the secondary transform, and the inverse primary transform may represent the inverse transform of the primary transform.

In the present document, a transform combination may be configured for each transform configuration group which is classified by at least one of a prediction mode, a block size, or a block shape, and the inverse primary transform unit 430 may perform the inverse transform based on the transform combination which is configured by the present document. In addition, embodiments to be described later in the present document may be applied.

Figure 5:
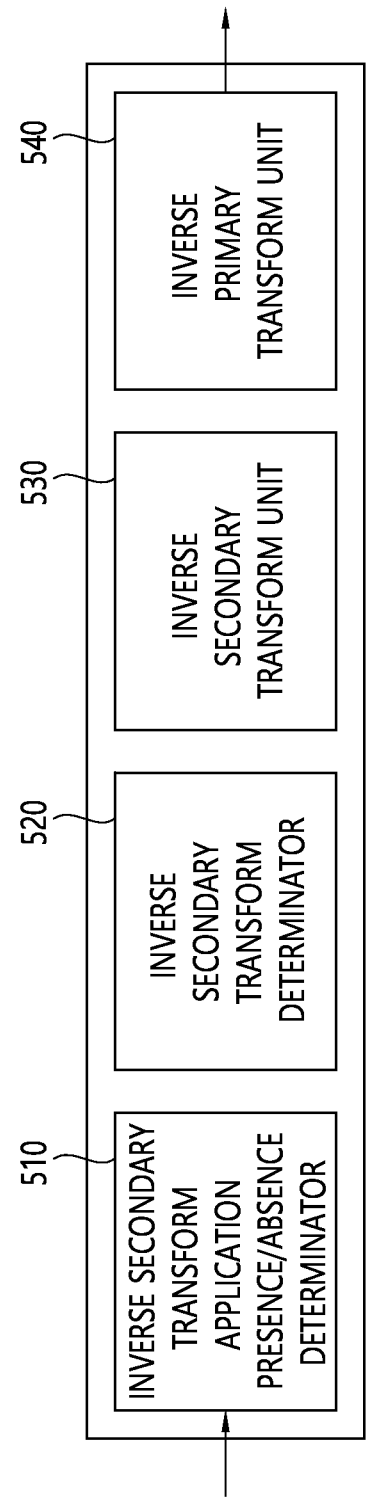
FIG. 5 is a diagram illustrating an example of an inverse secondary transform unit and an inverse primary transform unit.

FIG. 5 illustrates an example of the inverse secondary transform unit and the inverse primary transform unit.

Specifically describing the inverse transform process with reference to FIG. 5, the inverse transform process may use an inverse secondary transform application presence/absence determinator (or element which determines whether to apply the inverse secondary transform) 510, an inverse secondary transform determinator (or element which determines the inverse secondary transform) 520, an inverse secondary transform unit 530, and an inverse primary transform unit 540. Here, the inverse secondary transform unit 420 illustrated in FIG. 4 may be the same as the inverse secondary transform unit 530 illustrated in FIG. 5, and may also include at least one of the inverse secondary transform application presence/absence determinator 510, the inverse secondary transform determinator 520, and the inverse secondary transform unit 530 illustrated in FIG. 5, but may be changed according to expression, such that the present document is not limited thereto. In addition, the inverse primary transform unit 430 illustrated in FIG. 4 may be the same as the inverse primary transform unit 540 illustrated in FIG. 5, but may be changed according to expression, such that the present document is not limited thereto.

The inverse secondary transform application presence/absence determinator 510 may determine whether to apply the inverse secondary transform. For example, the inverse secondary transform may be NSST or RST. For example, the inverse secondary transform application presence/absence determinator 510 may determine whether to apply the inverse secondary transform based on a second transform flag received from the encoding apparatus. As another example, the inverse secondary transform application presence/absence determinator 510 may also determine whether to apply the inverse secondary transform based on the transform coefficient of the residual block.

The inverse secondary transform determinator 520 may determine the inverse secondary transform. At this time, the inverse secondary transform determinator 520 may determine the inverse secondary transform applied to the current block based on the NSST (or RST) transform set which is designated according to an intra prediction mode.

In addition, for example, a secondary transform determining method may be determined depending on a primary transform determining method. Various several combinations of the primary transform and the secondary transform may be determined according to the intra prediction mode.

In addition, for example, the inverse secondary transform determinator 520 may also determine an area to which the inverse secondary transform is applied based on the size of the current block.

The inverse secondary transform unit 530 may perform the inverse secondary transform for the dequantized residual block by using the determined inverse secondary transform.

The inverse primary transform unit 540 may perform the inverse primary transform for the inverse secondary transformed residual block. The primary transform may be referred to as a core transform. For example, the inverse primary transform unit 540 may perform the primary transform by using the aforementioned MTS. In addition, for example, the inverse primary transform unit 540 may determine whether the MTS is applied to the current block.

For example, when the MTS is applied to the current block (or when a value of a tu_mts_flag syntax element is 1), the inverse primary transform unit 540 may configure an MTS candidate based on the intra prediction mode of the current block. In addition, the inverse primary transform unit 540 may determine the primary transform applied to the current block by using an mts_idx syntax element indicating a specific MTS among the configured MTS candidates.

Figure 6:
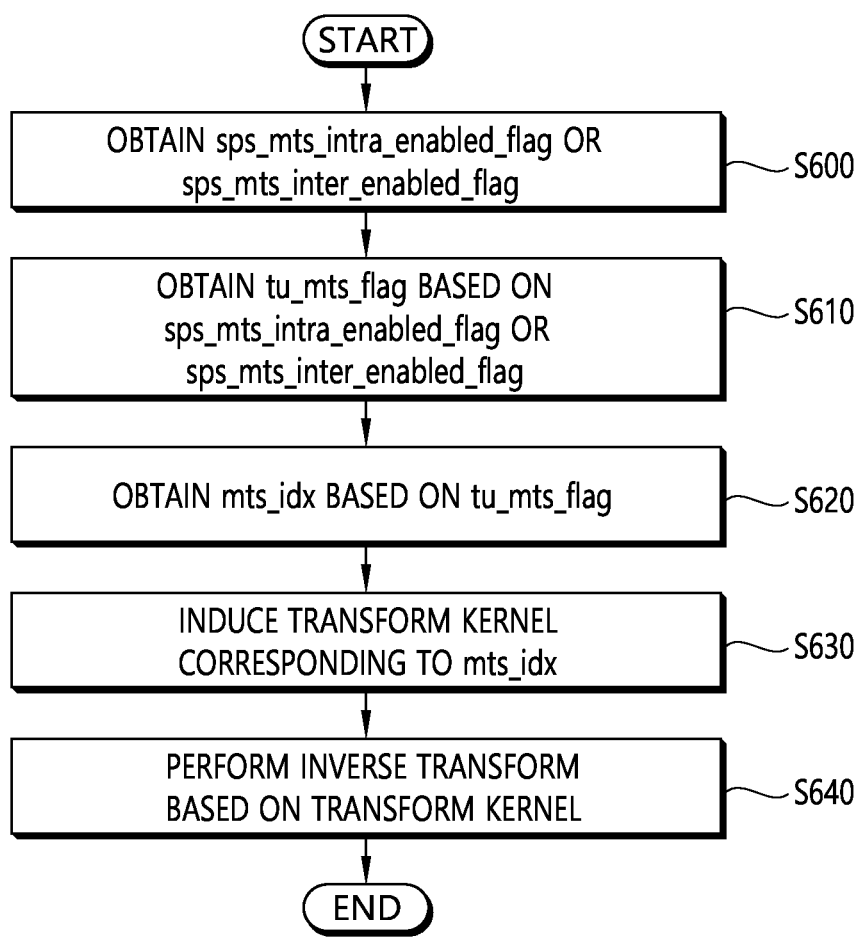
FIG. 6 is a diagram illustrating an example of an inverse transform method based on transform related parameters.

FIG. 6 is an example of an inverse transform method based on transform related parameters.

Referring to FIG. 6, an embodiment may obtain a sps_mts_intra_enabled_flag syntax element or a sps_mts_inter_enabled_flag syntax element (S600). Here, the sps_mts_intra_enabled_flag syntax element may represent information about whether the tu_mts_flag syntax element is included in the residual coding syntax of the intra coding unit. For example, when the value of the sps_mts_intra_enabled_flag syntax element is 0, the tu_mts_flag syntax element may not be included in the residual coding syntax of the intra coding unit, and when the sps_mts_intra_enabled_flag syntax element is 1, the tu_mts_flag syntax element may be included in the residual coding syntax of the intra coding unit.

In addition, the sps_mts_inter_enabled_flag syntax element may represent information about whether the tu_mts_flag syntax element is included in the residual coding syntax of the inter coding unit. For example, when the value of the sps_mts_inter_enabled_flag syntax element is 0, the tu_mts_flag syntax element may not be included in the residual coding syntax of the inter coding unit, and when the value of the sps_mts_inter_enabled_flag syntax element is 1, the tu_mts_flag syntax element may be included in the residual coding syntax of the inter coding unit.

Here, the tu_mts_flag syntax element may represent whether Multiple Transform Selection (MTS) is applied to the residual sample of the luma transform block.

An embodiment may obtain the tu_mts_flag syntax element based on the sps_mts_intra_enabled_flag syntax element or the sps_mts_inter_enabled_flag syntax element (S610). For example, when the value of the sps_mts_intra_enabled_flag syntax element or the sps_mts_inter_enabled_flag syntax element is 1, an embodiment may obtain the tu_mts_flag syntax element. For example, when the value of the tu_mts_flag syntax element is 0, the MTS may not be applied to the residual sample of the luma transform block, and when the value of the tu_mts_flag syntax element is 1, the MTS may be applied to the residual sample of the luma transform block.

An embodiment may obtain an mts_idx syntax element based on the tu_mts_flag syntax element (S620). Here, the mts_idx syntax element may represent information about which transform kernel is applied to luma residual samples according to horizontal and/or vertical directions of a current (luma) transform block. For example, when the value of the tu_mts_flag syntax element is 1, an embodiment may obtain the mts_idx syntax element. Alternatively, when the value of the tu_mts_flag syntax element is 0, an embodiment may not obtain the mts_idx syntax element.

An embodiment may induce a transform kernel corresponding to the mts_idx syntax element (S630). Alternatively, an embodiment may derive the transform kernel based on the mts_idx syntax element.

Meanwhile, in another embodiment, at least one of the embodiments of the present document may also be applied to the tu_mts_flag syntax element and/or the mts_idx syntax element.

For example, the tu_mts_flag syntax element may be included in the residual coding syntax based on the sps_mts_intra_enabled_flag syntax element or the sps_mts_inter_enabled_flag syntax element, and the mts_idx syntax element may be included in the transform unit syntax based on the tu_mts_flag syntax element.

Alternatively, for example, the sps_mts_intra_enabled_flag syntax element may be represented by a sps_explicit_mts_intra_enabled_flag syntax element, and the sps_mts_inter_enabled_flag syntax element may be represented by a sps_explicit_mts_inter_enabled_flag syntax element. Alternatively, the tu_mts_flag syntax element may be omitted, and the mts_idx syntax element may also be included in the coding unit syntax based on the sps_explicit_mts_intra_enabled_flag syntax element or the sps_explicit_mts_inter_enabled_flag syntax element.

For example, the transform kernel corresponding to the mts_idx syntax element may be defined by being classified into a horizontal transform and a vertical transform. Alternatively, the transform kernel determined based on the mts_idx syntax element may be classified into the horizontal transform and the vertical transform. Meanwhile, different transform kernels may be applied to the horizontal transform and the vertical transform, but the same transform kernel may also be applied thereto, such that the present document is not limited thereto.

For example, information about the transform kernel applied to the horizontal transform and the vertical transform which are determined based on the mts_idx syntax element may be as illustrated in Table 1 or Table 2.

TABLE 1

| mts_idx[xTbY][yTbY][cIdx] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

TABLE 2

| mts_idx | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

An embodiment may perform an inverse transform based on the transform kernel (S640). In the present document, the inverse transform may be represented by the transform or may also be represented by the inverse of the transform.

Figure 7:
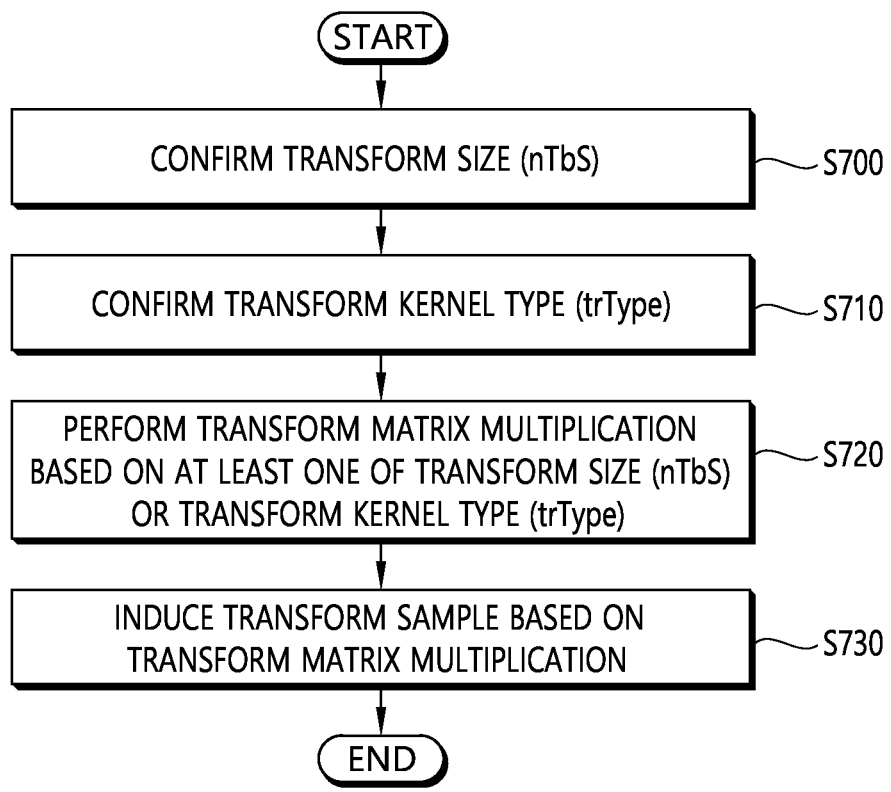
FIG. 7 is a diagram illustrating an example of a specific inverse transform method.

FIG. 7 is an example of a specific inverse transform method.

Referring to FIG. 7, an embodiment may confirm a transform size (nTbS) (S710). For example, the transform size (nTbS) may be a variable representing the horizontal sample size of scaled transform coefficients.

An embodiment may confirm a transform kernel type (trType) (S720). For example, the transform kernel type (trType) may be a variable representing the type of transform kernel, and various embodiments of the present document may be applied. For example, the transform kernel type may also represent trTypeHor or trTypeVer illustrated in FIG. 6.

An embodiment may perform transform matrix multiplication based on at least one of the transform size (nTbS) or the transform kernel type (trType) (S730). For example, a specific operation may be applied based on the transform kernel type (trType). Alternatively, for example, a predetermined transform matrix may be applied based on the transform size (nTbS) and the transform kernel type (trType).

An embodiment may derive a transform sample based on the transform matrix multiplication (S740).

The encoding apparatus/decoding apparatus may perform the aforementioned inverse transform process, and the encoding apparatus may also perform the transform process which is the inverse of the aforementioned inverse transform process.

Figure 8:
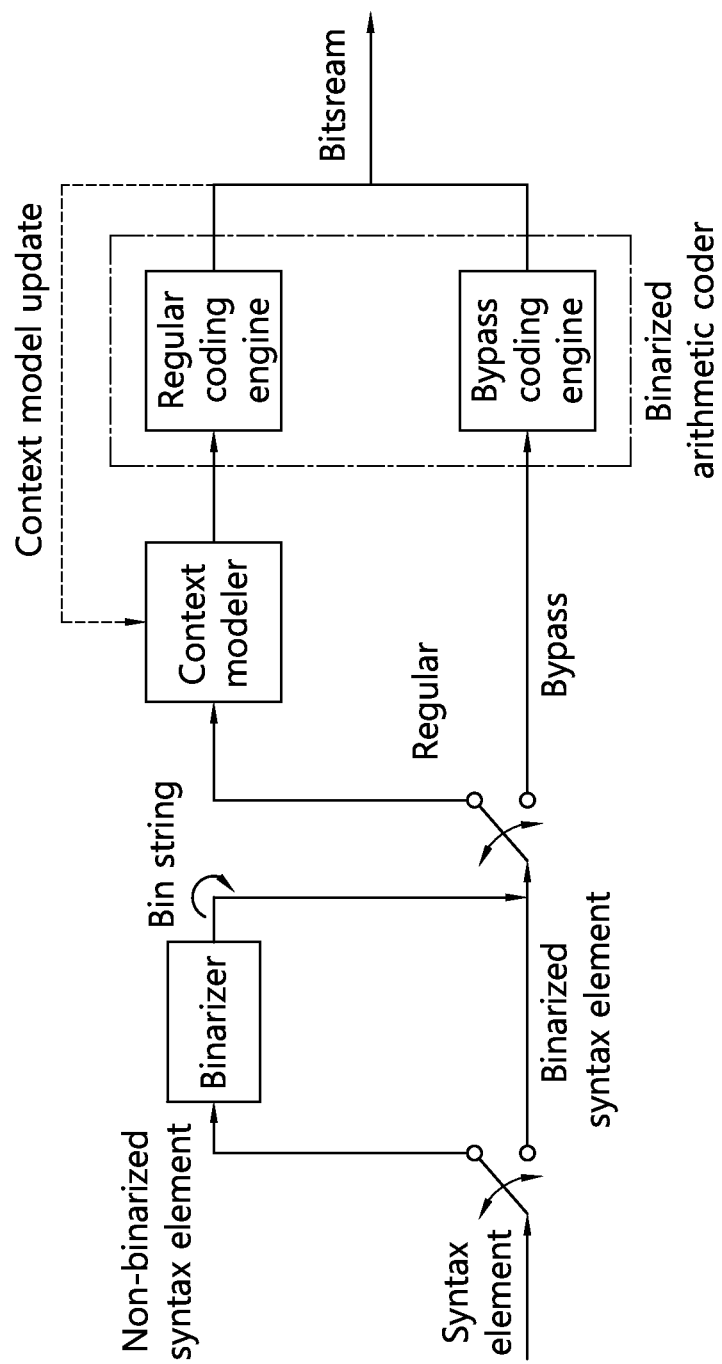
FIG. 8 is a block diagram of a CABAC encoding system according to an embodiment.

FIG. 8 is a block diagram of a CABAC encoding system according to an embodiment, and illustrates a block diagram of context-adaptive binary arithmetic coding (CABAC) for coding a single syntax element.

The encoding process of the CABAC first transforms an input signal to a binary value through binarization when the input signal is a syntax element rather than a binary value. When the input signal is already a binary value, the input signal may be input by being bypassed without the binarization, that is, to a coding engine. Here, each binary 0 or 1 configuring the binary value may be referred to as a bin. For example, when a binary string after the binarization is 110, each of 1, 1, and 0 is referred to as a bin. The bin (s) for one syntax element may represent a value of the corresponding syntax element.

The binarized bins may be input to a regular coding engine or a bypass coding engine.

The regular coding engine may assign a context model reflecting a probability value to the corresponding bin, and code the corresponding bin based on the assigned context model. The regular coding engine may update the probability model for the corresponding bin after coding each bin. The thus coded bins may be referred to as context-coded bins.

The bypass coding engine omits a procedure of estimating the probability of the input bin and a procedure of updating the probability model applied to the corresponding bin after the coding. By coding the bin which is input by applying the uniform probability distribution rather than assigning the context, it is possible to enhance a coding speed. The thus coded bins are referred to as bypass bins.

Entropy encoding may determine whether to perform the coding through the regular coding engine, or to perform the coding through the bypass coding engine, and switch a coding path. Entropy decoding inversely performs the same process as in the entropy encoding.

Meanwhile, in an embodiment, the (quantized) transform coefficients may be encoded/decoded based on syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, abs_level_gt1_flag, par_level_flag, abs_level_gt3_flag, abs_remainder, dec_abs_level, coeff_sign_flag and/or mts_idx.

For example, the residual related information or the syntax elements included in the residual related information may be represented as in Tables 3 to 5. Alternatively, the residual coding information included in the residual related information or the syntax elements included in the residual coding syntax may be represented as in Tables 3 to 5.

Tables 3 to 5 may represent one syntax consecutively.

TABLE 3

| | Descriptor |
|---|---|
| residual_coding( x0, y0, log2TbWidth, log2TbHeight, cIdx ) { <br>  if( transform_skip_enabled_flag  &&   ( cIdx ! = 0 \| \| tu_mts_flag[ x0 ][ y0 ] = = 0 ) && <br>    ( log2TbWidth <= 2 )  &&   ( log2TbHeight <= 2 ) ) <br>    transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) <br>    last_sig_coeff_x_suffix | ae(v) |
|   if( last_sig_coeff_y_prefix > 3 ) <br>    last_sig_coeff_y_suffix | ae(v) |
|   log2SbSize = ( Min( log2TbWidth, log2TbHeight ) < 2  ?  1  :  2 ) <br>  numSbCoeff = 1 << ( log2SbSize << 1 ) <br>  lastScanPos = numSbCoeff <br>  lastSubBlock = ( 1 << ( log2TbWidth + log2TbHeight − 2 * log2SbSize ) ) − 1 <br>  do { <br>    if( lastScanPos  = =   0 ) { <br>      lastScanPos = numSbCoeff <br>      lastSubBlock− − <br>    } <br>    lastScanPos− − <br>    xS = DiagScanOrder[ log2TbWidth − log2SbSize ][ log2TbHeight − log2SbSize ] <br>        [ lastSubBlock ][ 0 ] <br>    yS = DiagScanOrder[ log2TbWidth − log2SbSize ][ log2TbHeight − log2SbSize ] <br>        [ lastSubBlock ][ 1 ] <br>    xC = ( xS << log2SbSize ) + <br>      DiagScanOrder[ log2SbSize ][ log2SbSize ][ lastScanPos ][ 0 ] <br>    yC = ( yS << log2SbSize ) + <br>      DiagScanOrder[ log2SbSize ][ log2SbSize ][ lastScanPos ][ 1 ] <br>  } while( ( xC  !=   LastSignificantCoeffX )  \| \|  (  yC  !=   LastSignificantCoeffY ) ) <br>  numSigCoeff = 0 <br>  QState = 0 <br>  for( i = lastSubBlock; i  >=   0; i− − ) { <br>    startQStateSb = QState <br>    xS = DiagScanOrder[ log2TbWidth − log2SbSize ][ log2TbHeight − log2SbSize ] <br>        [ lastSubBlock ][ 0 ] <br>    yS = DiagScanOrder[ log2TbWidth − log2SbSize ][ log2TbHeight − log2SbSize ] <br>        [ lastSubBlock ][ 1 ] <br>    inferSbDcSigCoeffFlag = 0 <br>    if( ( i < lastSubBlock )  &&   ( i > 0 ) ) { <br>      coded_sub_block_flag[ xS ][ yS ] | ae(v) |
|       inferSbDcSigCoeffFlag = 1 <br>    } <br>    firstSigScanPosSb = numSbCoeff <br>    lastSigScanPosSb = −1 <br>    remBinsPass1 = ( log2SbSize < 2 ? 6 : 28 ) <br>    remBinsPass2 = ( log2SbSize < 2 ? 2 : 4 ) <br>    firstPosMode0 = ( i  = =   lastSubBlock  ? lastScanPos − 1 : numSbCoeff − 1 ) <br>    firstPosMode1 = −1 | |

TABLE 4

| |  |
|---|---|
| firstPosMode2 = −1 <br>for( n = ( i  = =   firstPosMode0; n  >=   0  &&   remBinsPass1 >= 3; n− − ) { <br>  xC = ( xS << log2SbSize ) + DiagScanOrder[ log2SbSize ][ log2SbSize ][ n ][ 0 ] <br>  yC = ( yS << log2SbSize ) + DiagScanOrder[ log2SbSize ][ log2SbSize ] [ n ][ 1 ] <br>  if( coded_sub_block_flag[ xS ][ yS ]  &&   ( n > 0  \| \|  !inferSbDcSigCoeffFlag ) ) <br>{ <br>    sig_coeff_flag[ xC ][ yC ] | ae(v) |
|     remBinsPass1− − <br>    if( sig_coeff_flag[ xC ][ yC ] ) <br>      inferSbDcSigCoeffFlag = 0 <br>  } <br>  if( sig_coeff_flag[ xC ][ yC ] )  { <br>    numSigCoeff−+ <br>    abs_level_gt1_flag[ n ] | ae(v) |
|     remBinsPass1− − <br>    if( abs_level_gt1_flag[ n ] ) { <br>      par_level_flag[ n ] | ae(v) |
|       remBinsPass1− − <br>      abs_level_gt3_flag[ n ] | ac(v) |
|       remBinsPass1− − <br>    } | |

TABLE 4-continued

```
            if( lastSigScanPosSb  = =   −1 )
                lastSigScanPosSb = n
            firstSigScanPosSb = n
        }
        AbsLevelPass1[ xC ][ yC ] =
            sig_coeff_flag[ xC ][ yC ] + par_level_flag[ n ] + abs_level_gt1_flag[ n ] + 2 *
abs_level_gt3_flag[ n ]
        if( dep_quant_enabled_flag )
            QState = QStateTransTable[ QState ][ AbsLevelPass1[ xC ][ yC ] & 1 ]
        if( remBinsPass1< 3 )
            firstPosMode2 = n − 1
    }
    for( n = numSbCoeff − 1; n  >=  firstPosMode2; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( abs_level_gt3_flag[ n ] )
            abs_remainder[ n ]                                                              ae(v)
        AbsLevel[ xC ][ yC ] = AbsLevelPass1[ xC ][ yC ] +
                        2 *  abs_remainder[ n ]
    }
    for( n = firstPosMode2; n >= 0; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        dec_abs_level[ n ]                                                                  ae(v)
        if(AbsLevel[ xC ][ yC ] > 0 )
            firstSigScanPosSb = n
        if( dep_quant_enabled_flag )
```

TABLE 5

```
            QState = QStateTransTable[ QState ][ AbsLevel[ xC ][ yC ] & 1 ]
        }
        if( dep_quant_enabled_flag  | |  !sign_data_hiding_enabled_flag )
            signHidden = 0
        else
            signHidden = ( lastSigScanPosSb − firstSigScanPosSb > 3  ?  1  :   0 )
        for( n = numSbCoeff − 1; n  >=   0; n− − ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2ShSize ][ n ][ 1 ]
            if( sig_coeff_flag[ xC ][ yC ]  &&
               ( !signHidden  | |  ( n  !=   firstSigScanPosSb ) ) )
                coeff_sign_flag[ n ]                                                        ae(v)
        }
        if( dep_quant_enabled_flag ) {
            QState = startQStateSb
            for( n = numSbCoeff − 1; n  >=   0; n− − ) {
                xC = ( xS << log2SbSize ) −
                    DiagScanOrder[ log2SbSize ][ log2SbSize ][ n ][ 0 ]
                yC = ( yS << log2SbSize ) −
                    DiagScanOrder[ log2SbSize ][ log2SbSize ][ n ][ 1 ]
                if( sig_coeff_flag[ xC ][ yC ] )
                    TransCoeffLevel[ x0 ][ y0 ][ cIdx ][ xC ][ yC ] =
                        ( 2 * AbsLevel[ xC ][ yC ]  −   ( QState > 1 ? 1 : 0 ) ) *
                        ( 1  −   2 * coeff_sign_flag[ n ] )
                QState = QStateTransTable[ QState ][ par_level_flag[ n ] ]
        } else {
            sumAbsLevel = 0
            fort n = numSbCoeff − 1; n  >=   0; n− − ) {
                xC = ( xS << log2SbSize ) −
                    DiagScanOrder[ log2SbSize ][ log2SbSize ][ n ][ 0 ]
                yC = ( yS << log2SbSize ) −
                    DiagScanOrder[ log2SbSize ][ log2SbSize ][ n ][ 1 ]
                if( sig_coeff_flag[ xC ][ yC ] )  {
                    TransCoeffLevel[ x0 ][ y0 ][ cIdx ][ xC ][ yC ]   =
                        AbsLevel[ xC ][ yC ] * ( 1 − 2 * coeff_sign_flag[ n ] )
                    if( signhidden )  {
                        sumAbsLevel  +=   AbsLevel[ xC ][ yC ]
                        if( ( n  = =   firstSigScanPosSb }  &&  ( sumAbsLevel % 2 )  = =   1 ) )
                            TransCoeffLevel[ x0 ][ y0 ][ cIdx ][ xC ][ yC ]   =
                                −TransCoeffLevel[ x0 ][ y0 ][ cIdx ][ xC ][ yC ]
                    }
                }
            }
        }
    }
}
```

TABLE 5-continued

```
if( tu_mts_flag[ x0 ][ y0 ] && ( cIdx = = 0 ) )
    mts_idx[ x0 ][ y0 ][ cIdx ]                                                     ae(v)
}
```

For example, the residual related information may include the residual coding information (or syntax elements included in the residual coding syntax) or the transform unit information (or syntax elements included in the transform unit syntax), the residual coding information may be represented as in Tables 6 to 9, and the transform unit information may be represented as in Table 10 or Table 11. Tables 6 to 9 may represent one syntax consecutively.

TABLE 6

| | Descriptor |
|---|---|
| residual_coding( x0, y0, log2TbWidth, log2TbHeight, cIdx ) { <br>   if( sps_mts_enabled_flag && cu_sbt_flag && cIdx = = 0 && <br>      log2TbWidth = = 5 && log2TbHeight < 6 ) <br>     log2ZoTbWidth = 4 <br>   else <br>     log2ZoTbWidth = Min( log2TbWidth, 5 ) <br>   if( sps_mts_enabled_flag && cu_sbt_flag && cIdx = = 0 && <br>      log2TbWidth < 6 && log2TbHeight = = 5 ) <br>     log2ZoTbHeight = 4 <br>   else <br>     log2ZoTbHeight = Min( log2TbHeight, 5 ) <br>   if( log2TbWidth > 0 ) <br>     last_sig_coeff_x_prefix | ae(v) |
|   if( log2TbHeight > 0 ) <br>     last_sig_coeff_y_prefix | ae(v) |
|   if( last_sig_coeff_x_prefix > 3 ) <br>     last_sig_coeff_x_suffix | ae(v) |
|   if( last_sig_coeff_y_prefix > 3 ) <br>     last_sig_coeff_y_suffix | ae(v) |
|   log2TbWidth = log2ZoTbWidth <br>   log2TbHeight = log2ZoTbHeight <br>   remBinsPass1 = ( ( 1 << ( log2TbWidth + log2TbHeight ) ) * 7 ) >> 2 <br>   log2SbW = ( Min( log2TbWidth, log2TbHeight ) < 2 ? 1 : 2 ) <br>   log2SbH = log2SbW <br>   if( log2TbWidth + log2TbHeight > 3 ) { <br>     if( log2TbWidth < 2 ) { <br>       log2ShW = log2TbWidth <br>       log2SbH = 4 − log2SbW <br>     } else if( log2TbHeight < 2 ) { <br>       log2SbH = log2TbHeight <br>       log2SbW = 4 − log2SbH <br>     } <br>   } <br>   numSbCoeff = 1 << ( log2SbW + log2SbH ) <br>   lastScanPos = numSbCoeff <br>   lastSubBlock = ( 1 << ( log2TbWidth + log2TbHeight − ( log2SbW − log2SbH ) ) ) − 1 <br>   do { <br>     if( lastScanPos = = 0 ) { <br>       lastScanPos = numSbCoeff <br>       lastSubBlock− − <br>     } <br>     lastScanPos− − <br>     xS = DiagScanOrder[ log2TbWidth − log2SbW ][ log2TbHeight − log2SbH ] <br>         [ lastSubBlock ][ 0 ] <br>     yS = DiagScanOrder[ log2TbWidth − log2SbW ][ log2TbHeight − log2SbH ] <br>         [ lastSubBlock ][ 1 ] <br>     xC = ( xS << log2SbW ) + DiagScanOrder[ log2SbW ][ log2SbH ][ lastScanPos ][ 0 ] | |

TABLE 7

```
    yC = ( yS << log2SbH ) + DiagScanOrder[ log2SbW ][ log2SbH ][ lastScanPos ][ 1 ]
    } while( ( xC != LastSignificantCoeffX ) | | ( yC != LastSignificantCoeffY ) )
    if( lastSubBlock = = 0 && log2TbWidth >= 2 && log2TbHeight >= 2 &&
        !transform_skip_flag[ x0 ][ y0 ][ cIdx ] && lastScanPos > 0 )
        LfnstDcOnly = 0
    if( ( lastSubBlock > 0 && log2TbWidth >= 2 && log2TbHeight >= 2 ) | |
        ( lastScanPos > 7 && ( log2TbWidth = = 2 | | log2TbWidth = = 3 ) &&
        log2TbWidth = = log2TbHeight ) )
        LfnstZeroOutSigCoeffFlag = 0
```

TABLE 7-continued

```
if( ( LastSignificantCoeffX > 15 | | LastSignificantCoeffY > 15 ) && cIdx = = 0 )
    MtsZeroOutSigCoeffFlag = 0
QState = 0
for( i = lastSubBlock; i >= 0; i- - ) {
    startQStateSb = QState
    xS = DiagScanOrder[ log2TbWidth - log2SbW ][ log2TbHeight - log2SbH ]
            [ i ][ 0 ]
    yS = DiagScanOrder[ log2TbWidth - log2SbW ][ log2TbHeight - log2SbH ]
            [ i ][ 1 ]
    inferSbDcSigCoeffFlag = 0
    if( i < lastSubBlock && i > 0 ) {
        coded_sub_block_flag[ xS ][ yS ]                                        ae(v)
        inferSbDcSigCoeffFlag = 1
    }
    firstSigScanPosSb = numSbCoeff
    lastSigScanPosSb = -1
    firstPosMode0 = ( i = = lastSubBlock ? lastScanPos : numSbCoeff - 1 )
    firstPosMode1 = firstPosMode0
    for( n = firstPosMode0; n >= 0 && remBinsPass1 >= 4; n- - ) {
        xC = ( xS << log2SbW ) + DiagScanOrder[ log2SbW ][ log2SbH ][ n ][ 0 ]
        yC = ( yS << log2SbH ) + DiagScanOrder[ log2SbW ][ log2SbH ][ n ][ 1 ]
        if( coded_sub_block_flag[ xS ][ yS ] && ( n > 0 | | !inferSbDcSigCoeffFlag ) &&
            ( xC != LastSignificantCoeffX | | yC != Last SignificantCoeffY ) ) }
            sig_coeff_flag[ xC ][ yC ]                                          ae(v)
            remBinsPass1 - -
            if( sig_coeff_flag[ xC ][ yC ] )
                inferSbDcSigCoeffFlag = 0
        }
        if( sig_coeff_flag[ xC ][ yC ] ) {
            abs_level_gtx_flag[ n ][ 0 ]                                        ae(v)
            remBinsPass1- -
            if( abs_level_gtx_flag[ n ][ 0 ] ) {
                par_level_flag[ n ]                                             ae(v)
                remBinsPass1- -
                abs_level_gtx_flag[ n ][ 1 ]                                    ae(v)
                remBinsPass1- -
            }
            if( lastSigScanPosSb = = -1 )
                lastSigScanPosSb = n
            firstSigScanPosSb = n
        }
```

TABLE 8

```
        AbsLevelPass1[ xC ][ yC ] = sig_coeff_flag[ xC ][ yC ] + par_level_flag[ n ] +
            abs_level_gtx_flag[ n ][ 0 ] - 2 * abs_level_gtx_flag[ n ][ 1 ]
        if( pic_dep_quant_enabled_flag )
            QState = QStateTransTable[ QState ][ n ][ AbsLevelPass1[ xC ][ yC ] & 1 ]
        firstPosMode1 = n - 1
    }
    for( n = firstPosMode0; n > firstPosMode1; n- - ) {
        xC = ( xS << log2SbW ) + DiagScanOrder[ log2SbW ][ log2SbH ][ n ][ 0 ]
        yC = ( yS << log2SbH ) - DiagScanOrder[ log2SbW ][ log2SbH ][ n ][ 1 ]
        if( abs_level_gtx_flag[ n ][ 1 ] )
            abs_remainder[ n ]                                                  ae(v)
        AbsLevel[ xC ][ yC ] = AbsLevelPass1[ xC ][ yC ] +2 * abs_remainder[ n ]
    }
    for( n = firstPosMode1; n >= 0; n- - ) {
        xC = ( xS << log2SbW ) + DiagScanOrder[ log2SbW ][ log2SbH ][ n ][ 0 ]
        yC = ( yS << log2SbH ) - DiagScanOrder[ log2SbW ][ log2SbH ][ n ][ 1 ]
        if( coded_sub_block_flag[ xS ][ yS ] )
            dec_abs_level[ n ]                                                  ae(v)
        if( AbsLevel[ xC ][ yC ] > 0 ) {
            if( lastSigScanPosSb = = -1 )
                lastSigScanPosSb = n
            firstSigScanPosSb = n
        }
        it(pic_dep_quant_enabled_flag )
            QState = QStateTransTable[ QState ][ AbsLevel[ x ][ yC ] & 1 ]
    }
    if( pic_dep_quant_enabled_flag | | !sign_data_hiding_enabled_flag )
        signHidden = 0
    else
        signHidden = ( lastSigScanPosSb - firstSigScanPosSb > 3 ? 1 : 0 )
    for( n = numSbCoeff - 1; n >= 0; n- - ) {
        xC = ( xS << log2SbW) + DiagScanOrder[ log2SbW ][ log2SbH ][ n ][ 0 ]
        yC = ( yS << log2SbH ) - DiagScanOrder[ log2SbW ][ log2SbH ][ n ][ 1 ]
```

TABLE 8-continued

```
    if( ( AbsLevel[ xC ][ yC ] > 0 ) &&
        ( !signHidden | | ( n != firstSigScanPosSb ) ) )
      coeff_sign_flag[ n ]                                    ae(v)
  }
  if( pic_dep_quant_enabled_flag ) {
    QState = startQStateSb
    for( n = numSbCoeff - 1; n >= 0; n- - ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( AbsLevel[ xC ][ yC ] > 0 )
        TransCoeffLevel[ x0 ][ y0 ][ cIdx ][ xC ][ yC ] =
          ( 2 * AbsLevel[ xC ][ yC ] - ( QState > 1 ? 1 : 0 ) ) *
          ( 1 - 2 * coeff_sign_flag[ n ] )
      QState = QStateTransTable[ QState ][ AbsLevel[ xC ][ yC ] & 1 ]
  } else {
    sumAbsLevel = 0
```

TABLE 9

```
    for( n = numSbCoeff - 1; n >= 0; n- - ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( AbsLevel[ xC ][ yC ] > 0 ) {
        TransCoeffLevel[ x0 ][ y0 ][ cIdx ][ xC ][ yC ] =
          AbsLevel[ xC ][ yC ] * ( 1 - 2 * coeff_sign_flag[ n ] )
        if( signHidden ) {
          sumAbsLevel += AbsLevel[ xC ][ yC ]
          if( ( n = = firstSigScanPosSb ) && ( sumAbsLevel % 2 ) = = 1 ) )
            TransCoeffLevel[ x0 ][ y0 ][ cIdx ][ xC ][ yC ] =
              -TransCoeffLevel[ x0 ][ y0 ][ cIdx ][ xC ][ yC ]
        }
      }
    }
  }
}
```

TABLE 10

| | Descriptor |
|---|---|

```
transform_unit( x0, y0, tbWidth, tbHeight, treeType, subTuIndex ) {
  if( ( treeType = = SINGLE_TREE | | TreeType = = DUAL_TREE_CHROMA ) &&
        ChromaArrayType != 0 ) {
    if( ( IntraSubPartitionsSplitType = = ISP_NO_SPLIT && !( cu_sbt_flag &&
          ( ( subTuIndex = = 0 && cu_sbt_pos_flag ) | |
            ( subTuIndex = = 1 && !cu_sbt_pos_flag ) ) ) ) | |
        ( IntraSubPartitionsSplitType != ISP_NO_SPLIT &&
          ( subTuIndex = = NumIntraSubPartitions - 1 ) ) ) {
      tu_cbf_cb[ x0 ][ y0 ]                                   ae(v)
      tu_cbf_cr[ x0 ][ y0 ]                                   ae(v)
    }
  }
  if( treeType = = SINGLE_TREE | | treeType = = DUAL_TREE_LUMA ) {
    if( ( IntraSubPartitionsSplitType = = ISP_NO_SPLIT && !( cu_sbt_flag &&
          ( ( subTuIndex = = 0 && cu_sbt_pos_flag ) | |
            ( subTuIndex = = 1 && !cu_sbt_pos_flag ) ) ) &&
          ( CuPredMode[ x0 ][ y0 ] = = MODE_INTRA | |
            tu_cbf_cb[ x0 ][ y0 ] | | tu_cbf_cr[ x0 ][ y0 ] | |
            CbWidth[ x0 ][ y0 ] > MaxTbSizeY | CbHeight[ x0 ][ y0 ] > MaxTbSizeY ) ) |
        ( IntraSubPartitionsSplitType != ISP_NO_SPLIT &&
          ( subTuIndex < NumIntraSubPartitions - 1 | | !InferTuCbfLuma ) ) )
      tu_cbf_luma[ x0 ][ y0 ]                                 ae(v)
      if (IntraSubPartitionsSplitType != ISP_NO_SPLIT )
        InferTuCbfLuma = InferTuCbfLuma && !tu_cbf_luma[ x0 ][ y0 ]
  }
  ...
```

TABLE 10-continued

| | Descriptor |
|---|---|
| if( ( tu_cbf_luma[ x0 ][ y0 ] | | tu_cbf_cb[ x0 ][ y0 ] |   tu_cbf_cr[ x0 ][ y0 ] ) &&<br>  treeType != DUAL_TREE_CHROMA ) {<br>  if( cu_qp_delta_enabled_flag && !IsCuQpDeltaCoded ) {<br>    cu_qp_delta_abs<br>    if( cu_qp_delta_abs )<br>      cu_qp_delta_sign_flag<br>  }<br>}<br>if( tu_cbf_luma[ x0 ][ y0 ] && treeType != DUAL_TREE_CHROMA<br>  && ( tbWidth <= 32 ) && ( tbHeight <= 32 )<br>  && ( IntraSubPartitionsSplit[ x0 ][ y0 ] = = ISP_NO_SPLIT ) && ( !cu_sbt_flag ) ) {<br>  if( transform_skip_enabled_flag && tbWidth <= MaxTsSize && tbHeight <= MaxTsSize )<br>    transform_skip_flag[ x0 ][ y0 ]<br>  if( (( CuPredMode[ x0 ][ y0 ] != MODE_INTRA && sps_explicit_mts_inter_enabled_flag )<br>      ( CuPredMode[ x0 ][ y0 ] = = MODE_INTRA && sps_explicit_mts_intra_enabled_flag ))<br>    && ( !transform_skip_flag[ x0 ][ y0 ] ) )<br>    tu_mts_idx[ x0 ][ y0 ]<br>...| <br><br><br><br>ae(v)<br><br>ae(v)<br><br><br><br><br><br><br>ae(v)<br><br><br><br>ae(v) |

TABLE 11

| | Descriptor |
|---|---|
| transform_unit( x0, y0, tbWidth, tbHeight, treeType, subTuIndex, chType ) {<br>...<br>if( tu_cbf_luma[ x0 ][ y0 ] && treeType != DUAL_TREE_CHROMA ) {<br>  if( sps_transform_skip_enabled_flag && !BdpcmFlag[ x0 ][ y0 ][ 0 ] &&<br>    tbWidth <= MaxTsSize && tbHeight <= MaxTsSize &&<br>    ( IntraSubPartitionsSplit[ x0 ][ y0 ] = = ISP_NO_SPLIT ) && !cu_sbt_flag )<br>    transform_skip_flag[ x0 ][ y0 ][ 0 ]<br>  if( !transform_skip_flag[ x0 ][ y0 ][ 0 ] )<br>    residual_coding( x0, y0, Log2( tbWidth ), Log2( tbHeight ), 0 )<br>  else<br>    residual_ts_coding( x0, y0, Log2( tbWidth ), Log2( tbHeight ), 0 )<br>}<br>if( tu_cbf_cb[ xC ][ yC ] && treeType != DUAL_TREE_LUMA ) {<br>  if( sps_transform_skip_enabled_flag && !BdpcmFlag[ x0 ][ y0 ][ 1 ] &&<br>    wC <= MaxTsSize && hC <= MaxTsSize && !cu_sbt_flag )<br>    transform_skip_flag[ xC ][ yC ][ 1 ]<br>  if( !transform_skip_flag[ xC ][ yC ][ 1 ] )<br>    residual_coding( xC, yC, Log2( wC ), Log2( hC ), 1 )<br>  else<br>    residual_ts_coding( xC, yC, Log2( wC ), Log2( hC ), 1 )<br>}<br>if( tu_cbf_cr[ xC ][ yC ] && treeType != DUAL_TREE_LUMA &&<br>  !( tu_cbf_cb[ xC ][ yC ] && tu_joint_cbcr_residual_flag[ xC ][ yC ] ) ) {<br>  if( sps_transform_skip_enabled_flag && !BdpcmFlag[ x0 ][ y0 ][ 2 ] &&<br>    wC <= MaxTsSize && hC <= MaxTsSize && !cu_sbt_flag )<br>    transform_skip_flag[ xC ][ yC ][ 2 ]<br>  if( !transform_skip_flag[ xC ][ yC ][ 2 ] )<br>    residual_coding( xC, yC, Log2( wC ), Log2( hC ), 2 )<br>  else<br>    residual_ts_coding( xC, yC, Log2( wC ), Log2( hC ), 2 )<br>}<br>} | <br><br><br><br><br><br>ae(v)<br><br><br><br><br><br><br><br><br>ae(v)<br><br><br><br><br><br><br><br><br><br>ae(v) |

The syntax element transform_skip_flag represents whether the transform for an associated block is omitted. The associated block may be a coding block (CB) or a transform block (TB). With regard to the transform (and quantization) and residual coding procedures, the CB and TB may be used interchangeably. For example, as described above, the residual samples with respect to the CB may be derived, and the (quantized) transform coefficients may be derived through the transform and the quantization for the residual samples, and information (for example, syntax elements) efficiently representing the position, size, sign, and the like of the (quantized) transform coefficients may be generated and signaled through the residual coding procedure. The quantized transform coefficients may be simply referred to as transform coefficients. Generally, when the CB is not greater than the maximum TB, the size of the CB may be equal to the size of the TB, and in this case, a target block to be transformed (and quantized) and residual coded may be referred to as CB or TB. Meanwhile, when the CB is greater than the maximum TB, the target block to be transformed (and quantized) and residual coded may be referred to as TB. Hereinafter, while it will be described that the syntax elements related to the residual coding are signaled in units of transform block (TB), this is illustrative and the TB may be used interchangeably with the coding block (CB) as described above.

In Tables 3 to 5, while it has been illustrated that the syntax element transform_skip_flag is signaled based on the residual coding syntax, this is illustrative, and the syntax element transform_skip_flag may also be signaled based on the transform unit syntax as illustrated in Table 10 or Table 11. The residual coding syntax and the transform unit syntax may be collectively referred to as the residual (related) information. For example, the syntax element transform_skip_flag may be signaled only for the luma component (luma component block) (see Table 10). Specifically, for example, when a non-zero significant coefficient exists in the luma component block, the residual related information may include the transform skip flag (transform_skip_flag) for the luma component block. In this case, the residual related information does not include the transform skip flag for the chroma component block. That is, the residual related information may include the transform skip flag for the luma component block, and may not include the transform skip flag for the chroma component block. That is, in this case, the transform skip flag for the chroma component block is not explicitly signaled, and the value of the transform skip flag for the chroma component block may be derived/inferred to 0.

Alternatively, as another example, the syntax element transform_skip_flag may also be signaled for the luma component (luma component block) and the chroma component (chroma component block), respectively (see Table 11).

Referring back to Tables 3 to 5 or Tables 6 to 9, an embodiment may code (x, y) position information of the last non-zero transform coefficient within the transform block based on the syntax elements last_sig_coeff_x_prefix, last_sig_coeff_y_prefix, last_sig_coeff_x_suffix, and last_sig_coeff_y_suffix. More specifically, the syntax element last_sig_coeff_x_prefix represents the prefix of the column position of the last significant coefficient in the scanning order within the transform block, the syntax element last_sig_coeff_y_prefix represents the prefix of the row position of the last significant coefficient in the scanning order within the transform block, the syntax element last_sig_coeff_x_suffix represents the suffix of the column position of the last significant coefficient in the scanning order within the transform block, and the syntax element last_sig_coeff_y_suffix represents the suffix of the row position of the last significant coefficient in the scanning order within the transform block. Here, the significant coefficient may represent the non-zero coefficient. The scanning order may be an up-right diagonal scanning order. Alternatively, the scanning order may be a horizontal scanning order or a vertical scanning order. The scanning order may be determined based on whether the intra/inter prediction is applied to the target block (CB, or CB including TB) and/or a specific intra/inter prediction mode.

Next, after the transform block is split into 4×4 sub-blocks, whether the non-zero coefficient exists within a current sub-block by using a 1-bit syntax element coded_sub_block_flag every 4×4 sub-block. The sub-block may be used interchangeably with a Coefficient Group (CG).

When a value of the syntax element coded_sub_block_flag is 0, there is no more information to be transmitted, such that the coding process for the current sub-block may be terminated. Conversely, when the value of the syntax element coded_sub_block_flag is 1, the coding process for the syntax element sig_coeff_flag may be continuously performed. Since the sub-block including the last non-zero coefficient does not require the coding for the syntax element coded_sub_block_flag, and the sub-block including DC information of the transform block has a high probability of including the non-zero coefficient, the value of the syntax element coded_sub_block_flag may be assumed to be 1 without being coded.

If the value of the syntax element coded_sub_block_flag is 1 and it is determined that the non-zero coefficient exists within the current sub-block, the syntax element sig_coeff_flag having a binary value may be coded according to the inversely scanned order. A 1-bit syntax element sig_coeff_flag may be coded for each coefficient according to the scanning order. If the value of the transform coefficient at the current scanning position is not 0, the value of the syntax element sig_coeff_flag may be 1. Here, in the case of the sub-block including the last non-zero coefficient, the coding process for the sub-block may be omitted because it is not necessary to code the syntax element sig_coeff_flag with respect to the last non-zero coefficient. Level information coding may be performed only when the syntax element sig_coeff_flag is 1, and four syntax elements may be used in the level information coding process. More specifically, each syntax element sig_coeff_flag [xC] [yC] may represent whether the level (value) of the corresponding transform coefficient at each transform coefficient position (xC, yC) within the current TB is non-zero. In an embodiment, the syntax element sig_coeff_flag may correspond to an example of a significant coefficient flag representing whether the quantized transform coefficient is a non-zero significant coefficient.

The remaining level value after the coding for the syntax element sig_coeff_flag may be as is expressed in Equation 1 below. That is, a syntax element remAbsLevel representing the level value to be coded may be as is expressed in Equation 1 below. Here, coeff may mean an actual transform coefficient value.

$$remAbsLevel = |coeff| - 1 \qquad \text{Equation 1}$$

The syntax element abs_level_gt1_flag may represent whether the remAbsLevel' at the corresponding scanning position (n) is greater than 1. When a value of the abs_level_gt1_flag is 0, the absolute value of the coefficient of the corresponding position may be 1. When the value of the abs_level_gt1_flag is 1, the level value remAbsLevel to be coded later may be as is expressed in Equation 2 below.

$$remAbsLevel = remAbsLevel - 1 \qquad \text{Equation 2}$$

As in Equation 3 below through the syntax element par_level_flag, the least significant coefficient (LSB) value of the remAbsLevel described in Equation 2 may be coded. Here, the syntax element par_level_flag [n] may represent a parity of the transform coefficient level (value) at the scanning position (n). The transform coefficient level value remAbsLevel to be coded after the coding of the syntax element par_level_flag may be updated as is expressed in Equation 4 below.

$$par\_level\_flag = remAbsLevel \ \&1 \qquad \text{Equation 3}$$

$$remAbsLevel' = remAbsLevel >> 1 \qquad \text{Equation 4}$$

The syntax element abs_level_gt3_flag may represent whether the remAbsLevel' at the corresponding scanning position (n) is greater than 3. Coding of the syntax element abs_remainder may be performed only when the syntax element abs_level_gt3_flag is 1. The relationship between the coeff, which is the actual transform coefficient value, and the respective syntax elements may be summarized as is expressed in Equation 5 below, and Table 12 below may represent examples related to Equation 5. Finally, the sign of each coefficient may be coded by using the syntax element coeff_sign_flag, which is a 1-bit symbol. |coeff| may represent the transform coefficient level (value), and may also be expressed as AbsLevel for the transform coefficient.

$$|coeff| = sig\_coeff\_flag + abs\_level\_gt1\_flag + par\_level\_flag + 2*(abs\_evel\_gt3\_flag + abs\_remainder) \qquad \text{Equation 5}$$

TABLE 12

| |coeff| | sig_coeff_flag | abs_level_gt1_flag | par_level_flag | abs_level_gt3_flag | abs_remainder/ dec_abs_level |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

In an embodiment, the par_level_flag may represent an example of a parity level flag for the parity of the transform coefficient level for the quantized transform coefficient, the abs_level_gt1_flag may represent an example of a first transform coefficient level flag about whether the transform coefficient level or the level (value) to be coded is greater than a first threshold, and the abs_level_gt3_flag may represent an example of a second transform coefficient level flag about whether the transform coefficient level or the level (value) to be coded is greater than a second threshold.

Figure 9:
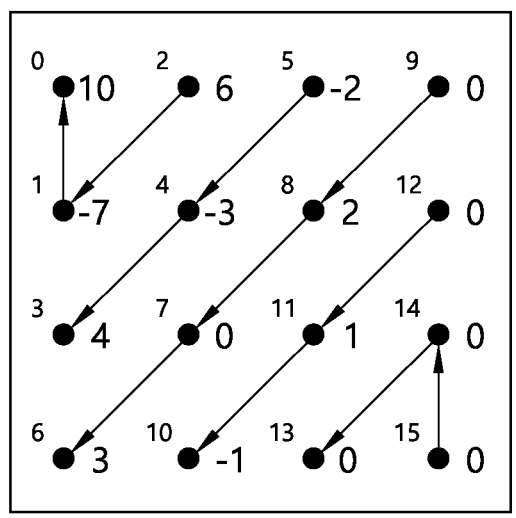
FIG. 9 is a diagram illustrating an example of transform coefficients within a 4×4 block.

FIG. 9 is a diagram illustrating an example of transform coefficients within a 4×4 block.

The 4×4 block illustrated in FIG. 9 may represent an example of quantized coefficients. The block illustrated in FIG. 9 may be a 4×4 transform block, or a 4×4 sub-block of 8×8, 16×16, 32×32, and 64×64 transform blocks. The 4×4 block illustrated in FIG. 9 may represent a luma block or a chroma block. Coding results for the inverse diagonally scanned coefficients illustrated in FIG. 9 may be represented, for example, as in Table 13. In Table 13, the scan_pos may represent the position of the coefficient according to the inverse diagonal scan. The scan_pos 15 may represent the coefficient which is first scanned, that is, of the lower right corner in the 4×4 block, and the scan_pos 0 may represent the coefficient, which is lastly scanned, that is, of the upper left corner in the 4×4 block. Meanwhile, in an embodiment, the scan_pos may also be referred to as a scan position. For example, the scan_pos 0 may be referred to as a scan position 0.

Meanwhile, CABAC provides high performance but has a disadvantage of poor throughput performance. This is caused by the regular coding engine of the CABAC, and the regular coding uses the updated probability state and range through the coding of the previous bin, thereby showing high data dependency, and taking a long time to read the probability section and determine the current state. It is possible to solve the throughput problem of the CABAC by limiting the number of context-coded bins.

Accordingly, the sum of bins used to express the syntax elements sig_coeff_flag, abs_level_gt1_flag, and par_level_flag is restricted to 28 in the case of the 4×4 sub-block, and restricted to 6 (remBinsPass1) in the case of the 2×2 sub-block according to the size of the sub-block as in Tables 3 to 5 or Tables 6 to 9, and the number of context-coded bins of the syntax element abs_level_gt3_flag may be restricted to 4 in the case of the 4×4 sub-block and restricted to 2 (remBinsPass2) in the case of the 2×2 sub-block. When all of the restricted context-coded bins are used to code the context element, the remainder coefficients may be binarized without using the CABAC to perform the bypass coding.

Meanwhile, an embodiment of the present document may propose a unified transform type signaling method.

For example, information about whether to apply the MTS may be represented by the tu_mts_flag syntax element, and information about the transform kernel to be applied may be represented by the mts_idx syntax element. In addition, the tu_mts_flag syntax element may be included in the transform unit syntax, and the mts_idx syntax element may be included in the residual coding syntax, and may be represented, for example, as in Tables 14 and 15.

TABLE 13

| | scan_pos | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| | | | | | | | | | coefficients | | | | | | | |
| | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | | |
| abs_level_gt1_flag | | | | | 0 | 0 | | 1 | | 1 | 1 | 1 | 1 | 1 | | |
| par_level_flag | | | | | | | | 0 | | 1 | 0 | 1 | 0 | 0 | | |
| abs_level_gt3_flag | | | | | | | | | | | | | 1 | 1 | | |
| abs_remainder | | | | | | | | | | | | | 0 | 1 | | |
| dec_abs_level | | | | | | | | | | | | | | | 7 | 10 |
| coeff_sign_flag | 0 | 0 | 0 | 0 | 0 | 1 | 0 | 0 | 0 | 0 | 1 | 1 | 0 | 0 | 1 | 0 |

TABLE 14 transform_unit( )

...
  tu_cbf_luma
...
  if( ... tu_cbf_luma && ( tbWidth <= 32 ) && ( tbHeight <= 32) ... )
    tu_mts_flag
...

TABLE 15 residual_coding(cIdx)

...
  if(( cIdx ! = 0 || ! tu_mts_flag ) && ( log2TbWidth < = 2 ) && (log2TbHeight < = 2 ))
    transform_skip_flag[cIdx]
.../*coefficient parsing */...
  if( tu_mts_flag && cIdx = = 0 )
    mts_idx
...

However, an embodiment of the present document is the unified transform type signaling, and may represent the information about whether to apply the MTS and the information about the transform kernel to be applied by using only one piece of information. For example, the one piece of information may also be represented by information about the unified transform type, and may also be represented by a tu_mts_idx syntax element. In this case, the tu_mts_flag syntax element and the mts_idx syntax element may be omitted. The tu_mts_idx syntax element may be included in the transform unit syntax, and may be represented, for example, as in Table 16.

TABLE 16 transform_unit( )

...
  tu_cbf_luma
...
  if( ... tu_cbf_luma && ( tbWidth < = 32 ) && ( tbHeight < = 32) ... )
    tu_mts_idx
...

The MTS flag (or tu_mts_flag syntax element) is parsed first, and for the Transform Skip (TS) flag (or transform_skip_flag syntax element) followed by the MTS index (or mts_idx syntax element), the tu_mts_idx syntax element, which is a new joint syntax element using Truncated Unary (TU) binarization according to an embodiment of the present document, may be used, instead of performing a fixed length coding having two bins. A first bin may represent the TS, the second MTS, and all of the following MTS indexes.

For example, the semantics and binarization of the tu_mts_idx syntax element may be represented as in Table 17 or Table 18.

TABLE 17

| | Tranform type | | binarization | | |
| --- | --- | --- | --- | --- | --- |
| | | | MTS & TS | MTS | TS |
| tu_mts_idx | horizontal | vertical | enabled | enabled | enabled |
| 0 | DCT-II | DCT-II | 0 | 0 | 0 |
| 1 | SKIP | SKIP | 10 | — | 1 |

TABLE 17-continued

| | Tranform type | | binarization | | |
| --- | --- | --- | --- | --- | --- |
| | | | MTS & TS | MTS | TS |
| tu_mts_idx | horizontal | vertical | enabled | enabled | enabled |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

TABLE 18

| | Tranform type | | binarization | | |
| --- | --- | --- | --- | --- | --- |
| | | | MTS & TS | MTS | TS |
| tu_mts_idx | horizontal | vertical | enabled | enabled | enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

For example, the number of context models may not be changed, and the assignment of ctxInc, which is a context index increment for each bin of the tu_mts_idx syntax element, may be represented as in Table 19.

TABLE 19

| Syntax | binIdx | | | | | |
| --- | --- | --- | --- | --- | --- | --- |
| element | 0 | 1 | 2 | 3 | 4 | >=5 |
| tu_mts_idx (MTS & TS) | 0 | 1 ... 6 (1 + cqtDepth) | 7 | 8 | 9 | na |
| tu_mts_idx (MTS) | 1...6 (1 + cqtDepth) | 7 | 8 | 9 | na | na |
| tu_mts_idx (TS) | 0 | na | na | na | na | na |

Meanwhile, an embodiment of the present document may propose a residual coding method for the transform skip.

For example, the following items may be modified to adapt the residual coding to the statistics and signal characteristics of the transform skip level representing a quantized prediction residual (spatial domain).

(1) No last significant scanning position: since the residual signal reflects the spatial residual after prediction, and energy compaction by the transform is not performed for the Transform Skip (TS), a high probability for trailing zeros or insignificant levels may no longer be provided in the bottom-right corner of the transform block. Accordingly, the signaling of the last significant scanning position may be omitted. Instead, a first sub-block to be processed may be the most bottom-right sub-block within the transform block.

(2) Sub-block CBFs: due to the absence of the signaling of the last significant scanning position, the sub-block CBF signaling having the coded_sub_block_flag syntax element for the TS may be modified as follows.

Due to the quantization, the aforementioned insignificant sequence may still occur locally within the transform block. Accordingly, the last significant scanning position may be eliminated as described above, and the coded_sub_block_flag syntax element may be coded for all of the sub-blocks.

The coded_sub_block_flag syntax element for the sub-block (top-left sub-block) covering a DC frequency position may be represented as a special case. For example, the coded_sub_block_flag syntax element for the corresponding sub-block is not signaled and may always be inferred as 1. When the last significant scanning position is positioned in another sub-block, it may mean that there is at least one significant level outside the DC sub-block (sub-block covering the DC frequency position). As a result, for the DC sub-block, it is inferred that the value of the coded_sub_block_flag syntax element for the corresponding sub-block is 1 but may include only 0/insignificant level. When there is no last scanning position information in the TS, the coded_sub_block_flag syntax element for each sub-block may be signaled. This may include the coded_sub_block_flag syntax element for the DC sub-block, except for the case where the values of all other coded_sub_block_flag syntax elements are already 0. In this case, the value of the coded_sub_block_flag syntax element for the DC sub-block may be inferred as 1 (inferDcSbCbf=1). Since this DC sub-block needs to have at least one significant level, instead of the value of all other sig_coeff_flag syntax elements within the DC sub-block being 0, the sig_coeff_flag syntax element for the first position (0, 0) may not be signaled, and the value of the sig_coeff_flag syntax element may be derived as 1 (inferSbDcSigCoeffFlag=1).

Context modeling for the coded_sub_block_flag syntax element may be changed. The context model index may be calculated by the sum of the coded_sub_block_flag syntax element of the right and the coded_sub_block_flag syntax element of the bottom instead of the current sub-block and the logical disjunction of the two.

(3) Context modeling of the sig_coeff_flag syntax element: the local template of the context modeling of the sig_coeff_flag syntax element may be modified to include the right neighbor ($NB_0$) and the bottom neighbor ($NB_1$) of the current scanning position. A context model offset may be the number of significant neighbor positions sig_coeff_flag[$NB_0$]+sig_coeff_flag[$NB_1$]. Accordingly, selection of other context sets may be eliminated according to the diagonal (d) within the current transform block. This may cause three context models and single context model set for coding the sig_coeff_flag syntax element.

(4) Context modeling of the abs_level_gt1_flag syntax element and the par_level_flag syntax element: the single context model may be used for the abs_level_gt1_flag syntax element and the par_level_flag syntax element.

(5) Coding of the abs_remainder syntax element: generally, the empirical distribution of the transform skip residual absolute levels is still suitable for a laplacian or a geometric distribution, but in stationarity, which is greater than the transform coefficient absolute levels, may exist. Particularly, the variance within the window of continuous realization may be higher for the residual absolute levels. Accordingly, the binarization and context modeling of the abs_remainder syntax element may be modified as follows.

From using a higher cutoff value for binarization, that is, the coding used for the sig_coeff_flag syntax element, the abs_level_gt1_flag syntax element, the par_level_flag syntax element, and the abs_level_gt3_flag syntax element, the dedicated context models for the transition point to a rice code for the abs_remainder syntax element and the position of each bin may cause higher compaction efficiency. An increase in the cutoff may cause a flag "greater than X", for example, such as introducing the abs_level_gt5_flag syntax element and the abs_level_gt7_flag syntax element until reaching the cutoff. The cutoff itself may be fixed to 5 (numGtFlags=5).

The template for deriving a rice parameter may be modified. That is, only the left neighbor and the bottom neighbor of the current scanning position may be considered similarly to the local template for the context modeling of the sig_coeff_flag syntax element.

(6) Context modeling of the coeff_sign_flag syntax element: due to the fact that the in stationarity within the sequence of signs and the prediction residual are frequently biased, the signs may be coded by using the context models even when the global empirical distribution is almost evenly distributed. A single dedicated context model may be used for coding of the sign, and the sign may be parsed after the sig_coeff_flag syntax element in order to keep all of the context coded bins together.

(7) Reduction in the context coded bins: a first scanning pass, that is, the transmission of the sig_coeff_flag syntax element, the abs_level_gt1_flag syntax element, and the par_level_flag syntax element may not be changed. However, the limit on the maximum number of Context Coded Bins (CCBs) per sample may be eliminated, and may be processed differently. The reduction in the CCBs may be secured by designating the mode as CCB>k as invalid. Here, k may be a positive integer. For example, k for the regular level coding mode may be 2, but is not limited thereto. This limit may correspond to the reduction in a quantization space.

For example, the transform skip residual coding syntax may be represented as in Table 20.

TABLE 20

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff   1 << ( log2SbSize << 1 ) | |
|   lastSubBlock = ( 1 << ( log2TbWidth + log2TbHeight − 2 * log2SbSize ) ) − 1 | |
|   /* Loop over subblocks from last  to the top-left (DC) subblock */ | |
|   inferDcSbCbf = 1 | |
|   for( i − lastSubBlock; i >− 0; i  ) } | |
|     xS = DiagScanOrder[ log2TbWidth − log2SbSize ][ log2TbHeight − log2SbSize ][ lastSubBlock ][ 0 ] | |
|     yS − DiagScanOrder[ log2TbWidth  log2SbSize ][ log2TbHeight  log2SbSize ][ lastSubBlock ][ 1 ] | |
|     if( ( i > 0  !infer1)cSbCbf ) | |
|       coded_sub_block_flag[ xS ][ yS ] | ae(v) |
|     if( coded_sub_block_flag[ xS ][ yS ] && i > 0 ) | |
|       inferDcSbCbf = 0 | |
|   } | |

TABLE 20-continued

| | Descriptor |
|---|---|
| ```
/* First scan pass */
inferSbDcSigCoeffFlag - 1
for( n - ( i - - numSbCoeff - 1; n >= 0; n- - ) {
  xC - ( xS << log2SbSize ) | DiagScanOrder[ log2SbSize ][ log2SbSize ][ n ][ 0 ]
  yC - ( yS << lop2SbSize ) + DiagScanOrder[ log2SbSize ][ log2SbSize ][ n ][ 1]
  if( coded_sub_block_flag[ xS ][ yS ]  &&  ( n > 0 |  !inferSbDcSigCoeffFlag ) ) }
    sig_coeff_flag[ xC ][ yC ]
    if( sig_coeff_flag[ xC ][ yC ] )
      interSbDcSigCoeffFlag - 0
  }
  if( sig_coeff_flag[ xC ][ yC ] ) {
    coeff_sign_flag[ n ]
    abs_level_gtX_flag[ n ][ 0 ]
    if( abs  level  gtX  flag[ n ][ 0 ] )
      par_level_flag[ n ]
  }
  AbsLevelPassX[ xC ][ yC ] =
    sig_coeff_flag[ xC ][ yC ] + par_level_flag[ n ] - abs_level_gtX_flag[ n ][ 0]
}
/* Greater than X scan passes (numGtXFlags 5) */
for( i = 1; i  <=  numGtXFlags - 1 && abs_level_gtX_flag[ n ][ i - 1 ] : i-- ) {
  for( n - numSbCoeff  1; n  >-  0; n  ) {
    xC = ( xS << log2SbSize ) + DiagScanOrder[ log2SbSize ][ log2SbSize ][ n ][ 0 ]
    yC - ( yS << log2SbSize ) + DiagScanOrder[ log2SbSize ][ log2SbSize ][ n ][ 1 ]|
    abs_level_gtX_flag[ n ][ i ]
    AbsLevelPassX[ xC ][ yC ] · 2 * abs_level_gtX_flag[ n ][ i ]
  }
}
/* remainder scan pass */
for( n - numSbCoeff 1: n >- 0: n  ) {
  xC - ( xS << log2SbSize ) + DiagScanOrder[ log2SbSize ][ log2SbSize ][ n ][0 ]
  yC = ( yS << log2SbSize ) + DiagScanOrder[ log2SbSize ][ log2SbSize ][ n ][ 1 ]
  if( abs_level_gtX_flag[ n ][ nuinGtXFlags - 1 ] )
    abs_remainder[ n ]
  TransCoeffLevel[ x0 ][ y0 ][ cIdx ][ xC ][ yC ]  - ( 1 - 2 * coeff_sign_flag[ n ] ) *
                                    ( AbsLevelPassX[ xC ][ yC ] · abs_remainder[ n ] )
}
}
}
``` | ae(v)<br><br><br><br><br>ae(v)<br>ae(v)<br><br>ae(v)<br><br><br><br><br><br><br><br>ae(v)<br><br><br><br><br><br><br>ae(v) |

Figure 10:
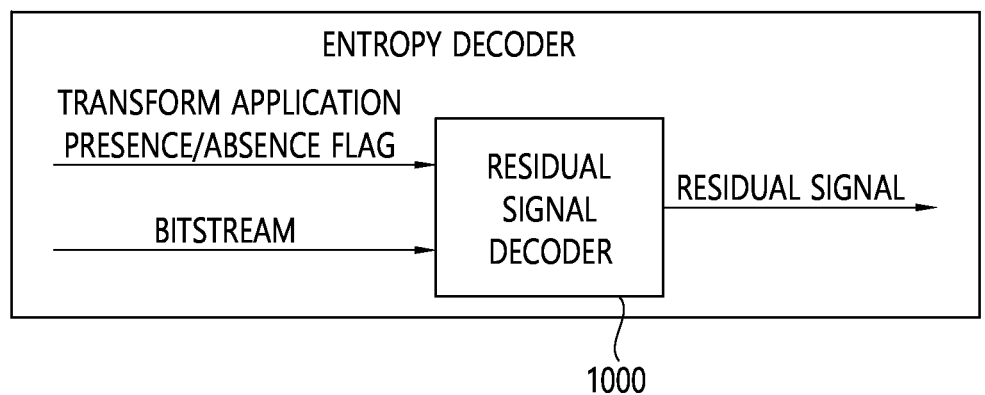
FIG. 10 is a diagram illustrating a residual signal decoder according to an embodiment of the present document.

FIG. 10 is a diagram illustrating a residual signal decoder according to an example of the present document.

Meanwhile, as described with reference to Tables 3 to 5 or Tables 6 to 8, before coding the residual signal, particularly, the residual signal, whether to apply the transform to the corresponding block may be first delivered. By expressing the correlation between the residual signals in the transform domain, data compaction is performed and the compacted data are the decoding apparatus, and if the correlation between the residual signals is insufficient, the data compaction may not occur sufficiently. In this case, the transform process including a complicated calculation process may be omitted, and the residual signal of the pixel domain (spatial domain) may be delivered to the decoding apparatus.

Since the residual signal of the pixel domain which has not been transformed has different characteristics (distribution of the residual signal, the absolute level of each residual signal, and the like) from the residual signal of the general transform domain, the following description proposes a method for coding the residual signal for efficiently delivering such a signal to the decoding apparatus according to an embodiment of the present document.

As illustrated in FIG. 10, a transform application presence/absence flag representing whether the transform is applied to the corresponding transform block and a bitstream (or information about coded binarization code) may be input to a residual signal decoder 1000, and a (decoded) residual signal may be output.

The transform application presence/absence flag may be represented by a transform presence/absence flag, a transform skip presence/absence flag, or a syntax element transform_skip_flag. The coded binarization code may also be input to the residual signal decoder 1000 through the binarization process.

The residual signal decoder 1000 may be included in the entropy decoder of the decoding apparatus. In addition, while the transform application presence/absence flag has been distinguished from the bitstream for convenience of explanation in FIG. 10, the transform application presence/absence flag may be included in the bitstream.

Alternatively, the bitstream may include information about the transform coefficients (when the transform is applied, the syntax element transform_skip_flag=0) or information about (a value of) the residual sample (when the transform is not applied, the transform_skip_flag=1) as well as the transform application presence/absence flag. The information about the transform coefficients may include, for example, information (or syntax elements) illustrated in Tables 3 to 5 or Tables 6 to 9.

The transform skip presence/absence flag may be transmitted in units of transform block, and for example, in Tables 3 to 5, the transform skip presence/absence flag is limited to a specific block size (condition which parses the transform_skip_flag is included only when the size of the transform block is 4×4 or less), but an embodiment may variously configure the size of the block which determines whether to parse the transform skip presence/absence flag. The sizes of log 2TbWidth and log 2TbHeight may be determined by variables wN and hN, and wN and hN may have, for example, one value of the following values illustrated in Equation 6.

$$wN=\{2,3,4,5,6\}$$

$$hN=\{2,3,4,5,6\} \quad \text{Equation 6}$$

For example, the syntax elements to which wN and hN having values according to Equation 6 may be applied may be represented as in Table 21.

TABLE 21

| if( transform_skip_enabled_flag && <br> ( cIdx ! = 0 \| \| cu_mts_flag[ x0 ][ y0 ] = = 0 ) && <br>   ( log2TbWidth <= wN ) && ( log2TbHeight <= hN ) ) <br>     transform_skip_flag[ x0 ][ y0 ][ cIdx ] | ae(v) |
|---|---|

For example, wN and hN may each have a value of 5, in which case the transform skip presence/absence flag may be signaled for the block having a width smaller than or equal to 32 and a height smaller than or equal to 32. Alternatively, wN and hN may each have a value of 6, in which case the transform skip presence/absence flag may be signaled for the block having a width smaller than or equal to 64 and a height smaller than or equal to 64. For example, wN and hN may have values of 2, 3, 4, 5, or 6 as is expressed in Equation 6, have the same values as each other, and also have different values from each other. In addition, the width and height of the block in which the transform skip presence/absence flag may be signaled may be determined based on the values of wN and hN.

As described above, a method of decoding the residual signal may be determined according to the transform skip presence/absence flag. By efficiently processing the signals having different statistical characteristics from each other through the proposed method, it is possible to reduce complexity in the entropy decoding process and to enhance coding efficiency.

Figure 11:
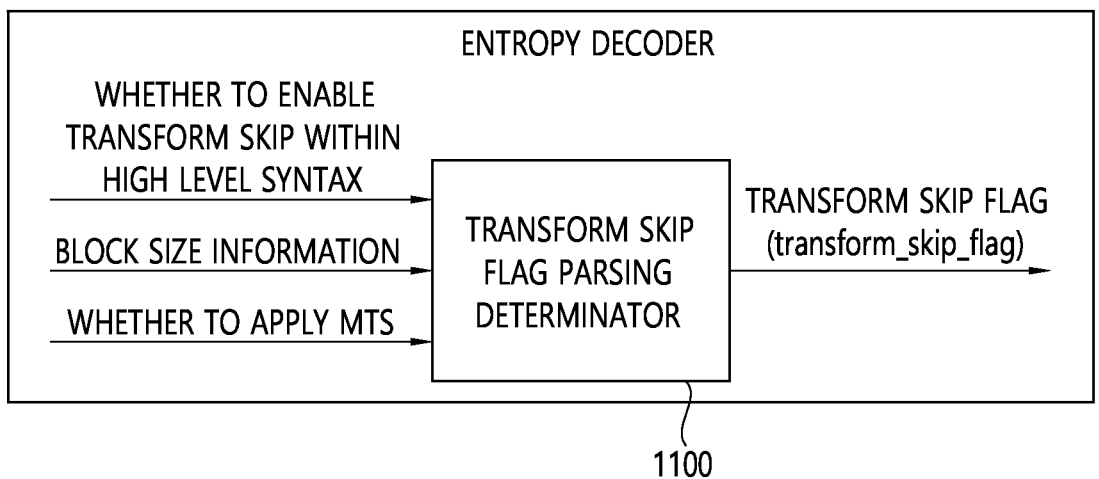
FIG. 11 is a diagram illustrating a transform skip flag parsing determinator according to an embodiment of the present document.

FIG. 11 is a diagram illustrating a transform skip flag parsing determinator according to an embodiment of the present document.

Meanwhile, as described with reference to Tables 3 to 5 or Tables 6 to 9, an embodiment may first deliver whether to apply the transform to the corresponding block before coding the residual signal. By expressing the correlation between the residual signals in the transform domain, data compaction is performed and the compacted data are delivered to the decoder, and if the correlation between the residual signals is insufficient, the data compaction may not occur sufficiently. In this case, the transform process including the complicated calculation process may be omitted and the residual signal of the pixel domain (spatial domain) may be delivered to the decoder. Since the residual signal of the pixel domain which has not been transformed has different characteristics (distribution degree of the residual signal, the absolute level of each residual signal, and the like) from the residual signal of the general transform domain, the following description proposes a method for encoding the residual signal for efficiently delivering such a signal to the decoder.

The transform skip presence/absence flag may be transmitted in units of transform block, and for example, signaling of the transform skip presence/absence flag is limited to the size of a specific block (condition of parsing the transform_skip_flag is included only when the size of the transform block is 4×4 or less), but an embodiment may define the condition of determining whether to parse the transform skip presence/absence flag as the number of pixels or samples within the block rather than the information about the width or height of the block. That is, the condition of determining whether to parse the transform skip presence/absence flag may be defined as using the product of log 2TbWidth and log 2TbHeight among the conditions used to parse the transform skip presence/absence flag (for example, syntax element transform_skip_flag). Alternatively, the transform skip presence/absence flag may be parsed based on the product of the width (for example, log 2TbWidth) and height (for example, log 2TbHeight) of the block. Alternatively, whether to parse the transform skip presence/absence flag may be determined according to a value obtained by the product of the width (for example, log 2TbWidth) and height (for example, log 2TbHeight) of the block. For example, the log 2TbWidth and the log 2TbHeight may have one value of the following values illustrated in Equation 7.

$$\log 2\text{TbWidth}=\{1,2,3,4,5,6\}$$

$$\log 2\text{TbHeight}=\{1,2,3,4,5,6\} \quad \text{Equation 7}$$

According to an embodiment, when whether to parse the transform skip presence/absence flag is determined based on the number of samples within the block, blocks of various shapes may be included in a transform exclusion block (in which the transform skip presence/absence flag is not parsed) rather than determining whether to parse the transform skip presence/absence flag based on the width and height of the block.

For example, when all of the log 2TbWidth and the log 2TbHeight are defined as 2, only blocks of 2×4, 4×2, and 4×4 may be included in the transform exclusion block, but when controlled by the number of samples, the block in which the number of samples is 16 or less within the block is included in the transform exclusion block, such that the blocks of 2×8 and 8×2 sizes as well as the blocks of 2×4, 4×2, and 4×4 may also be included in the transform exclusion block.

A method of decoding the residual signal may be determined according to the transform skip presence/absence flag, and by efficiently processing the signals having different statistical characteristics according to the aforementioned embodiment, it is possible to reduce complexity in the entropy decoding process and to enhance coding efficiency.

For example, as illustrated in FIG. 11, information about whether to enable the transform skip within the high level syntax, block size information, and information about whether to apply the Multiple Transform Selection (MTS) may be input to the transform skip flag parsing determinator 1100, and the transform skip flag may be output. Alternatively, the information about whether to enable the transform skip within the high level syntax and the block size information may be input to the transform skip flag parsing determinator, and the transform skip flag may also be output based on the information. That is, the transform skip flag may be output (or parsed) based on the block size information, when the transform skip is enabled according to the information about whether to enable the transform skip within the high level syntax. The aforementioned information may be included in the bitstream or the syntax. The transform skip flag parsing determinator 1100 may be included in the entropy decoder of the decoding apparatus. For example, a method in which the transform skip flag is determined based on the aforementioned information may be as follows.

Figure 12:
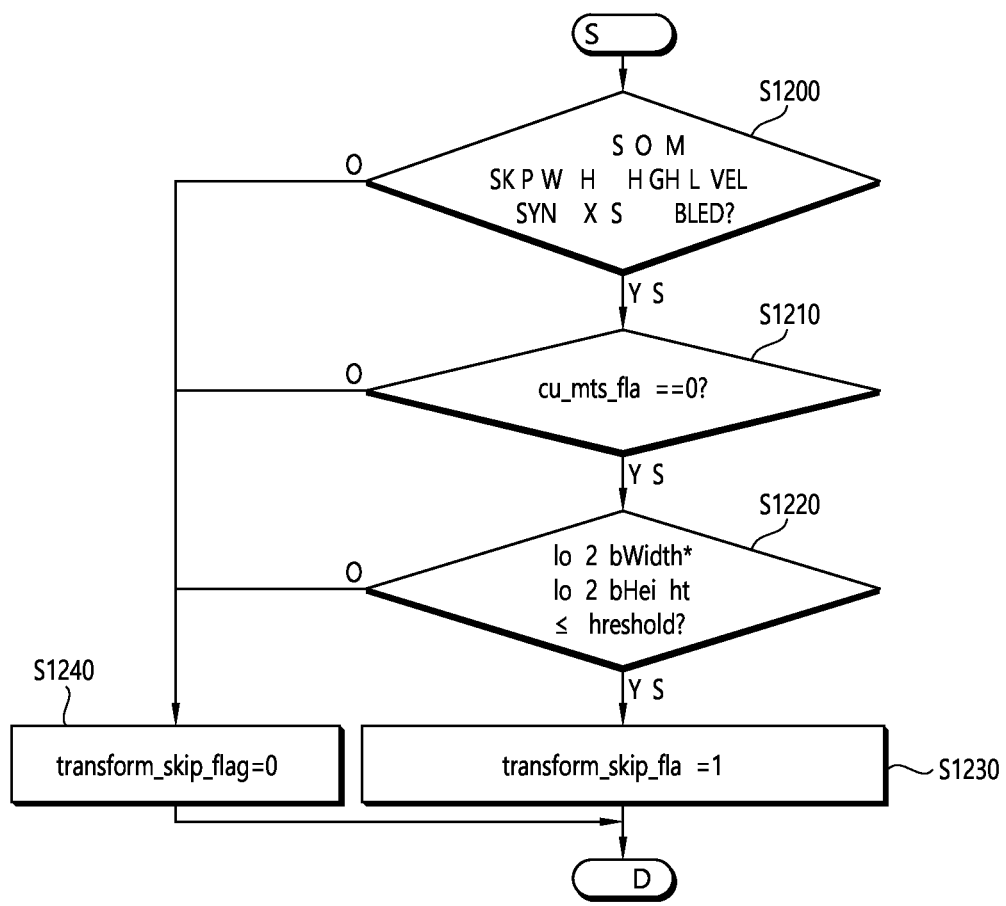
FIG. 12 is a flowchart for explaining a method for coding a transform skip presence/absence flag according to an embodiment of the present document.

FIG. 12 is a flowchart for explaining a method for coding the transform skip presence/absence flag according to an embodiment of the present document.

The aforementioned embodiment will be described again with reference to FIG. 12 as follows.

First, whether the transform skip within the high level syntax is enabled may be determined (S1200). For example, whether the transform skip within the high level syntax is enabled may be determined based on the information about whether to enable the transform skip within the high level syntax (for example, transform_skip_enabled_flag syntax element). For example, the information about whether to enable the transform skip (for example, transform_skip_enabled_flag syntax element) may be signaled based on a sequence parameter set (SPS). Alternatively, the information about whether to enable the transform skip may be signaled by being included in the SPS syntax. Alternatively, the information about whether to enable the transform skip may also be signaled based on a picture parameter set (PPS) or signaled by being included in the PPS syntax, but the present document is not limited thereto. Here, the fact that the transform skip within the high level syntax is enabled may represent that the transform skip is enabled for the slice/block referring to the corresponding high level syntax. Whether the transform skip is substantially applied to the block in which the transform skip is enabled may be determined based on the aforementioned transform skip flag.

For example, when the transform skip within the high level syntax is enabled, whether the value of the cu_mts_flag syntax element within the syntax is 0 may be determined (S1210). For example, whether the value of the cu_mts_flag syntax element is 0 may be determined based on the information about whether to enable the Multiple Transform Selection (MTS). Alternatively, the information about whether to enable the MTS may be determined based on the sps_mts_enabled_flag syntax element.

For example, when the value of the cu_mts_flag syntax element is 0, whether the product of log 2TbWidth and log 2TbHeight is smaller than or equal to a threshold may be determined (S1220). Alternatively, whether a value obtained by the product of a log value having a base 2 of the width of the current block and a log value having a base 2 of the height of the current block is smaller than the threshold may be determined. Alternatively, whether a value obtained by the product of the width and height of the current block is smaller than the threshold may be determined. For example, whether the product of log 2TbWidth and log 2TbHeight is smaller than or equal to the threshold may be determined based on the block size information. The block size information may include the information about the width and height of the current block. Alternatively, the block size information may include information about log values having a base 2 of the width and height of the current block.

For example, when the product of log 2TbWidth and log 2TbHeight is smaller than or equal to the threshold, the value of the transform skip presence/absence flag (or transform_skip_flag syntax element) may be determined as 1 (S1230). Alternatively, the transform skip presence/absence flag having the value of 1 may be parsed. Alternatively, for example, when the product of log 2TbWidth and log 2TbHeight is smaller than or equal to the threshold according to the setting or the condition, the value of the transform skip presence/absence flag (or transform_skip_flag syntax element) may be determined as 0. Alternatively, the transform skip presence/absence flag having the value of 0 may be parsed. Alternatively, the transform skip presence/absence flag may not be parsed. That is, the determined value of the transform skip presence/absence flag may be changed according to the setting or the condition as an example. That is, the transform skip presence/absence flag may represent the information that the transform skip is applied to the current block when the product of log 2TbWidth and log 2TbHeight is smaller than or equal to the threshold. Alternatively, the current block may be included in the transform exclusion block based on the transform skip presence/absence flag, and the transform is not applied to the current block.

For example, the value of the transform skip presence/absence flag (or transform_skip_flag syntax element) may be determined as 0, when the transform skip within the high level syntax is not enabled, when the value of the cu_mts_flag syntax element is not 0, or when the product of log 2TbWidth and log 2TbHeight is greater than the threshold (S1240). Alternatively, the transform skip presence/absence flag having the value of 0 may be parsed. Alternatively, the transform skip presence/absence flag may not be parsed. Alternatively, for example, the value of the transform skip presence/absence flag (or transform_skip_flag syntax element) may be determined as 1, when the transform skip within the high level syntax is not enabled, when the value of the cu_mts_flag syntax element is not 0, and when the product of log 2TbWidth and log 2TbHeight is greater than the threshold according to the setting or the condition. Alternatively, the transform skip presence/absence flag having a value of 1 may be parsed. That is, the determined value of the transform skip presence/absence flag is an example, and may be changed according to the setting or the condition. That is, when the transform skip within the high level syntax is not enabled, when a value of the cu_mts_flag syntax element is not 0, and when the product of log 2TbWidth and log 2TbHeight is greater than the threshold, the transform skip presence/absence flag may represent information that the transform skip is not applied to the current block. Alternatively, the current block may not be included in the transform exclusion block based on the transform skip presence/absence flag, and may be transformed.

Alternatively, for example, the cu_mts_flag syntax element may also be represented by an MTS tu_mts_flag syntax element or an mts_flag_syntax element, and the sps_mts_intra_enabled_flag syntax element (or sps_explicit_mts_intra_enabled_flag syntax element) or the sps_mts_inter_enabled_flag syntax element (or sps_explicit_mts_inter_enabled_flag syntax element) may be signaled (by being included in the SPS syntax) based on the sps_mts_enabled_flag syntax element.

Meanwhile, another embodiment of the present document proposes a method for defining the transform skip size when using a transform kernel index including the transform presence/absence information.

Since the block which has not been transformed (or transform coded) has different characteristics of the residual data from the block which has been transformed generally, an efficient residual data coding method for the block which has not been transformed may be required. The transform presence/absence flag representing whether to perform the transform may be transmitted in units of transform block or transform unit, and the present document does not limit the size of the transform block. For example, when the transform presence/absence flag is 1, the residual (data) coding (for example, Table 20 and residual coding for the transform skip) proposed in the present document may be performed, and when the transform presence/absence flag is 0, the residual coding as in Tables 3 to 5 or Tables 6 to 9 may be performed. For example, the transform presence/absence flag may include the transform_skip_flag syntax element included in the residual coding syntax or the transform unit syntax. In addition, when the value of the transform_skip_flag syntax element is 1, the residual coding method (for the transform skip) proposed in an embodiment of the present document may be performed.

Alternatively, for example, when the value of the transform_skip_flag syntax element is 1, the residual coding in which the transform is not performed may also be performed based on the transform skip residual coding (residual_ts_coding) syntax according to an if (!transform_skip_flag) condition. Alternatively, when the value of the transform_skip_flag syntax element is 0, the residual coding in which the transform is performed based on the residual coding (residual_coding) syntax may be performed according to the if (!transform_skip_flag) condition.

Alternatively, for example, the residual coding which excludes the coeff_sign_flag syntax element below the coded_sub_block_flag syntax element may follow some or all of the residual coding method (for the transform skip) proposed in an embodiment of the present document.

Alternatively, for example, the unified transform type signaling method proposed in an embodiment of the present document may be performed, and at this time, when the value of the tu_mts_idx syntax element is 1 (or when the tu_mts_idx syntax element represents information that the transform is not applied to the target block, the residual coding method (for the transform skip) proposed in an embodiment of the present document may be performed. Alternatively, when the value of the tu_mts_idx syntax element is 0 (or when the value of the tu_mts_idx syntax element is a value other than 1), the residual coding as in Tables 3 to 5 or Tables 6 to 9 or the residual coding in which the transform is performed based on the residual coding (residual_coding) syntax may be performed. In this case, as described with the unified transform type signaling method proposed in an embodiment of the present document, the transform presence/absence flag (or transform_skip_flag syntax element) and/or the transform index (or mts_idx syntax element) may be omitted in Tables 3 to 5.

Alternatively, for example, assuming that the tu_mts_idx syntax element having the value of 0 represents that the transform is not applied (or transform skip) to the target block, the residual coding method (for the transform skip) proposed in an embodiment of the present document may be performed, when the value of the tu_mts_idx syntax element is 0. Alternatively, when the value of the tu_mts_idx syntax element is not 0, the residual coding in which the transform is performed based on the residual coding (residual_coding) syntax may be performed as in Tables 3 to 5 or Tables 6 to 9. In this case, the transform presence/absence flag (or transform_skip_flag syntax element) and/or the transform index (or mts_idx syntax element) may be omitted. In this case, the "tu_mts_idx==1?" determination procedure or condition may be replaced with the "tu_mts_idx==0?" determination procedure or condition.

As described with the unified transform type signaling method proposed in an embodiment of the present document, the binarization for the transform presence/absence flag (or transform_skip_flag syntax element) or the transform index (or mts_idx syntax element) may be each defined differently, for example, in the case of the MTS & TS enabled, the MTS enabled, and the TS enabled as in Table 17 or Table 18. Alternatively, the size at which the transform skip is defined (or the size capable of the transform skip) may also be defined differently according to whether the value of the mts_enabled is 0 or 1. Alternatively, the size capable of the transform skip may also be defined based on the MTS enabled (or information about whether the MTS is enabled). For example, the MTS enabled may represent the information about whether the MTS is enabled, and may be derived based on the sps_mts_enabled_flag syntax element. For example, the fact that the value of the MTS enabled is 1 may represent that the value of the sps_mts_enabled_flag syntax element is 1. Alternatively, the fact that the value of the MTS enabled is 1 may also represent information that the MTS is enabled. Alternatively, the fact that the value of the MTS enabled is 0 may represent that the value of the sps_mts_enabled_flag syntax element is 0. Alternatively, the fact that the value of the MTS enabled is 0 may also represent information that the MTS is not enabled.

For example, when the value of the MTS enabled is 1, the size of the transform skip (or the block size capable of the transform skip) may be dependent on the enabled MTS. For example, if the size of the MTS is enabled at 32 or less (or if the MTS is enabled only when the block size is 32 or less), the transform skip may be always defined for the block having the size of 32 or less in the same manner as above.

Alternatively, for example, when the value of the MTS enabled is 1, the encoding apparatus and the decoding apparatus may use a predetermined or preset maximum size. In addition, the TS enabled may be defined according to the maximum size. For example, the encoding apparatus and the decoding apparatus may be defined to use the transform skip for the block having a length of one side which is smaller than or equal to 8. In this case, the value of the TS enabled is defined as 0 with respect to the block having a length of one side of the block which is greater than 8, thereby effectively applying the binarization table illustrated in Table 17 or Table 18. Alternatively, the maximum size information of the transform skip block (or capable of the transform skip) may also be represented by using the maximum number of samples rather than the maximum length of one side of the block.

Alternatively, for example, when the value of the MTS enabled is 1, the maximum size of the transform skip (or block capable of the transform skip) may be defined separately from the size of the MTS (or the block size in which the MTS is enabled). In this case, the information about the size of the transform skip (or block capable of the transform skip) may be signaled to define the size of the MTS (or the block size in which the MTS is enabled). Alternatively, the information may be transmitted from the encoding apparatus to the decoding apparatus. For example, if the size of the MTS is enabled at 32 or less (or if the MTS is enabled only when the block size is 32 or less), a flag about whether to follow the size of the MTS (or the block size at which the MTS is enabled) may be signaled, and in the case of not following the maximum size of the MTS (or the maximum size of the block at which the MTS is enabled), the information for enabling the maximum size of the transform skip (or block capable of the transform skip) up to 16 may be signaled. In this case, when the length of one side of the block is 16 or more, the value of the TS enabled is defined as 0, thereby effectively applying the binarization table illustrated in Table 17 or Table 18. Alternatively, the maximum size information of the transform skip block (or capable of the transform skip) may also be represented by using the maximum number of samples rather than the maximum size of one side of the block.

Alternatively, for example, when the value of the MTS enabled is 0, the encoding apparatus and the decoding apparatus may use a predetermined or preset maximum size. For example, when the value of the MTS enabled is 0 and the value of the TS enabled is 1, the encoding apparatus and the decoding apparatus may be defined to use the transform skip for the block having a length of one side which is smaller than or equal to 8. Alternatively, the maximum size information of the transform skip block (or capable of the transform skip) may also be represented by using the maximum number of samples rather than the maximum size of one side of the block.

Alternatively, for example, when the value of the MTS enabled is 0, the maximum size information of the transform skip (or block capable of the transform skip) may be transmitted. For example, the information which enables the maximum size of the transform skip (or block capable of the transform skip) up to 16 may be signaled by the high level syntax. In this case, when the length of one side of the block is 16 or more, the value of the TS enabled is defined as 0, thereby effectively applying the binarization table illustrated in Table 17 or Table 18. Alternatively, the maximum size information of the transform skip block (or capable of the transform skip) may be represented by using the maximum number of samples rather than the maximum size of one side of the block.

For example, the tu_mts_idx syntax element may be encoded/decoded based on the aforementioned CABAC. In this case, the bin string of the tu_mts_idx syntax element may include, for example, bins as illustrated in Table 17 or Table 18. At least one of the bins of the bin string of the tu_mts_idx syntax element may be coded (or regular-coded) based on the context information (or context model).

A context index representing the context model for each of the regular-coded bins may be derived based on a context index increment and a context index offset. Alternatively, for example, the context index may be represented by ctxIdx, the context index increment may be represented by ctxInc, and the context index offset may be represented by ctxIdxOffset. In addition, the ctxIdx may be derived by the sum of the ctxInc and the ctxIdxOffset. For example, the ctxInc may be derived differently for each bin as illustrated in Table 19. The ctxIdxOffset may represent the lowest value of the ctxIdx. Alternatively, for example, the context index may be determined based on coded quad-tree depth (cqtDepth) as illustrated in Table 19. Alternatively, for example, the context index may be determined according to the block size, the ratio of the width-to-the height of the block, whether to perform the intra or inter prediction of the block, whether to apply the transform skip to the neighbor, or the like.

For example, when the block size is smaller than 8×8, the context model of an index 0 may be used, and when the block size is greater than or equal to 8×8, the context model of an index 1 may be used.

Alternatively, for example, when the ratio of the width-to-height of the block is 1, the context model of the index 0 may be used, when the width of the block is greater than the height of the block, the context model of the index 1 may be used, and when the height of the block is greater than the width of the block, the context model of an index 2 may be used. In this case, for example, the context index which is determined based on the width and height of the block may be as illustrated in Table 22 below.

TABLE 22

| Syntax element | binIdx | | | | | |
|---|---|---|---|---|---|---|
| | 0 | 1 | 2 | 3 | 4 | >=5 |
| tu_mts_idx (MTS & TS) | (cbWidth == cbHEight) ? 0: ((cbWidth > cbHEight) ? 1:2) | 3 ... 8 (1 + cqtDepth) | 9 | 10 | 11 | na |

TABLE 22-continued

| Syntax element | binIdx | | | | | |
|---|---|---|---|---|---|---|
| | 0 | 1 | 2 | 3 | 4 | >=5 |
| tu_mts_idx (MTS) | 1 ... 6 (1 + cqtDepth) | 7 | 8 | 9 | na | na |
| tu_mts_idx (TS) | (cbWidth == cbHeight) ? 0: ((cbWidth > cbHEight) ? 1:2) | na | na | na | na | na |

Alternatively, for example, when the prediction mode of the current block is the intra mode, the context model of the index 0 may be used, and when the prediction mode of the current block is the inter mode, the context model of the index 1 may be used.

For example, the tu_mts_idx syntax element may be coded by using the context model according to the index determined as described above. Since the context model and the number of models may be variously defined based on probability and distribution, the present document is not limited to the specific context model and the number of context models.

For example, the index may represent the context index, the index 0 may represent that the ctxIdx value is 0, and the index 1 may represent that the ctxIdx value is 1.

For example, the lowest value of the ctxIdx may be represented by an initial value (initValue) of the ctxIdx, and the initial value of the ctxIdx may be determined based on the context table. Alternatively, the initial value of the ctxIdx may be determined by using the context table and an initial type (initType). The initial type may be determined in advance. Alternatively, the initial type may also be determined by signaling the related information. For example, the initial type may be signaled by the initial type information (for example, cabac_init_flag syntax element or cabac_init_idx syntax element).

That is, the bins of the bin string of the tu_mts_idx syntax element may be context based coded (or regular-coded) based on the context model for the respective bins. In this case, the context model may be derived by the sum of the ctxInc and the ctxIdxOffset. In addition, the ctxInc may be determined differently for each bin.

For example, the encoding apparatus may encode the bins by deriving the value of the tu_mts_idx syntax element, deriving the binarization bins corresponding to the value through the binarization procedure, and deriving the context model for each of the bins. In this case, a bit string having a length which is equal to or shorter than the lengths of the bins may be output according to the arithmetic coding based on the context model.

For example, the decoding apparatus may decode the bins for the tu_mts_idx syntax element by deriving candidate bin strings through the binarization procedure for the tu_mts_idx syntax element, and sequentially parsing bits for the tu_mts_idx syntax element from the bitstream. In this case, the decoding apparatus may decode the bins by deriving the context model for each of the bins. It may be determined whether the decoded bins correspond to one of the candidate bin strings. When the decoded bins correspond to one of the candidate bin strings, the decoding apparatus may derive a value represented by the corresponding bin string as the value of the tu_mts_idx syntax element. When the decoded bins do not correspond to one of the candidate bin strings, the decoding apparatus may additionally parse the bit and repeat the aforementioned procedure.

As described above, an embodiment of the present document may differently determine the ctxInc and/or the ctxIdx based on at least one of the block size, the ratio of the width-to-height of the block, whether to perform the intra or inter prediction of the block, whether to apply the transform skip to the neighbor, or the like in coding the tu_mts_idx syntax element, and in this case, a different context model may be adaptively applied to the bin of the same bin index (binIdx) without signaling additional information.

For example, first context information may be derived for the i-th bin for a first block within the current picture, and second context information may be derived for the same i-th bin for a second block within the current picture. Here, i may correspond to a bin index, and may represent, for example, one value of 0 to 4 as illustrated in Table 19 or Table 22. For example, the context information may include the information about the context index or the context model.

Meanwhile, for example, at least some of the information according to the aforementioned embodiments of the present document may be included in the high level syntax as illustrated in Tables 23 to 27. Alternatively, at least some of the information according to the aforementioned embodiments of the present document may be signaled by being included in the high level syntax. Alternatively, at least some of the information according to the aforementioned embodiments may be included in a sequence parameter set (SPS) syntax. Alternatively, at least some of the information according to the aforementioned embodiments may be signaled by being included in the SPS syntax. For example, Tables 23 to 27 may consecutively represent one syntax, and the syntax elements included in the syntax may be sequentially signaled, configured, or parsed.

TABLE 23

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag |  |
|     profile_tier_level( 1, sps_max_sublayers_minus1 ) |  |
|   gdr_enabled_flag | u(1) |
|   sps_seq_parameter_set_id | u(4) |
|   chroma_format_idc | u(2) |
|   if( chroma_format_idc = = 3 ) |  |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   subpics_present_flag | u(1) |
|   if( subpics_present_flag ) { |  |
|     sps_num_subpics_minus1 | u(8) |
|     for( i = 0; i <= sps_num_subpics_minus1; i-+ ) { |  |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } |  |
|   } |  |
|   sps_subpic_id_present_flag | u(1) |
|   if( sps_subpics_id_present_flag ) { |  |
|     sps_subpic_id_signalling_present_flag | u(1) |
|     if( sps_subpics_id_signalling_present_flag ) { |  |

TABLE 24

|  | |
|---|---|
|       sps_subpic_id_len_minus1 | ue(v) |
|       for( i = 0; i <= sps_num_subpics_minus1: i | · ) |  |
|         sps_subpic_id[ i ] | u(v) |
|     } |  |
|   } |  |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) |  |
|   poc_msb_len_minus1 | ue(v) |
| if( sps_max_sublayers_minus1 > 0 ) |  |
|   sps_sublayer_dpb_params_flag | u(1) |
| if( sps_ptl_dpb_hrd_params_present_flag ) |  |
|   dpb_parameters( 0, sps_max_sublayers_minus1, sps_sublayer_dpb_params_flag |  |
| ) |  |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { |  |
|   num_ref_pic_lists_in_sps[ i ] | ue(v) |
|   for( j = 0, j < num_ref_pic_lists_in_sps[ i ]; j++) |  |
|     ref_pic_list_struct( i, j ) |  |
| } |  |
| if( ChromaArrayType != 0 ) |  |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |

TABLE 24-continued

```
if( sps_max_mtt_hierarchy_depth_intra_slice_luma != 0 ) {
    sps_log2_diff_max_bt_min_qt_intra_slice_luma                        ue(v)
    sps_log2_diff_max_tt_min_qt_intra_slice_luma                        ue(v)
}
if( sps_max_mtt_hierarchy_depth_inter_slice != 0 ) {
    sps_log2_diff_max_bt_min_qt_inter_slice                             ue(v)
    sps_log2_diff_max_tt_min_qt_inter_slice                             ue(v)
}
if( qtbtt_dual_tree_intra_flag ) {
    sps_log2_diff_min_qt_min_cb_intra_slice_chroma                      ue(v)
    sps_max_mtt_hierarchy_depth_intra_slice_chroma                      ue(v)
    if( sps_max_mtt_hierarchy_depth_intra_slice_chroma != 0 ) {
        sps_log2_diff_max_bt_min_qt_intra_slice_chroma                  ue(v)
        sps_log2_diff_max_tt_min_qt_intra_slice_chroma                  ue(v)
    }
```

TABLE 25

```
    }
}
sps_max_luma_transform_size_64_flag                                     u(1)
sps_joint_cbcr_enabled_flag                                             u(1)
if( ChromaArrayType != 0 ) {
    same_qp_table_for_chroma                                            u(1)
    numQpTables = same_qp_table_for_chroma ? 1 : ( spa_joint_cbcr_enabled_flag ? 3 : 2 )
    for( i = 0; i < numQpTables; i++) {
        qp_table_start_minus26[ i ]                                     se(v)
        num_points_in_qp_table_minus1[ i ]                              ue(v)
        for( j = 0; j <= num_points_in_qp_table_minus1[ i ]; j++ ) {
            delta_qp_in_val_minus1[ i ][ j ]                            ue(v)
            delta_qp_diff_val[ i ][ j ]                                 ue(v)
        }
    }
}
sps_sao_enabled_flag                                                    u(1)
sps_alf_enabled_flag                                                    u(1)
sps_transform_skip_enabled_flag                                         u(1)
if( sps_transform_skip_enabled_flag )
    sps_bdpcm_enabled_flag                                              u(1)
if( sps_bdpcm_enabled_flag && chroma_format_idc == 3 )
    sps_bdpcm_chroma_enabled_flag                                       u(1)
sps_ref_wraparound_enabled_flag                                         u(1)
if( sps_ref_wraparound_enabled_flag )
    sps_ref_wraparound_offset_minus1                                    ue(v)
sps_temporal_mvp_enabled_flag                                           u(1)
if( sps_temporal_mvp_enabled_flag )
    sps_sbtmvp_enabled_flag                                             u(1)
sps_amvr_enabled_flag                                                   u(1)
sps_bdof_enabled_flag                                                   u(1)
if( sps_bdof_enabled_flag )
    sps_bdof_pic_present_flag                                           u(1)
sps_smvd_enabled_flag                                                   u(1)
sps_dmvr_enabled_flag                                                   u(1)
if( sps_dmvr_enabled_flag)
    sps_dmvr_pic_present_flag                                           u(1)
sps_mmvd_enabled_flag                                                   u(1)
sps_isp_enabled_flag                                                    u(1)
sps_mrl_enabled_flag                                                    u(1)
sps_mip_enabled_flag                                                    u(1)
if( ChromaArrayType != 0 )
    sps_cclm_enabled_flag                                               u(1)
if( chroma_format_idc == 1 ) {
    sps_chroma_horizontal_collocated_flag                               u(1)
    sps_chroma_vertical_collocated_flag                                 u(1)
}
sps_mts_enabled_flag                                                    u(1)
```

TABLE 26

```
if( sps_mts_enabled_flag ) {
    sps_explicit_mts_intra_enabled_flag                                        u(1)
    sps_explicit_mts_inter_enabled_flag                                        u(1)
}
sps_sbt_enabled_flag                                                           u(1)
sps_affine_enabled_flag                                                        u(1)
if( sps_affine_enabled_flag) {
    sps_affine_type_flag                                                       u(1)
    sps_affine_amvr_enabled_flag                                               u(1)
    sps_affine_prof_enabled_flag                                               u(1)
    if( sps_affine_prof_enabled_flag )
        sps_prof_pic_present_flag                                              u(1)
}
if( chroma_format_idc = = 3 ) {
    sps_palette_enabled_flag                                                   u(1)
    sps_act_enabled_flag                                                       u(1)
}
sps_bcw_enabled_flag                                                           u(1)
sps_ibc_enabled_flag                                                           u(1)
sps_ciip_enabled_flag                                                          u(1)
if( sps_mmvd_enabled_flag )
    sps_fpel_mmvd_enabled_flag                                                 u(1)
sps_triangle_enabled_flag                                                      u(1)
sps_lmcs_enabled_flag                                                          u(1)
sps_lfnst_enabled_flag                                                         u(1)
sps_ladf_enabled_flag                                                          u(1)
if( sps_ladf_enabled_flag ) {
    sps_num_ladf_intervals_minus2                                              u(2)
    sps_ladf_lowest_interval_qp_offset                                         se(v)
    for( i = 0; i < sps_num_ladf_intervals_minus2 + 1; i++ ) {
        sps_ladf_qp_offset[ i ]                                                se(v)
        sps_ladf_delta_threshold_minus1[ i ]                                   ue(v)
    }
}
sps_sealing_list_enabled_flag                                                  u(1)
sps_loop_filter_across_virtual_boundaries_disabled_present_flag                u(1)
if( sps_loop_filter_across_virtual_boundaries_disabled_present_flag ) {
    sps_num_ver_virtual_boundaries                                             u(2)
    for( i = 0; i < sps_num_ver_virtual_boundaries; i++ )
        sps_virtual_boundaries_pos_x[ i ]                                      u(13)
    sps_num_hor_virtual_boundaries                                             u(2)
    for( i = 0; i < sps_num_hor_virtual_boundaries; i-+ )
        sps_virtual_boundaries_pos_y[ i ]                                      u(13)
}
if( sps_ptl_dpb_hrd_params_present_flag ) {
    sps_general_hrd_params_present_flag
    if( sps_general_hrd_params_present_flag ) {                                u(1)
        general_hrd_parameters( )
```

TABLE 27

```
        if( sps_max_sublayers_minus1 > 0 )
            sps_sublayer_cpb_params_present_flag                               u(1)
        firstSubLayer = sps_sublayer_cpb_params_present_flag ? 0 :
            sps_max_sublayers_minus1
        ols_hrd_parameters( firstSubLayer, sps_max_sublayers_minus1 )
    }
}
field_seq_flag                                                                 u(1)
vui_parameters_present_flag                                                    u(1)
if( vui_parameters_present_flag )
    vui_parameters( ) /* Specified in ITU-T H.SEI | ISO/IEC 23002-7 */
sps_extension_flag                                                             u(1)
if( sps_extension_flag )
    while( more_rbsp_data( ) )
        sps_extension_data_flag                                                u(1)
rbsp_trailing_bits( )
}
```

For example, as illustrated in Tables 23 to 27, the information represented by the syntax elements included in the SPS syntax or semantics of the syntax elements may be represented as in Tables 28 to 35.

TABLE 28

Sequence parameter set RBSP semantics sps_seq_parameter_set_id provides an identifier for the SPS for reference by other syntax elements. The value of sps_seq_parameter_set_id shall be in the range of 0 to 15, inclusive.
intra_only_constraint_flag equal to 1 specifies that it is a requirement of bitstream conformance that tile_group_type shall be equal to 1. intra_only_constraint_flag equal to 0 does not impose a constraint.
max_bitdepth_constraint_idc specifies that it is a requirement of bitstream conformance that bit_depth_luma_minus8 and bit_depth_chroma_minus8 shall be in the range of 0 to max_bitdepth_constraint_idc, inclusive.
max_chroma_format_constraint_idc specifies that it is a requirement of bitstream conformance that chroma_format_idc shall be in the range of 0 to max_chroma_format_constraint_idc, inclusive.
frame_only_constraint_flag equal to 1 specifies that it is a requirement of bitstream conformance that the CVS conveys pictures that represent fames. frame_only_constraint_flag equal to 0 does not impose a constraint.
no_qtbtt_dual_tree_intra constraint_flag equal to 1 specifies that it is a requirement of bitstream conformance that qtbtt_dual_tree_intra_flag shall be equal to 0. no_qtbtt_dual_tree_intra constraint_flag equal to 0 does not impose a constraint.
no_sao_constraint_flag equal to 1 specifies that it is a requirement of bitstream conformance that sps_sao_enabled_flag shall be equal to 0. no_sao_constraint_flag equal to 0 does not impose a constraint.
no_alf_constraint_flag equal to 1 specifies that it is a requirement of bitstream conformance that sps_alf_enabled_flag shall be equal to 0. no_alf_constrain_flag equal to 0 does not impose a constraint.
no_pcm_constraint_flag equal to 1 specifies that it is a requirement of bitstream conformance that pcm_enabled_flag shall be equal to 0. no_pcm_constraint_flag equal to 0 does not impose a constraint.
no_temporal_mvp_constraint_flag equal to 1 specifies that it is a requirement of bitstream conformance that sps_temporal_mvp_enabled_flag shall be equal to 0. no_temporal_mvp_constraint_flag equal to 0 does not impose a constraint.
no_sbtmvp_constraint_flag equal to 1 specifies that it is a requirement of bitstream conformance that sps_sbtmvp_enabled_flag shall be equal to 0. no_sbtmvp_constraint flag equal to 0 does not impose a constraint.
no_amvr_constraint_flag equal to 1 specifies that it is a requirement of bitstream conformance that sps_amvr_enabled_flag shall be equal to 0. no_amvr_constraint_flag equal to 0 does not impose a constraint.
no_cclm_constraint_flag equal to 1 specifies that it is a requirement of bitstream conformance that sps_cclm_enabled_flag shall be equal to 0. no_cclm_constraint_flag equal to 0 does not impose a constraint.
no_affine_motion_constraint_flag equal to 1 specifies that it is a requirement of bitstream conformance that sps_affine_enabled_flag shall be equal to 0. no_affine_motion_constraint_flag equal to 0 does not impose a constraint.
no_ladf_constraint_flag equal to 1 specifies that it is a requirement of bitstream conformance that sps_ladf_enabled_flag shall be equal to 0. no_ladf_constraint_flag equal to 0 does not impose a constraint.
no_dep_quant_constraint_flag equal to 1 specifies that it is a requirement of bitstream conformance that dep_quant_enabled_flag shall be equal to 0. no_dep_quant_constraint_flag equal to 0 does not impose a constraint.
no_sign_data_hiding_constraint_flag equal to 1 specifies that it is a requirement of bitstream conformance that sign_data_hiding_enabled_flag shall be equal to 0. no_sign_data_hiding_constraint_flag equal to 0 does not impose a constraint.
chroma_format_idc specifies the chroma sampling relative to the luma sampling as specified in clause 6.2. The value of chroma_format_idc shall be in the range of 0 to 3, inclusive.

TABLE 29

Sequence parameter set RBSP semantics separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.
  NOTE 1 - There is no dependency in decoding processes between the colour planes having different colour_plane_id values. For example, the decoding process of a monochrome picture with one value of colour_plane_id does not use any data from monochrome pictures having different values of colour_plane_id for inter prediction.
Depending on the value of separate colour plane flag, the value of the variable ChromaArrayType is assigned as follows:
- If separate colour plane flag is equal to 0. ChromaArrayType is set equal to chroma format idc.
- Otherwise (separate_colour_plane_flag is equal to 1). ChromaArrayType is set equal to 0.
pic_width_in_luma_samples specifies the width of each decoded picture in units of luma samples.
pic_width_in_luma_samples shall not be equal to 0 and shall be an integer multiple of MinCbSizeY.
pic_height_in_luma_samples specifies the height of each decoded picture in units of luma samples.
pic_height_in_luma_samples shall not be equal to 0 and shall be an integer multiple of MinCbSizeY.
bit_depth_luma_minus8 specifies the bit depth of the samples of the luma array $BitDepth_Y$ and the value of the luma quantization parameter range offset $QpBdOffset_Y$ as follows:
    $BitDepth_Y = 8 + bit\_depth\_luma\_minus8$
    $QpBdOffset_Y = 6 * bit\_depth\_luma\_minus8$
bit_depth_luma_minus8 shall be in the range of 0 to 8, inclusive.
bit_depth_chroma_minus8 specifies the bit depth of the samples of the chroma arrays $BitDepth_C$ and the value of the chroma quantization parameter range offset $QpBdOffset_C$ as follows:
    $BitDepth_C = 8 + bit\_depth\_chroma\_minus8$
    $QpBdOffset_C = 6 * bit\_depth\_chroma\_minus8$
bit_depth_chroma_minus8 shall be in the range of 0 to 8, inclusive.

TABLE 29-continued

Sequence parameter set RBSP semantics log2_max_pic_order_cnt_lsb_minus4 specifies the value of the variable MaxPicOrderCntLsb that is used in the decoding process for picture order count as follows:
    MaxPicOrderCntLsb = $2^{(\text{log2\_max\_pic\_order\_cnt\_lsb\_minus4} - 4)}$
The value of log2_max_pic_order_cnt_lsb_minus4 shall be in the range of 0 to 12, inclusive.
qtbtt_dual_tree_intra_flag equal to 1 specifies that for 1 tile groups or for P tile groups where the current picture is the only reference picture for the tile group, each CTU is split into coding units with 64×64 luma samples using an implicit quadtree split and that these coding units are the root of two separate coding quadtree syntax structure for luma and chroma.
log2_ctu_size_minus2 plus 2 specifies the luma coding tree block size of each CTU.

TABLE 30

Sequence parameter set RBSP semantics log2_min_luma_coding_block_size_minus2 plus 2 specifies the minimum luma coding block size.
The variables CtbLog2SizeY, CtbSizeY, MinCbLog2SizeY, MinCbSizeY, MinTbLog2SizeY,
MaxTbLog2SizeY, MinTbSizeY, MaxTbSizeY, PicWidthInCtbsY, PicHeighInCtbsY, PicSizeInCtbsY,
PicWidthInMinCbsY, PicHeightInMinCbsY, PicSizeInMinCbsY, PicSizeInSamplesY, PicWidthInSamplesC and
PicHeightInSamplesC are derived as follows:
    CtbLog2SizeY = log2_ctu_size_minus2 + 2
    CtbSizeY = 1 << CtbLog2SizeY
    MinCbLog2SizeY = log2_min_luma_coding_block_size_minus2 − 2
    MinCbSizeY = 1 << MinCbLog2SizeY
    MinTbLog2SizeY = 2
    MaxTbLog2SizeY = 6
    MinTbSizeY = 1 << MinTbLog2SizeY
    MaxTbSizeY =1 << MaxTbLog2SizeY
    PicWidthInCtbsY = Ceil( pic_width_in_luma_samples + CtbSizeY )
    PicHeightinCtbsY = Ceil( pic_height_in_luma_samples + CtbSizeY )
    PicSizeInCtbsY = PicWidthInCtbsY * PicHeightInCtbsY
    PicWidthInMinCbsY = pic_width_in_luma_samples / MinCbSizeY
    PicHeightInMinCbsY = pic_height_in_luma_samples / MinCbSizeY
    PicSizeInMinCbsY = PicWidthInMinCbsY * PicHeightInMinCbsY
    PicSizeInSamplesY = pic_width_in luma_samples * pic_height_in_luma_samples
    PicWidthInSamplesC = pic_width_in_luma_samples / SubWidthC
    PicHeightInSamplesC = pic_height_in_luma_samples / SubHeightC
[Fd. (BB): Currently the maximum transform size (64×64 luma samples and corresponding chroma sample size) and the minimum transform size (4×4 luma samples and corresponding chroma samples) is fixed, pending further specification development.]
The variables CtbWidthC and CtbHeightC, which specify the width and height, respectively, of the array for each chroma CTB, are derived as follows:
    If chroma_format_idc is equal to 0 (monochrome) or separate_colour_plane_flag is equal to 1. CtbWidthC
    and CtbHeightC are both equal to 0.
    Otherwise, CtbWidthC and CtbHeightC are derived as follows:
        CtbWidthC = CtbSizeY / SubWidthC
        CtbHeightC = CtbSizeY / SubHeightC
For log2BlockWidth ranging from 0 to 4 and for log2BlockHeight ranging from 0 to 4, inclusive, the up-right diagonal scan order array initialization process as specified in clause 6.5.2 is invoked with 1 << log2BlockWidth and  1 << log2BlockHeight  as  inputs,  and  the  output  is  assigned  to DiagScanOrder[ log2BlockWidth ][ log2BlockHeight ].
partition_constraints_override_enabled_flag  equal  to  1  specifies  the  presence  of partition_constraints_override_flag in the tile group headers for tile groups referring to the SPS.
partition_constraints_override_enabled_flag equal to 0 specifies the absence of partition_constraints_override_flag in the tile group headers for tile groups referring to the SPS.

TABLE 31

Sequence parameter set RBSP semantics sps_log2_diff_min_qt_min_cb_intra_tile_group_luma specifies the default difference between the base 2 logarithm of the minimum size in luma samples of a luma leaf block resulting from quadtree splitting of a CTU and the base 2 logarithm of the minimum coding block size in luma samples for luma CUs in tile groups with tile_group_type equal to 2 (I) referring to the SPS. When partition_constraints_override_flag is equal to 1, the default difference can be overridden by tile_group_log2_diff_min_qt_min_cb_luma present in the tile group header of the tile groups referring to the SPS. The value of sps_log2_diff_min_qt_min_cb_intra_tile_group_luma shall be in the range of 0 to CtbLog2SizeY − MinCbLog2SizeY, inclusive. The base 2 logarithm of the minimum size in luma samples of a luma leaf block resulting from quadtree splitting of a CTU is derived as follows:
    MinQtLog2SizeIntraY = sps_log2_diff_min_qt_min_cb_intra_tile_group_luma +
    MinCbLog2SizeY

TABLE 31-continued

Sequence parameter set RBSP semantics sps_log2_diff_min_qt_min_cb_inter_tile_group specifies the default difference between the base 2 logarithm of the minimum size in luma samples of a luma leaf block resulting from quadtree splitting of a CTU and the base 2 logarithm of the minimum luma coding block size in luma samples for luma CUs in tile groups with tile_group_type equal to 0 (B) or 1 (P) referring to the SPS. When partition_constraints_override_flag is equal to 1, the default difference can be overridden by tile_group_log2_diff_min_qt_min_cb_luma present in the tile group header of the tile groups referring to the SPS. The value of sps_log2_diff_min_qt_min_cb_inter_tile_group shall be in the range of 0 to CtbLog2SizeY − MinCbLog2SizeY, inclusive. The base 2 logarithm of the minimum size in luma samples of a luma leaf block resulting front quadtree splitting of a CTU is derived as follows:
    MinQtLog2SizeInterY = sps_log2_diff_min_qt_min_cb_inter_tile_group + MinCbLog2SizeY
sps_max_mtt_hierarchy_depth_inter_tile_groups specifies the default maximum hierarchy depth for coding units resulting from multi-type tree splitting of a quadtree leaf in tile groups with tile_group_type equal to 0 (B) or 1 (P) referring to the SPS. When partition_constraints_override_flag is equal to 1, the default maximum hierarchy depth can be overridden by tile_group_max_mtt_hierarchy_depth_luma present in the tile group header of the tile groups referring to the SPS. The value of sps_max_mtt_hierarchy_depth_inter_tile_groups shall be in the range of 0 to CtbLog2SizeY − MinCbLog2SizeY, inclusive.
sps_max_mtt_hierarchy_depth_intra_tile_groups_luma specifies the default maximum hierarchy depth for coding units resulting from multi-type tree splitting of a quadtree leaf in tile groups with tile_group_type equal to 2 (I) referring to the SPS. When partition_constraints_override_flag is equal to 1, the default maximum hierarchy depth can be overridden by tile_group_max_mtt_hierarchy_depth_luma present in the tile group header of the tile groups referring to the SPS. The value of sps max mtt hierarchy depth intra tile groups luma shall be in the range of 0 to CtbLog2SizeY − MinCbLog2SizeY, inclusive.
sps_log2_diff_max_bt_min_qt_intra_tile_group_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in tile groups with tile_group_type equal to 2 (I) referring to the SPS. When partition_constraints_override_flag is equal to 1, the default difference can be overridden by tile_group_log2_diff_max_bt_min_qt_luma present in the tile group header of the tile groups referring to the SPS. The value of sps_log2_diff_max_bt_min_qt_intra_tile_group_luma shall be in the range of 0 to CtbLog2SizeY − MinQtLog2SizeIntraY, inclusive. When sps_log2_diff_max_bt_min_qt_intra_tile_group_luma is not present, the value of sps_log2_diff_max_bt_min_qt_intra_tile_group_luma is inferred to be equal to 0.
sps_log2_diff_max_tt_min_qt_intra_tile_group_luma specifics the default difference between the base 2 logarithm of the maximum size (width or height) in luma samples of a luma coding block that can be split using a ternary split and the minimum size (width or height) in luma samples of a luma leaf block resulting from quadtree splitting of a CTU in tile groups with tile_group_type equal to 2 (I) referring to the SPS. When partition_constraints_override_flag is equal to 1, the default difference can be overridden by tile_group_log2_diff_max_tt_min_qt_luma present in the tile group header of the tile groups referring to the SPS. The value of sps log2 diff max tt min qt intra tile group luma shall be in the range of 0 to CtbLog2SizeY − MinQtLog2SizeIntraY, inclusive. When sps_log2_diff_max_tt_min_qt_intra_tile_group_luma is not present, the value of sps_log2_diff_max_tt_min_qt_intra_tile_group_luma is inferred to be equal to 0.

TABLE 32

Sequence parameter set RBSP semantics sps_log2_diff_max_bt_min_qt_inter_tile_group specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in tile groups with tile_group_type equal to 0 (B) or 1 (P) referring to the SPS. When partition_constraints_override_ flag is equal to 1, the default difference can be overridden by tile_group_log2_diff_max_bt_min_qt_luma present in the tile group header of the tile groups referring to the SPS. The value of sps log2 diff max bt min qt inter tile group shall be in the range of 0 to CtbLog2SizeY − MinQtLog2SizeInterY, inclusive. When sps_log2_diff_max_bt_min_qt_inter_tile_group is not present, the value of sps_log2_diff_max_bt_min_qt_inter_tile_group is inferred to be equal to 0.
sps_log2_diff_max_tt_min_qt_inter_tile_group specifies the default difference between the base 2 logarithm of the maximum size (width or height) in luma samples of a luma coding block that can be split using a ternary split and the minimum size (width or height) in luma samples of a luma leaf block resulting front quadtree splitting of a CTU in tile groups with tile_group_type equal to 0 (B) or 1 (P) referring to the SPS. When partition_constraints_override_ flag is equal to 1, the default difference can be overridden by tile_group_log2_diff_max_tt_min_qt_luma present in the tile group header of the tile groups referring to the SPS. The value of sps_log2_diff_max_tt_min_qt_inter_tile_group shall be in the range of 0 to CtbLog2SizeY − MinQtLog2SizeInterY, inclusive. When sps_log2_diff_max_tt_min_qt_inter_tile_group is not present, the value of sps_log2_diff_max_tt_min_qt_inter_tile_group is inferred to be equal to 0.
sps_log2_diff_min_qt_min_cb_intra_tile_group_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in tile groups with tile_group_type equal to 2 (I) referring to the SPS. When partition_constraints_override_ flag is equal to 1, the default difference can be overridden by tile_group_log2_diff_min_qt_min_cb_chroma present in the tile group header of the tile groups referring to the SPS. The value of sps_log2_diff_min_qt_min_cb_intra_tile_group_chroma shall be in the range of 0 to CtbLog2SizeY − MinCbLog2SizeY, inclusive. When not present, the value of sps_log2_diff_min_qt_min_cb_intra_tile_group_chroma is inferred to be equal to 0. The base 2 logarithm of the

TABLE 32-continued

Sequence parameter set RBSP semantics minimum size in luma samples of a chroma leaf block resulting from quadtree splitting of a CTU with treeType equal to DUAL_TREE_CHROMA is derived as follows:
   MinQtLog2SizeIntraC − sps_log2_diff_min_qt_min_cb_intra_tile_group_chroma + MinCbLog2SizeY
sps_man_mtt_hierarchy_depth_intra_tile_groups_chroma specifies the default maximum hierarchy depth for chroma coding units resulting from multi-type tree splitting of a chroma quadtree leaf with treeType equal to DUAL_TREE_CHROMA in tile groups with tile_group_type equal to 2 (I) referring to the SPS. When partition_constraints_override_ flag is equal to 1, the default maximum hierarchy depth can be overridden by tile_group_max_mtt_hierarchy_depth_chroma present in the tile group header of the tile groups referring to the SPS. The value of sps_max_mtt_hierarchy_depth_intra_tile_groups_chroma shall be in the range of 0 to CtbLog2SizeY − MinCbLog2SizeY, inclusive. When not present, the value of sps_max_mtt_hierarchy_depth_intra_tile_groups_chroma is inferred to be equal to 0.
sps_log2_diff_max_bt_min_qt_intra_tile_group_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL TREE CHROMA in tile groups with tile_group_type equal to 2 (I) referring to the SPS. When partition_constraints_override_flag is equal to 1, the default difference can be overridden by tile_group_log2_diff_max_bt_min_qt_chroma present in the tile group header of the tile groups referring to the SPS. The value of sps_log2_diff_max_bt_min_qt_intra_tile_group_chroma shall be in the range of 0 to CtbLog2SizeY − MinQtLog2SizeIntraC, inclusive. When sps_log2_diff_max_bt_min_qt_intra_tile_group_chroma is not present, the value of sps_log2_diff_max_bt_min_qt_intra_tile_group_chroma is inferred to be equal to 0.

TABLE 33

Sequence parameter set RBSP semantics sps_log2_diff_max_tt_min_qt_intra_tile_group_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in tile groups with tile_group_type equal to 2 (I) referring to the SPS. When partition_constraints_override_flag is equal to 1, the default difference can be overridden by tile_group_log2_diff_max_tt_min_qt_chroma present in the tile group header of the tile groups referring to the SPS. The value of sps_log2_diff_max_tt_min_qt_intra_tile_group_chroma shall be in the range of 0 to CtbLog2SizeY − MinQtLog2SizeIntraC, inclusive. When sps_log2_diff_max_tt_min_qt_intra_tile_group_chroma is not present, the value of sps_log2_diff_max_tt_min_qt_intra_tile_group_chroma is inferred to be equal to 0.
sps_sao_enabled_flag equal to 1 specifies that the sample adaptive offset process is applied to the reconstructed picture after the deblocking filter process, sps sao enabled flag equal to 0 specifies that the sample adaptive offset process is not applied to the reconstructed picture after the deblocking filter process.
sps_alf_enabled_flag equal to 0 specifics that the adaptive loop filter is disabled, sps alf enabled flag equal to 1 specifies that the adaptive loop filter is enabled.
pcm_enabled_flag equal to 0 specifies that PCM-related syntax (pcm_sample_bit_depth_luma_minus1, pcm_sample_bit_depth_chroma_minus1, log2_min_pcm_luma_coding_block_size_minus3, log2_diff_max_min_pcm_luma_coding_block_size, pcm_loop_filter_disabled_flag, pcm_flag, pcm_alignment_zero_bit syntax elements and pcm_sample( ) syntax structure) is not present in the CVS.
   NOTE 2 When MinCbLog2SizeY is equal to 6 and pcm_enabled_flag is equal to 1, PCM sample data-related syntax (pcm flag. pcm alignment zero bit syntax elements and pcm sample( ) syntax structure) is not present in the CVS, because the maximum size of coding blocks that can convey PCM sample data-related syntax is restricted to be less than or equal to Min( CtbLog2SizeY, 5 ). Hence, MinCbLog2SizeY equal to 6 with pcm_enabled_flag equal to 1 is not an appropriate setting to convey PCM sample data in the CVS.
pcm_sample_bit_depth_luma_minus1 specifies the number of bits used to represent each of PCM sample values of the luma component as follows:
      $PcmBitDepth_Y = pcm\_sample\_bit\_depth\_luma\_minus1 − 1$
The value of $PcmBitDepth_Y$ shall be less than or equal to the value of $BitDepth_Y$.
pcm_sample_bit_depth_chroma_minus1 specifies the number of bits used to represent each of PCM sample values of the chroma components as follows:
      $PcmBitDepth_C − pcm\_sample\_bit\_depth\_chroma\_minus1 + 1$
The value of $PcmBitDepth_C$ shall be less than or equal to the value of $BitDepth_C$. When ChromaArrayType is equal to 0, pcm_sample_bit_depth_chroma_minus1 is not used in the decoding process and decoders shall ignore its value.
log2_min_pcm_luma_coding_block_size_minus3 plus 3 specifies the minimum size of coding blocks with pcm_flag equal to 1.
The variable Log2MinIpcmCbSizeY is set equal to log2_min_pcm_luma_coding_block_size_minus3 + 3. The value of Log2MinIpcmCbSizeY shall be in the range of Min( MinCbLog2SizeY, 5 ) to Min( CtbLog2SizeY, 5 ), inclusive.
log2_diff_max_min_pcm_luma_coding_block_size specifies the difference between the maximum and minimum size of coding blocks with pcm_flag equal to 1.
The variable Log2MaxIpcmCbSizeY is set equal to log2_diff_max_min_pcm_luma_coding_block_size + Log2MinIpcmCbSizeY. The value of Log2MaxIpcmCbSizeY shall he less than or equal to Min( CtbLog2SizeY, 5 ).

TABLE 33-continued

Sequence parameter set RBSP semantics pcm_loop_filter_disabled_flag specifies whether the loop filter process is disabled on reconstructed samples in a coding unit with pcm_flag equal to 1 as follows:
- If pcm_loop_filter_disabled_flag is equal to 1, the deblocking filter and sample adaptive offset filter processes on the reconstructed samples in a coding unit with pcm_flag equal to 1 are disabled.
- Otherwise (pcm loop filter disabled flag value is equal to 0), the deblocking filter and sample adaptive offset filter processes on the reconstructed samples in a coding unit with pcm_flag equal to 1 are not disabled.

When pcm loop filter disabled flag is not present, it is inferred to be equal to 0.

TABLE 34

Sequence parameter set RBSP semantics sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied.
sps_ref_wraparound_offset specifies the offset used for computing the horizontal wrap-around position in luma samples, ref_wraparound_offset shall not be equal to 0, and shall not be greater than pic_width_in_luma_samples, and shall be an integer multiple of MinCbSizeY.
sps_temporal_mvp_enabled_flag equal to 1 specifies that tile_group_temporal_mvp_enabled_flag is present in the tile group headers of tile groups with tile_group_type not equal to 1 in the CVS.
sps_temporal_mvp_enabled_flag equal to 0 specifies that tile_group_temporal_mvp_enabled_flag is not present in tile group headers and that temporal motion vector predictors are not used in the CVS.
sps_sbtmvp_enabled_flag equal to 1 specifies that subblock-based temporal motion vector predictors may he used in decoding of pictures with all tile groups having tile_group_type not equal to 1 in the CVS.
sps sbtmvp enabled flag equal to 0 specifies that subblock-based temporal motion vector predictors are not used in the CVS. When sps_sbtmvp_enabled_flag is not present, it is inferred to be equal to 0.
sps_amvr_enabled_flag equal to 1 specifcs that adaptive motion vector difference resolution is used in motion vector coding, amvr_enabled_flag equal to 0 specifies that adaptive motion vector difference resolution is not used in motion vector coding.
sps_bdof_enabled_flag equal to 0 specifies that the bidirectional optical flow inter prediction is disabled.
sps_bdof_enabled_flag equal to 1 specifies that the bidirectional optical flow inter prediction is enabled.
sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled.
sps_mts_intra_enabled_flag equal to 1 specifies that tu_mts_idx indicates the usage of DCT-VIII and DST-VII transform kernels for intra coding units, sps_mts_intra_enabled_flag equal to 0 specifies that tu_mts_idx does not indicate the usage of DCT-VIII and DST-VII transform kernels for intra coding units.
sps_mts_inter_enabled_flag specifies that tu_mts_idx indicates the usage of DCT-VIII and DST-VII transform kernels for inter coding units, sps_mts_inter_enabled_flag equal to 0 specifies that tu_mts_idx does not indicate the usage of DCT-VIII and DST-VII transform kernels for inter coding units.
sps_affine_enabled_flag specifies whether affine model based motion compensation can be used for inter prediction. If sps_affine_enabled_flag is equal to 0, the syntax shall be constrained such that no affine model based motion compensation is used in the CVS, and inter_affine_flag and cu_affine_type_flag are not present in coding unit syntax of the CVS. Otherwise (sps_affine_enabled_flag is equal to 1). affine model based motion compensation can be used in the CVS.
sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CVS, and cu_affine_type_flag is not present in coding unit syntax in the CVS. Otherwise (sps_affine_type_flag is equal to 1), 6-parameter affine model based motion compensation can be used in the CVS. When not present, the value of sps_affine_type_flag is inferred to be equal to 0.
sps_gbi_enabled_flag specifies whether bi-prediction with CU weights can be used for inter prediction. If sps_gbi_enabled_flag is equal to 0, the syntax shall be constrained such that no bi-prediction with CU weights is used in the CVS, and gbi_idx is not present in coding unit syntax of the CVS. Otherwise (sps_gbi_enabled_flag is equal to 1), bi-prediction with CU weights can be used in the CVS.
sps_cpr_enabled_flag equal to 1 specifies that current picture referencing may be used in decoding of pictures in the CVS. sps_cpr_enabled_flag equal to 0 specifies that current picture referencing is not used in the CVS. When sps_cpr_enabled_flag is not present. it is inferred to be equal to 0. When sps_cpr_enabled_flag is equal to 1, the current decoded picture is used as a reference picture and is put at the last position in the reference picture list 0. This reference picture is marked as a long-term reference picture. (Ed. (SL): long-term reference picture has not been introduced to VVC.)
sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

TABLE 35

Sequence parameter set RBSP semantics sps_triangle_enable_flag specifies whether triangular shape based motion compensation can be used for inter prediction. sps_triangle_enabled_flag equal to 0 specifies that the syntax shall be constrained such that no TABLE 35-continued Sequence parameter set RBSP semantics triangular shape based motion compensation is used in the CVS, and merge_triangle_flag and merge_triangle_idx
are not present in coding unit syntax of the CVS. sps_triangle_enabled_flag equal to 1 specifies that triangular
shape based motion compensation can be used in the CVS.
sps_ladf_enabled_flag  equal to 1, specifies that sps_num_ladf_intervals_minus2,
sps_ladf_lowest_interval_qp_offset, sps_ladf_qp_offset[ i ], and sps_ladf_delta_threshold_minus1[ i ] are
present in the SPS.
sps_num_ladf_intervals_minus2 plus 1 specifies the number of sps_ladf_delta_threshold_minus1[ i ] and
sps_ladf_qp_offset[ i ] syntax elements that are present in the SPS. The value of sps_num_ladf_intervals_minus2
shall be in the range of 0 to 3, inclusive.
sps_ladf_lowest_interval_qp_offset specifies the offset used to derive the variable qP as specified in clause
8.6.2.6.3. The value of sps_ladf_lowest_interval_qp_offset shall be in the range of 0 to 63, inclusive.
sps_ladf_qp_offset[ i ] specifies the offset array used to derive the variable qP as specified in clause 8.6.2.6.3.
The value of sps_ladf_qp_offset[ i ] shall be in the range of 0 to 63, inclusive.
sps_ladf_delta_threshold_minus1[ i ] is used to compute the values of SpsLadfIntervalLowerBound[ i ], which
specifies the lower bound of the i-th luma intensity level interval. The value of
sps_ladf_delta_threshold_minus1[ i ] shall be in the range of 0 to $2^{BitDepthY} - 3$, inclusive.
The value of SpsLadfIntervalLowerBound[ 0 ] is set equal to 0.
For each value of i in the range of 0 to sps_num_ladf_intervals_minus2, inclusive, the variable
SpsLadfIntervalLowerBound[ i + 1 ] is derived as follows:
    SpsLadfIntervalLowerBotind[ i + 1 ] = SpsLadfIntervalLowerBound[ i ]
                                        + sps_ladf_delta_threshold_minus1[ i ] + 1

Meanwhile, for example, at least some of the information according to the aforementioned embodiments of the present document may be included in the high level syntax as illustrated in Table 36 or Tables 37 to 39. Alternatively, at least some of the information according to the aforementioned embodiments of the present document may be signaled by being included in the high level syntax. Alternatively, at least some of the information according to the aforementioned embodiments may be included in a picture parameter set (PPS) syntax. Alternatively, at least some of the information according to the aforementioned embodiments may be signaled by being included in the PPS syntax. For example, Tables 37 to 39 may consecutively represent one syntax, and the syntax elements included in the syntax may be sequentially signaled, configured, or parsed.

TABLE 36

| | Descriptor |
|---|---|
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform tile spacing flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     loop_filter_across_tiles_enabled_flag | u(1) |
|   } | |
|   init_qp_minus26 | se(v) |
|   transform_skip_enabled_flag | u(1) |
|   if ( transform_skip_enabled_flag ) | |
|     log2_transform_skip_max_size_minus2 | ue(v) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_tile_group_chroma_qp_offsets_present_flag | u(1) |
|   deblocking_filter_control_present_flag | u(1) |

TABLE 36-continued

| | Descriptor |
|---|---|
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   rbsp_trailing_bits( ) | |
| } | |

TABLE 37

| | Descriptor |
|---|---|
| pic_parameter_set_rbsp( ) { | |
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |

TABLE 38

| | |
|---|---|
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i-+ ) | |
|     tile_row_height_minus1[ i ] | ue(v) |
|   rect_slice_flag | u(1) |
|   if( rect_slice_flag ) | |
|     single_slice_per_subpic_flag | u(1) |
|   if( rect_slice_flag && !single_slice_par_subpic_flag ) { | |
|     num_slices_in_pic_minus1 | ue(v) |
|     tile_idx_delta_present_flag | u(1) |
|     for( i = 0; i < num_slices_in_pic_minus1; i-+ ) { | |
|       slice_width_in_tiles_minus1[ i ] | ue(v) |
|       slice_height_in_tiles_minus1[ i ] | ue(v) |
|       if( slice_width_in_tiles_minus1[ i ] = = 0 && | |
|         slice_height_in_tiles_minus1[ i ] = = 0 ) { | |
|         num_slices_in_tile_minus1[ i ] | ue(v) |
|         numSlicesInTileMinus1 = num_slices_in_tile_minus1[ i ] | |
|         for( j = 0; j < numSlicesInTileMinus1; j++ ) | |
|           slice_height_in_ctu_minus1[ i-+ ] | ue(v) |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| entropy_coding_sync_enabled_flag | u(1) |
| if( !no_pic_partition_flag | entropy_coding_sync_enabled_flag ) | |
|   entry_point_offsets_present_flag | u(1) |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| log2_transform_skip_max_size_minus2 | ue(v) |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|   pps_joint_cbcr_qp_offset_value | se(v) |
| pps_slice_chroma_qp_offsets_present_flag | u(1) |
| pps_cu_chroma_qp_offset_list_enabled_flag | u(1) |

TABLE 39

| | |
|---|---|
| if( pps_cu_chroma_qp_offset_list_enabled_flag ) { | |
|   chroma_qp_offset_list_len_minus1 | ue(v) |
|   for( i = 0; i <= chroma qp offset list len minus1; i++ ) { | |
|     cb_qp_offset_list[ i ] | se(v) |
|     cr_qp_offset_list[ i ] | se(v) |
|     if( pps_joint_cbcr_qp_offset_present flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|   } | |
| } | |

TABLE 39-continued

| | |
|---|---|
| constant_slice_header_params_enabled_flag | u(1) |
| if( constant_slice_header_params_enabled_flag ) { | |
|   pps_dep_quant_enabled_idc | u(2) |
|   for( i = 0; i < 2; i++ ) | |
|     pps_ref_pic_list_sps_idc[ i ] | u(2) |
|   pps_mvd_l1_zero_idc | u(2) |
|   pps_collocated_from_l0_idc | u(2) |
|   pps_six_minus_max_num_merge_cand_plus1 | ue(v) |
|   pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

For example, as illustrated in Table 36 or Tables 37 to 39, the information represented by the syntax elements included in the PPS syntax or semantics of the syntax elements may be represented as in Tables 40 to 42.

TABLE 40

Picture parameter set RBSP semantics pps_pic_parameter_set_id identifies the PPS for reference by other syntax elements. The value of
pps_pic_parameter_set_id shall be in the range of 0 to 63, inclusive.
pps_seq_parameter_set_id specifics the value of sps_seq_parameter_set_id for the active SPS. The value of
pps_seq_parameter_set_id shall be in the range of 0 to 15, inclusive.
single_tile_in_pic_flag equal to 1 specifies that there is only one tile in each picture referring to the PPS.
single_tile_in_pic_flag equal to 0 specifies that there is more than one tile in each picture referring to the PPS.
It is a requirement of bitstream conformance that the value of single_tile_in_pic_flag shall be the same for all
PPSs that are activated within a CVS.
num_tile_columns_minus1 plus 1 specifies the number of tile columns partitioning the picture.
num_tile_columns_minus1 shall be in the range of 0 to PicWidthInCtbsY − 1, inclusive. When not present, the
value of num_tile_columns_minus1 is inferred to be equal to 0.
num_tile_rows_minus1 plus 1 specifies the number of tile rows partitioning the picture. num_tile_rows_minus1
shall be in the range of 0 to PicHeightInCtbsY − 1, inclusive. When not present, the value of
num_tile_rows_minus1 is inferred to be equal to 0.
The variable NumTilesInPic is set equal to ( num_tile_columns_minus1 − 1 ) * ( num_tile_rows_minus1 − 1 ).
When single_tile_in_pic_flag is equal to 0. NumTilesInPic shall be greater than 1.
uniform_tile_spacing_flag equal to 1 specifies that tile column boundaries and likewise tile row boundaries are
distributed uniformly across the picture. uniform_tile_spacing_flag equal to 0 specifies that tile column
boundaries and likewise tile row boundaries are not distributed uniformly across the picture but signalled
explicitly using the syntax elements tile_column_width_minus1[ i ] and tile_row_height_minus1[ i ]. When not
present, the value of uniform_tile_spacing_flag is inferred to be equal to 1.
tile_column_width_minus1[ i ] plus 1 specifies the width of the i-th tile column in units of CTBs.
tile_row_height_minus1[ i ] plus 1 specifies the height of the i-th tile row in units of CTBs.
The following variables are derived by invoking the CTB raster and tile scanning conversion process as specified
in clause 6.5.1:
- The list ColWidth[ i ] for i ranging from 0 to num_tile_columns_minus1, inclusive, specifying the width of
  the i-th tile column in units of CTBs,
- the list RowHeight[ j ] for j ranging from 0 to num_tile_rows_minus1, inclusive, specifying the height of the
  j-th tile row in units of CTBs,
- the list ColBd[ i ] for i ranging from 0 to num_tile_columns_minus1 + 1, inclusive, specifying the location
  of the i-th tile column boundary in units of CTBs,
- the list RowBd[ j ] for j ranging from 0 to num_tile_rows_minus1 + 1, inclusive, specifying the location of
  the j-th tile row boundary in units of CTBs,
- the list CtbAddrRsToTs[ ctbAddrRs ] for ctbAddrRs ranging from 0 to PicSizeInCtbsY − 1, inclusive,
  specifying the conversion from a CTB address in the CTB raster scan of a picture to a CTB address in the
  tile scan,
  the list CtbAddrTsToRs[ ctbAddrTs ] for ctbAddrTs ranging from 0 to PicSizeInCtbsY − 1, inclusive,
  specifying the conversion from a CTB address in the tile scan to a CTB address in the CTB raster scan of a
  picture,
- the list TileId[ ctbAddrTs ] for ctbAddrTs ranging front 0 to PicSizeInCtbsY − 1, inclusive, specifying the
  conversion from a CTB address in tile scan to a tile ID,
- the list NumCtusInTile[ tileIdx ] for tileIdx ranging from 0 to PicSizeInCtbsY − 1, inclusive, specifying the
  conversion from a tile index to the number of CTUs in the tile,
- the list FirstCtbAddrTs[ tileIdx ] for tileIdx ranging front 0 to NumTilesInPic − 1, inclusive, specifying the
  conversion from a tile ID to the CTB address in tile scan of the first CTB in the tile,
- the lists ColumnWidthInLumaSamples[ i ] for i ranging from 0 to num_tile_columns_minus1, inclusive,
  specifying the width of the i-th tile column in units of luma samples,
- the list RowHeightInLumaSamples[ j ] for j ranging from 0 to num_tile_rows_minus1, inclusive, specifying
  the height of the j-th tile row in units of luma samples.

TABLE 40-continued

Picture parameter set RBSP semantics

The values of ColumnWidthInLumaSamples[ i ] for i ranging from 0 to num_tile_columns_minus1, inclusive, and RowHeightInLumaSamples[ j ] for j ranging from 0 to num_tile_rows_minus1, inclusive, shall all be greater than 0.

TABLE 41

Picture parameter set RBSP semantics loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.
init_qp_minus26 plus 26 specifies the initial value of TileGroupQp$_Y$ for each tile group referring to the PPS. The initial value of TileGroupQp$_Y$ is modified at the tile group layer when a non-zero value of tile_group_qp_delta is decoded. The value of init_qp_minus26 shall be in the range of −( 26 − QpBdOffset$_Y$ ) to −37, inclusive.
transform_skip_enabled_flag equal to 1 specifies that tu_mts_idx indicates skipping the transform for luma residual blocks in the coding unit syntax, transform_skip_enabled_flag equal to 0 specifies that tu_mts_idx does not indicate skipping the transform for luma residual blocks coding syntax.
log2_transform_skip_max_size_minus2 specifies the maximum block size used for transform skip, and shall be in the range of 0 to 3. If transform_skip_enabled_flag is equal to 0 or not present, the value of log2_transform_skip_max_size_minus2 is inferred to be equal to 0.
The variable MaxTsSize is set to 1 << (log2_transform_skip_max_size_minus2 + 2).
cu_qp_delta_enabled_flag equal to 1 specifies that the diff_cu_qp_delta_depth syntax element is present in the PPS and that cu_qp_delta_abs may be present in the transform unit syntax. cu_qp_delta_enabled_flag equal to 0 specifies that the diff_cu_qp_delta_depth syntax element is not present in the PPS and that cu_qp_delta_abs is not present in the transform unit syntax.
diff_cu_qp_delta_depth specifies the coding tree depth difference between the coding units of minimum coding tree depth and coding units of maximum coding tree depth that convey cu_qp_delta_abs and cu_qp_delta_sign_flag. The value range of diff_cu_qp_delta_depth is specified as follows:
- If tile_group_type is equal to 1, the value of diff_cu_qp_delta_depth shall be in the range of 0 to log2_ctu_size_minus2 − log2_min_qt_size_intra_tile_groups_minus2 + MaxMttDepthY. inclusive.
- Otherwise (tile_group_type is not equal to 1), the value of diff_cu_qp_delta_depth shall be in the range of 0 to log2_ctu_size_minus2 − log2_min_qt_size_inter_tile_groups_minus2 + MaxMttDepthY, inclusive.

When not present, the value of diff_cu_qp_delta_depth is inferred to be equal to 0.
[Ed. (BB): The issue here is that MaxMttDepthY is derived on tile-group-level. In case of partition_constraints_override_enabled_flag equal to 1, one would need to parse the tile group header in order to know the value of MaxMttDepthY.]
pps_cb_qp_offset and pps_cr_qp_offset specify the offsets to the luma quantization parameter Qp'$_Y$ used for deriving Qp'$_{Cb}$, and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.
pps_tile_group_chroma_qp_offsets_present_flag equal to 1 indicates that the tile_group_cb_qp_offset and tile_group_cr_qp_offset syntax elements are present in the associated tile group headers.
pps_tile_group_chroma_qp_offsets_present_flag equal to 0 indicates that these syntax elements are not present in the associated tile group headers. When ChromaArrayType is equal to 0, pps_tile_group_chroma_qp_offsets_present_flag shall be equal to 0.
deblocking_filter_control_present_flag equal to 1 specifies the presence of deblocking filter control syntax elements in the PPS, deblocking_filter_control_present_flag equal to 0 specifies the absence of deblocking filter control syntax elements in the PPS.
deblocking_filter_override_enabled_flag equal to 1 specifies the presence of deblocking_filter_override_flag in the tile group headers for pictures referring to the PPS, deblocking_filter_override_enabled_flag equal to 0 specifies the absence of deblocking_filter_override_flag in the tile group headers for pictures referring to the PPS. When not present, the value of deblocking_filter_override_enabled_flag is inferred to be equal to 0.

TABLE 42

Picture parameter set RBSP semantics pps_deblocking_filter_disabled_flag equal to 1 specifies that the operation of deblocking filter is not applied for tile groups referring to the PPS in which tile_group_deblocking_filter_disabled_flag is not present.
pps_deblocking_filter_disabled_flag equal to 0 specifies that the operation of the deblocking filter is applied for tile groups referring to the PPS in which tile_group_deblocking_filter_disabled_flag is not present. When not present the value of pps_deblocking_filter_disabled_flag is inferred to be equal to 0.
pps_beta_offset_div2 and pps_tc_offset_div2 specify the default deblocking parameter offsets for β and tC (divided by 2) that are applied for tile groups referring to the PPS, unless the default deblocking parameter offsets are overridden by the deblocking parameter offsets present in the tile group headers of the tile groups referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

Meanwhile, for example, at least some of the information according to the aforementioned embodiments of the present document may be included in a coding unit syntax as illustrated in Tables 43 to 47. Alternatively, at least some of the information according to the aforementioned embodiments of the present document may be signaled by being included in the coding unit syntax. For example, Tables 43 to 47 may consecutively represent one syntax, and the syntax elements included in the syntax may be sequentially signaled, configured, or parsed.

TABLE 43

|  | Descriptor |
|---|---|
| coding_unit( x0, y0, cbWidth, cbHeight, cqtDepth, treeType, modeType ) { | |
|   chType = treeType = = DUAL_TREE_CHROMA ? 1 : 0 | |
|   if( slice type != I \| \| spa ibc enabled flag ) { | |
|     if( treeType != DUAL_TREE_CHROMA && | |
|       ( ( !( cbWidth = = 4 && cbHeight = = 4 ) && modeType !- MODE_TYPE_INTRA ) | |
|       \| \| ( sps_ibc_enabled_flag && cbWidth <- 64 && cbHeight <- 64 ) ) ) | |
|       cu_skip_flag[ x0 ][ y0 ] | ae(v) |
|     if( cu_skip_flag[ x0 ][ y0 ] = = 0 && slice_type != I | |
|       && !( cbWidth  4 && cbHeight  4 ) && modeType   MODE_TYPE_ALL ) | |
|       pred_mode_flag | ae(v) |
|     if( ( ( slice_type = = I && cu_skip_flag[ x0 ][ y0 ] = =0) \| \| | |
|       ( slice_type != I && ( CuPredMode[ chType ][ x0 ][ y0 ] != MODE_INTRA \| \| | |
|         ( ( ( cbWidth = = 4 && cbHeight = = 4 ) \| modeType = = MODE_TYPE_INTRA ) | |
|         && cu_skip_flag[ x0 ][ y0 ]  0 ) ) ) ) && | |
|       cbWidth <= 64 && cbHeight <= 64 && modeType != MODE_TYPE_INTER && | |
|       sps ibc enabled flag && treeType != DUAL TREE CHROMA ) | |
|       pred_mode_ibc_flag | ae(v) |
|   } | |
|   if( CuPredMode[ chType ][ x0 ][ y0 ] = = MODE_INTRA && sps_palette_enabled_flag && | |
|     cbWidth <= 64 && cbHeight <= 64 && cu_skip_flag[ x0 ][ y0 ] = = 0 && | |
|     modeType != MODE TYPE INTER ) | |
|     pred_mode_plt_flag | ae(v) |
|   } | |
|   if( CuPredMode[ chType ][ x0 ][ y0 ] = = MODE_INTRA && sps_act_enabled_flag && | |
|     treeType = = SINGLE_TREE ) | |
|     cu_act_enabled_flag | ae(v) |
|   if( CuPredMode[ chType ][ x0 ][ y0 ] = = MODE_INTRA \| \| | |
|     CuPredMode[ chType ][ x0 ][ y0 ] = = MODE_PLT) { | |
|     if( treeType = = SINGLE_TREE \| \| treeType = = DUAL_TREE_LUMA ) { | |
|       if( pred_mode_plt_flag ) { | |
|         palette_coding( x0, y0, cbWidth, cbHeight, treeType ) | |
|       } else { | |
|         if( sps bdpcm enabled flag && | |
|           cbWidth <= MaxTsSize && cbHeight <= MaxTsSize ) | |
|         intra_bdpcm_luma_flag | ae(v) |
|         if( intra bdpcm luma flag ) | |
|           intra_bdpcm_luma_dir_flag | ae(v) |
|         else{ | |
|           if( sps_mip_enabled_flag ) | |
|             intra_mip_flag[ x0 ][ y0 ] | ae(v) |
|           if( intra mip flag[ x0 ][ y0 ] ) { | |
|             intra_mip_transposed[ x0 ][ y0 ] | ae(v) |
|             intra_mip_mode[ x0 ][ y0 ] | ae(v) |
|           } else { | |

TABLE 44

|  | Descriptor |
|---|---|
|           if( sps_mrl_enabled_flag && ( ( y0 % CtbSizeY ) > 0 ) ) | |
|             intra_luma_ref_idx[ x0 ][ y0 ] | ae(v) |
|           if( sps isp enabled flag && intra luma ref idx[ x0 ][ y0 ] = = 0 && | |
|             ( cbWidth <= MaxTbSizeY && cbHeight <= MaxTbSizeY ) && | |
|             ( cbWidth * cbHeight > MinTbSizeY * MinTbSizeY ) && !cu_act_enabled_flag ) | |
|             intra_subpartitions_mode_flag[ x0 ][ y0 ] | ae(v) |
|           if( intra_subpartitions_mode_flag[ x0 ][ y0 ] = = 1 ) | |
|             intra_subpartitions_split_flag[ x0 ][ y0 ] | ae(v) |
|           if( infra_luma_ref_idx[ x0 ][ y0 ] = = 0 ) | |
|             intra_luma_mpm_flag[ x0 ][ y0 ] | ae(v) |
|           if( intra_luma_mpm_flag[ x0 ][ y0] ) { | |
|             if( intra_luma_ref_idx[ x0 ][ y0 ] = = 0 ) | |
|               intra_luma_not_planar_flag[ x0 ][ y0 ] | ae(v) |
|             if( intra_luma_not_planar_flag[ x0 ][ y0 ] ) | |
|               intra_luma_mpm_idx[ x0 ][ y0 ] | ae(v) |
|           } else | |
|             intra_luma_mpm_remainder[ x0 ][ y0 ] | ae(v) |
|           } | |
|         } | |
|       } | |
|     } | |

TABLE 44-continued

```
        if( ( treeType = = SINGLE_TREE | | treeType = = DUAL_TREE_CHROMA ) &&
              ChromaArrayType != 0 ) {
            if( pred mode plt flag && treeType = = DUAL TREE CHROMA )
                palette_coding( x0, y0, cbWidth / SubWidthC, cbHeight / SubHeightC, treeType )
            else {
                if( !cu_act_enabled_flag) {
                    if( cbWidth <= MaxTsSize && cbHeight <= MaxTsSize &&
                          sps_bdpcm_chroma_enabled_flag ) {
                        intra_bdpcm_chroma_flag                                                       ae(v)
                        if( intra_bdpcm_chroma_flag )
                            intra_bdpcm_chroma_dir_flag                                               ae(v)
                    } else {
                        if( CclmEnabled )
                            cclm_mode_flag                                                            ae(v)
                        if( cclm mode flag )
                            cclm_mode_idx                                                             ae(v)
                        else
                            intra_chroma_pred_mode                                                    ae(v)
                    }
                }
            }
        }
    } else if( treeType != DUAL_TREE_CHROMA ) { /* MODE_INTER or MODE_IBC */
        if( cu_skip_flag[ x0 ][ y0 ] = = 0 )
            general_merge_flag[ x0 ][ y0 ]                                                            ae(v)
        if( general_merge_flag[ x0 ][ y0 ] )
            merge_data( x0, y0, cbWidth, cbHeight, chType )
        else if( CuPredMode[ chType ][ x0 ][ y0 ] = = MODE_IBC ) {
```

TABLE 45

```
        mvd_coding( x0, y0, 0, 0 )
        if( MaxNumIbcMergeCand > 1 )
            mvp_l0_flag[ x0 ][ y0 ]                                                                   ae(v)
        if( sps_amvr_enabled_flag &&
              ( MvdL0[ x0 ][ y0 ][ 0 ] != 0 | | MvdL0[ x0 ][ y0 ][ 1 ] != 0 ) )
            amvr_precision_idx[ x0 ][ y0 ]                                                            ae(v)
    } else {
        if( slice_type = = B )
            inter_pred_idc[ x0 ][ y0 ]                                                                ae(v)
        if( sps_affine_enabled_flag && cbWidth >= 16 && cbHeight >= 16) {
            inter_affine_flag[ x0 ][ y0 ]                                                             ae(v)
            if( sps_affine_type_flag && inter_affine_flag[ x0 ][ y0 ] )
                cu_affine_type_flag[ x0 ][ y0 ]                                                       ae(v)
        }
        if( sps_smvd_enabled_flag && !mvd_l1_zero_flag &&
              inter_pred_idc[ x0 ][ y0 ] = = PRED_B1 &&
              !inter_affine_flag[ x0 ][ y0 ] && RefIdxSymL0 >-1 && RefIdxSymL1 >-1 )
            sym_mvd_flag[ x0 ][ y0 ]                                                                  ae(v)
        if( inter_pred_idc[ x0 ][ y0] !- PRED_L1 ) {
            if( NumRefIdxActive[ 0 ] > 1 && !svm mvd flag[ x0 ][ y0 ] )
                ref_idx_l0[ x0 ][ y0 ]                                                                ae(v)
            mvd_coding( x0, y0, 0, 0 )
            if( MotionModelIdc[ x0 ][ y0 ] > 0 )
                mvd_coding( x0, y0, 0, 1)
            if( MotionModelIdc[ x0 ][ y0 ] > 1 )
                mvd coding( x0, y0, 0, 2 )
            mvp_l0_flag[ x0 ][ y0 ]                                                                   ae(v)
        } else {
            MvdL0[ x0 ][ y0 ][ 0 ] = 0
            MvdL0[ x0 ][ y0 ][ 1 ] = 0
        }
        if( inter_pred_idc[ x0 ][ y0 ] != PRED_L0 ) {
            if( NumRefIdxActive[ 1 ] > 1 && !sym_mvd_flag[ x0 ][ y0 ] )
                ref_idx_l1[ x0 ][ y0 ]                                                                ae(v)
            if( mvd_l1_zero_flag && inter_pred_idc[ x0 ][ y0 ] = = PRED_B1 ) {
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
```

TABLE 45-continued

```
            MvdCpL1[ x0 ][ y0 ][ 2 ][ 0 ] = 0
            MvdCpL1[ x0 ][ y0 ][ 2 ][ 1 ] = 0
    } else {
        if( sym_mvd_flag[ x0 ][ y0 ] ) {
            MvdL1[ x0 ][ y0 ][ 0 ] = − MvdL0[ x0 ][ y0 ][ 0 ]
            MvdL1[ x0 ][ y0 ][ 1 ] = − MvdL0[ x0 ][ y0 ][ 1 ]
        } else
            mvd_coding( x0, y0, 1, 0 )
```

TABLE 46

```
                if( MotionModelIdc[ x0 ][ y0 ] > 0 )
                    mvd_coding( x0, y0, 1, 1 )
                if( MotionModelIdc[ x0, ][ y0 ] > 1 )
                    mvd_coding( x0, y0, 1, 2 )
            }
            mvd_l1_flag[ x0 ][ y0 ]                                                 ae(v)
        } else {
            MvdL1[ x0 ][ y0 ][ 0 ] = 0
            MvdL1[ x0 ][ y0 ][ 1 ] = 0
        }
        if( ( sps_amvr_enabled_flag && inter_affine_flag[ x0 ][ y0 ] = = 0 &&
            ( MvdL0[ x0 ][ y0 ][ 0 ] != 0 | | MvdL0[ x0 ]][ y0 ][ 1 ] != 0 | |
              MvdL1[ x0 ][ y0 ][ 0 ] != 0 | MvdL1[ x0 ][ y0 ][ 1 ] != 0 ) ) | |
            ( sps_affine_amvr_enabled_flag && inter_affine_flag[ x0 ][ y0 ] = = 1 &&
            ( MvdCpL0[ x0 ][ y0 ][ 0 ][ 0 ] != 0 | | MvdCpL0[ x0 ][ y0 ][ 0 ][ 1 ] != 0 | |
              MvdCpL1[ x0 ][ y0 ][ 0 ][ 0 ] != 0 | | MvdCpL1[ x0 ][ y0 ][ 0 ][ 1 ] != 0 | |
              MvdCpL0[ x0 ][ y0 ][ 1 ][ 0 ] != 0 | | MvdCpL0[ x0 ][ y0 ][ 1 ][ 1 ] != 0 | |
              MvdCpL1[ x0 ][ y0 ][ 1 ][ 0 ] != 0 | | MvdCpL1[ x0 ][ y0 ][ 1 ][ 1 ] != 0 | |
              MvdCpL0[ x0 ][ y0 ][ 2 ][ 0 ] != 0 | | MvdCpL0[ x0 ][ y0 ][ 2 ][ 1 ] != 0 | |
              MvdCpL1[ x0 ][ y0 ][ 2 ][ 0 ] != 0 | | MvdCpL1[ x0 ][ y0 ][ 2 ][ 1 ] != 0 ) ) {
            amvr_flag[ x0 ][ y0 ]                                                   ae(v)
            if( amvr_flag[ x0 ][ y0 ] )
                amvr_precision_idx[ x0 ][ y0 ]                                      ae(v)
        }
        if( sps_bcw_enabled_flag && inter_pred_idc[ x0 ][ y0 ] = = PRED_BI &&
            luma_weight_l0_flag[ ref_idx_l0 [ x0 ][ y0 ] ] = = 0 &&
            luma_weight_l1_flag[ ref_idx_l1 [ x0 ][ y0 ] ] = = 0 &&
            chroma_weight_l0_flag[ ref_idx_l0 [ x0 ][ y0 ] ] = = 0 &&
            chroma_weight_l1_flag[ ref_idx_l1 [ x0 ][ y0 ] ] = = 0 &&
            cbWidth * cbHeight >= 256 )
            bcw_idx[ x0 ][ y0 ]                                                     ae(v)
        }
    }
    if( CuPredMode[ chType ][ x0 ][ y0 ] != MODE_INTRA && !pred_mode_plt_flag &&
        general_merge_flag[ x0 ][ y0 ] = = 0 )
        cu_cbf                                                                      ae(v)
```

TABLE 47

```
if( cu_cbf ) {
    if( CuPredMode[ chType ][ x0 ][ y0 ] = = MODE_INTER && sps_sbt_enabled_flag
        && !ciip_flag[ x0 ][ y0 ] && !MergeTriangleFlag[ x0 ][ y0 ]
        && cbWidth <= MaxTbSizeY && cbHeight <= MaxTbSizeY ) {
        allowSbtVerH = cbWidth >= 8
        allowSbtVerQ = cbWidth >= 16
        allowSbtHorH = cbHeight >= 8
        allowSbtHorQ = cbHeight >= 16
        if( allowSbtVerH | | allowSbtHorH )
            cu_sbt_flag                                                             ae(v)
        if( cu_sbt_flag ) {
            if( ( allowSbtVerH | | allowSbtHorH ) && ( allowSbtVerQ | | allowSbtHorQ ) )
                cu_sbt_quad_flag                                                    ae(v)
            if ( cu_sbt_quad_flag && allowSbtVerQ && allowSbtHorQ ) | |
                ( !cu_sbt_quad_flag && allowSbtVerH && allowSbtHorH ) )
                cu_sbt_horizontal_flag                                              ae(v)
            cu_sbt_pos_flag                                                         ae(v)
        }
    }
```

TABLE 47-continued

```
if( sps_act_enabled_flag && CuPredMode[ chType ][ x0 ][ y0 ] !– MODE_INTRA &&
   treeType – – SINGLE_TREE )
   cu_act_enabled_flag
LfnstDcOnly = 1
LfnstZeroOutSigCoeffFlag = 1
MtsZeroOutSigCoeffFlag – 1
transform_tree( x0, y0, cbWidth, cbHeight, treeType, chType )
lfnstWidth   ( treeType   DUAL_TREE_CHROMA ) ? cbWidth / SubWidthC
             : ( ( IntraSubPartitionsSplitType = = ISP_VER_SPLIT ) ? cbWidth /
               NumIntraSubPartitions : cbWidth )
lfnstHeight = ( treeType = = DUAL_TREE_CHROMA ) ? cbHeight / SubHeightC
             : ( ( IntraSubPartitionsSplitType = = ISP HOR SPLIT) ? cbHeight /
               NumIntraSubPartitions : cbHeight )
if( Min( lfnstWidth, lfnstHeight ) >= 4 && sps_lfnst_enabled_flag = = 1 &&
   CuPredMode[ chType ][ x0 ][ y0 ] – – MODE_INTRA &&
   transform_skip_flag[ x0 ][ y0 ][ 0 ] = = 0 &&
   ( treeType != DUAL TREE CHROMA | | !intra mip flag[ x0 ][ y0 ] | |
     Min( lfnstWidth, lfnstHeight ) >= 16 ) &&
   Max( cbWidth, cbHeight ) <– MaxTbSizeY) {
   if( ( IntraSubPartitionsSplitType ! ISP_NO_SPLIT | | LfnstDcOnly   0 ) &&
      LfnstZeroOutSigCoeffFlag = = 1 )
      lfnst_idx                                                                    ae(v)
}
if( treeType != DUAL TREE CHROMA && lfnst idx = = 0 &&
   transform_skip_flag[ x0 ][ y0 ][ 0 ] = = 0 && Max( cbWidth, cbHeight ) <= 32 &&
   IntraSubPartitionsSplit[ x0 ][ y0 ] – – ISP_NO_SPLIT && cu_sbt_flag – – 0 &&
   MtsZeroOutSigCoeffFlag – – 1 && tu_cbf_luma[ x0 ][ y0 ] ) {
   if( ( ( CuPredMode[ chType ][ x0 ][ y0 ] = = MODE_INTER &&
      sps_explicit_mts_inter_enabled_flag ) | |
      ( CuPredMode[ chType ][ x0 ][ y0 ] = = MODE_INTRA &&
      sps_explicit_mts_intra_enabled_flag ) ) )
      mts_idx                                                                      ae(v)
   }
}
```

For example, as illustrated in Tables 43 to 47, the information represented by the syntax elements included in the coding unit syntax or semantics of the syntax elements may be represented as in Tables 48 to 51. Table 48 is illustrated in FIG. 18, Table 49 is illustrated in FIG. 19, and Table 50 is illustrated in FIG. 20.

TABLE 51

Coding unit semantics gbi_idx[ x0 ][ y0 ] specifies the weight index of bi-prediction with CU weights. The array indices x0, y0 specify
the location ( x0, y0 ) of the top-left luma sample of the considered coding block relative to the top-left luma sample of the picture.
When gbi_idx[ x0 ][ y0 ] is not present, it is inferred to be equal to 0.
cu_cbf equal to 1 specifies that the transform_tree( ) syntax structure is present for the current coding unit.
cu_cbf
equal to 0 specifies that the transform_tree( ) syntax structure is not present for the current coding unit.
When cu_cbf is not present, it is inferred as follows:
- If cu_skip_flag[ x0 ][ y0 ] is equal to 1, cu_cbf is inferred to be equal to 0.
- Otherwise, cu_cbf is inferred to be equal to 1.

Meanwhile, for example, at least some of the information according to the aforementioned embodiments of the present document may be included in a transform unit syntax as illustrated in Table 52 or Tables 53 and 54. Alternatively, at least some of the information according to the aforementioned embodiments of the present document may be signaled by being included in the transform unit syntax. For example, Tables 53 and 54 may consecutively represent one syntax, and the syntax elements included in the syntax may be sequentially signaled, configured, or parsed.

TABLE 52

|  | Descriptor |
|---|---|
| `transform_unit( x0, y0, tbWidth, tbHeight, treeType ) {` |  |
| `  if( treeType = = SINGLE_TREE   | |   treeType = = DUAL_TREE_LUMA )` |  |
| `    tu_cbf_luma[ x0 ][ y0 ]` | ae(v) |
| `  if( treeType = = SINGLE_TREE   | |   treeType = = DUAL_TREE_CHROMA ) {` |  |
| `    tu_cbf_cb[ x0 ][ y0 ]` | ae(v) |
| `    tu_cbf_cr[ x0 ][ y0 ]` | ae(v) |
| `  }` |  |

TABLE 52-continued

| | Descriptor |
|---|---|
| if( ( tu_cbf_luma[ x0 ][ y0 ]  \|\|  tu_cbf_cb[ x0 ][ y0 ]  \|  tu_cbf_cr[ x0 ][ y0 ] ) && <br>    treeType  !=  DUAL_TREE_CHROMA ) { <br>  if( cu_qp_delta_enabled_flag  &&  !IsCuQpDeltaCoded ){ <br>    cu_qp_delta_abs <br>    if( cu_gp_delta_abs ) <br>      cu_qp_delta_sign_flag <br>  } <br>} <br>if( MaxMtsIdx > 0 && tu_cbf_luma[ x0 ][ y0 ] && <br>    treeType  !=  DUAL_TREE CHROMA <br>    && ( tbWidth <= 32 ) && ( tbHeight <= 32 )  ) <br>  tu_mts_idx[ x0 ][ y0 ] <br>if( tu_cbf_luma[ x0 ][ y0 ] ) <br>  residual_coding( x0, y0, Log2( tbWidth ), Log2( tbHeight ), 0 ) <br>if( tu_chf_cb[ x0 ][ y0 ] ) <br>  residual coding( x0, y0, Log2( tbWidth / 2 ), Log2( tbHeight / 2 ), 1 ) <br>if( tu_cbf_cr[ x0 ][ y0 ] ) <br>  residual_coding( x0, y0, Log2( thWidth / 2 ), Log2( tbHeight / 2 ), 2 ) <br>} | <br><br><br><br>ae(v)<br><br>ae(v)<br><br><br><br><br><br>ae(v) |

TABLE 53

| | Descriptor |
|---|---|
| transform_unit( x0, y0, tbWidth, tbHeight, treeType, subTuIndex, chType ) { <br>  if( IntraSubPartitionsSplitType != ISP_NO_SPLIT && <br>    treeType = = SINGLE_TREE && subTuIndex = = NumIntraSubPartitions − 1 ) { <br>    xC = CbPosX[ chType ][ x0 ][ y0 ] <br>    yC = ChPosY[ chType ][ x0 ][ y0 ] <br>    wC = CbWidth[ chType ][ x0 ][ y0 ] / SubWidthC <br>    hC = CbHeight[ chType ][ x0 ][ y0 ] / SubHeightC <br>  } else { <br>    xC = x0 <br>    yC = y0 <br>    wC = tbWidth / SubWidthC <br>    hC = tbHeight / SubHeightC <br>  } <br>  chromaAvailable = treeType != DUAL_TREE_LUMA && ChromaArrayType != 0 && <br>    ( IntraSubPartitionsSplitType = = ISP_NO_SPLIT \|\| <br>      ( IntraSubPartitionsSplitType != ISP_NO_SPLIT && <br>        subTuIndex = = NumIntraSubPartitions − 1 ) ) <br>  if ( treeType = = SINGLE_TREE \| \| treeType = = DUAL_TREE_CHROMA ) && <br>      ChromaArrayType != 0 ) { <br>    if( ( IntraSubPartitionsSptitType − − ISP NO SPLIT && !( cu sbt flag && <br>      ( ( subTuIndex = = 0 && cu_sbt_pos_flag ) \|\| <br>        ( subTuIndex = = 1 && !cu_sbt_pos_flag ) ) ) ) \| <br>     ( IntraSubPartitionsSplitType != ISP_NO_SPLIT && <br>     ( subTuIndex = = NumIntraSubPartitions − 1 ) ) ) { <br>     tu_cbf_ch[ xC ][ yC ] <br>     tu_cbf_cr[ xC ][ yC] <br>    } <br>  } <br>  it( treeType = = SINGLE_TREE \| \| treeType = = DUAL_TREE_LUMA ) { <br>    if( ( IntraSubPartitionsSplitType = = ISP_NO_SPLIT && !( cu_sbt_flag && <br>      ( ( subTuIndex = = 0 && cu_sbt_pos_flag ) \|\| <br>        ( subTuIndex = = 1 && !cu_sbt_pos_flag ) ) ) && <br>      ( CuPredMode[ chType ][ x0 ][ y0 ] = = MODE_INTRA \| <br>        ( chromaAvailable && ( tu_cbf_cb[ xC ][ yC ] \| \| tu_cbf_cr[ xC ][ yC ] ) )  \| <br>        CbWidth[ chType ][ x0 ][ y0 ] > MaxTbSizeY \| \| <br>        CbHeight[ chType ][ x0 ][ y0 ] > MaxTbSizeY ) ) \| \| <br>     ( IntraSubPartitionsSplitType != ISP_NO_SPLIT && <br>     ( subTuIndex < NumIntraSubPartitions − 1 \| \| !InferTuCbfLuma ) ) ) <br>     tu_cbf_luma[ x0 ][ y0 ] <br>    if(IntraSubPartitionsSplitType != ISP_NO_SPLIT ) <br>      InferTuCbfLuma = InferTuCbfLuma && !tu_cbf_luma[ x0 ][ y0 ] <br>  } <br>} | <br><br><br><br><br><br><br><br><br><br><br><br><br><br><br><br><br><br><br><br><br><br><br><br><br><br>ae(v)<br>ae(v)<br><br><br><br><br><br><br><br><br><br><br><br><br>ae(v) |

TABLE 54

```
if( ( CbWidth[ chType ][ x0 ][ y0 ] > 64 | | CbHeight[ chType ][ x0 ][ y0 ] > 64 | |
      tu_cbf_luma[ x0 ][ y0 ]  | ( chromaAvailable && ( tu_cbf_cb[ xC ][ yC ] | |
      tu_cbf_cr[ xC ][ yC ] ) ) && treeType != DUAL_TREE_CHROMA ) {
  if( cu_qp_delta_enabled_flag && !IsCuQpDeltaCoded ) {
    cu_qp_delta_abs                                                               ae(v)
    if( cu qp delta abs )
      cu_qp_delta_sign_flag                                                       ae(v)
  }
}
if( ( CbWidth[ chType ][ x0 ][ y0 ] > 64 | | CbHeight[ chType ][ x0 ][ y0 ] > 64 | |
    ( chromaAvailable && ( tu cbf cb[ xC ][ yC ] | | tu cbf cr[ xC ][ yC ] ) ) ) &&
    treeType != DUAL_TREE_LUMA ) {
  if( cu chroma qp offset enabled flag && !IsCuChromaQpOffsetCoded) {
    cu_chroma_qp_offset_flag                                                      ae(v)
    if( cu_chroma_qp_offset_flag && chroma_qp_offset_list_len_minus1 > 0 )
      cu_chroma_qp_offset_idx                                                     ae(v)
  }
}
if( sps_joint_cbcr_enabled_flag && ( ( CuPredMode[ chType ][ x0 ][ y0 ] = = MODE_INTRA
      && ( tu_cbf_cb[ xC ][ yC ] |  tu_cbf_cr[ xC ][ yC ] ) ) | |
    ( tu_cbf_cb[ xC ][ yC ] && tu_cbf_cr[ xC ][ yC ] ) ) && chromaAvailable )
  tu_joint_cbcr_residual_flag[ xC ][ yC ]                                         ae(v)
if( tu_cbf_luma[ x0 ][ y0 ] && treeType !- DUAL_TREE_CHROMA ) {
  if( sps_transform_skip_enabled_flag && !BdpcmFlag[ x0 ][ y0 ][ 0 ] &&
      tbWidth <= MaxTsSize && tbHeight <= MaxTsSize &&
      ( IntraSubPartitionsSplit[ x0 ][ y0 ] = = ISP_NO_SPLIT ) && !cu_sbt_flag )
    transform_skip_flag[ x0 ][ y0 ][ 0 ]                                          ae(v)
  if( !transform_skip_flag[ x0 ][ y0 ][ 0 ] )
    residual_coding( x0, y0, Log2( tbWidth ), Log2( tbHeight ), 0 )
  else
    residual_ts_coding( x0, y0, Log2( tbWidth ), Log2( tbHeight ), 0 )
}
if( tu_cbf_cb[ xC ][ yC ] && treeType != DUAL_TREE_LUMA ) {
  if( sps_transform_skip_enabled flag && !BdpcmFlag[ x0 ][ y0 ][ 1 ] &&
      wC <= MaxTsSize && hC <= MaxTsSize && !cu_sbt_flag )
    transform_skip_flag[ xC ][ yC ][ 1 ]                                          ae(v)
  if( !transform_skip_flag[ xC ][ yC ][ 1 ] )
    residual_coding( xC, yC, Log2( wC ), Log2( hC ), 1 )
  else
    residual_ts_coding( xC, yC, Log2( wC ), Log2( hC ), 1 )
}
if( tu cbf cr[ xC ][ yC ] && treeType != DUAL TREE LUMA &&
    !( tu_cbf_cb[ xC ][ yC ] && tu_joint_cbcr_residual_flag[ xC ][ yC ] ) ) {
  if( sps_transform_skip_enabled_flag && !BdpcmFlag[ x0 ][ y0 ][ 2 ]&&
      wC <= MaxTsSize && hC <= MaxTsSize && !cu_sbt_flag )
    transform_skip_flag[ xC ][ yC ][ 2 ]                                          ae(v)
  if( !transform_skip_flag[ xC ][ yC ][ 2 ] )
    residual coding( xC, yC, Log2( wC ), Log2( hC ), 2 )
  else
    residual_ts_coding( xC, yC, Log2( wC ), Log2( hC ), 2 )
  }
}
```

For example, as illustrated in Table 52 or Tables 53 and 54, the information represented by the syntax elements included in the transform unit syntax or semantics of the syntax elements may be represented as in Table 55, which is illustrated in FIG. 21.

Meanwhile, for example, at least some of the information according to the aforementioned embodiments of the present document may be included in the residual coding syntax as illustrated in Tables 6 to 9 described above or Tables 56 to 59. Alternatively, at least some of the information according to the aforementioned embodiments of the present document may be signaled by being included in the transform unit syntax. For example, Tables 6 to 9 or Tables 56 to 59 may consecutively represent one syntax, and the syntax elements included in the syntax may be sequentially signaled, configured, or parsed.

TABLE 56

|  | Descriptor |
|---|---|
| residual coding( x0, y0, log2TbWidth, log2TbHeight, cIdx ) { | |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1) | |
|   lastScanPos = numSbCoeff | |

TABLE 56-continued

| | Descriptor |
|---|---|
| ```
lastSubBlock = ( 1 << ( log2TbWidth - log2TbHeight - 2 * log2SbSize ) ) - 1
do {
  if( lastScanPos  = =  0 {
    lastScanPos = numSbCoeff
    lastSubBlock- -
  }
  lastScanPos- -
  xS = DiagScanOrder[ log2TbWidth - log2SbSize ][ log2TbHeight - log2SbSize ]
        [ lastSubBlock ][ 0 ]
  yS = DiagScanOrder[ log2TbWidth - log2SbSize ][ log2TbHeight - log2SbSize ]
        [ lastSubBlock ][ 1 ]
  xC = ( xS << log2SbSize ) +
    DiagScanOrder[ log2SbSize ][ log2SbSize ][ lastScanPos ][ 0 ]
  yC = ( yS << log2SbSize ) +
    DiagScanOrder[ log2SbSize ][ log2SbSize ][ lastScanPos ][ 1 ]
} while( ( xC  !=  LastSignificantCoeffX )  | |  ( yc  !=  LastSignificantCoeffY ) )
numSigCoeff = 0
QState - 0
for( i = lastSubBlock; i  >=  0; i- - ) {
  startQStateSb - QState
  xS = DiagScanOrder[ log2TbWidth - log2SbSize ][ log2TbHeight - log2SbSize ]
        [ lastSubBlock ][ 0 ]
  yS = DiagScanOrder[ log2TbWidth - log2SbSize ][ log2TbHeight - log2SbSize ]
        [ lastSubBlock ][ 1 ]
  inferSbDcSigCoeffFlag = 0
  if( ( i < lastSubBlock )  &&   ( i > 0 ) ) {
    coded_sub_block_flag[ xS ][ yS ]
    inferSbDcSigCoeffFlag = 1
  }
  firstSigScanPosSb = numSbCoeff
  lastSigScanPosSb = -1
  remBinsPass1 = ( log2SbSize < 2 ? 6 : 28 )
  remBinsPass2 = ( log2SbSize < 2 ? 2 : 4 )
  firstPosMode0 - ( i  - -  lastSubBlock  ? lastScanPos - 1 : numSbCoeff - 1)
  firstPosMode1 = -1
  firstPosMode2 - -I
  for( n = ( i  = =  firstPosMode0; n  >=  0  &&  remBinsPass1 >= 3; n- - ) {
    xC - ( xS << log2SbSize ) + DiagScanOrder[ log2SbSize ][ log2SbSize ][ n ][ 0 ]
``` | ae(v) |

TABLE 57

| | |
|---|---|
| ```
    yC = ( yS << log2SbSize ) - DiagScanOrder[ log2SbSize ][ log2SbSize ][ n ][ 1 ]
    if( coded_sub_block_flag[ xS ][ yS ]  &&   ( n > 0  | |  !inferSbDcSigCoeffFlag ) )
}
      sig_coeff_flag[ xC ][ yC ]
    remBinsPass1- -
    if( sig_coeff_flag[ xC ][ yC ] )
      inferSbDcSigCoeffFlag - 0
    }
    if( sig_coeff_flag[ xC ][ yC ] )  {
      numSigCoeff-+
      abs_level_gt1_flag[ n ]
      remBinsPass1- -
      if( abs_level_gt1_flag[ n ] ) {
        par_level_flag[ n ]
        remBinsPass1- -
        if( remBinsPass2 > 0 {
          remBinsPass2- -
          if( remBinsPass2 = = 0 )
            firstPosMode1 = n - 1
        }
      }
      if( lastSigScanPosSb  = =  -1 )
        lastSigScanPosSb = n
      firstSigScanPosSb = n
    }
    AbsLevelPass1[ xC ][ yC ] =
      sig_coeff_flag[ xC ][ yC ] - par_level_flag[ n ] - abs_level_gt1_flag[ n ]
    if( dep_quant_enabled_flag )
      QState = QStateTransTable[ QState ][ AbsLevelPass1[ xC ][ yC ] & 1 ]
    if( remBinsPass1 < 3 )
      firstPosMode2 = n - 1
  }
``` | ae(v)<br><br><br><br><br><br>ae(v)<br><br>ae(v) |

TABLE 57-continued

```
    if( firstPosMode1 < firstPosMode2 )
        firstPosMode1 = firstPosMode2
    for( n = numSbCoeff − 1; n  >=  firstPosMode2; n− − )
        if( abs_level_gt1_flag[ n1 ] )
            abs_level_gt3_flag[ n ]                                      ae(v)
    for( n = numSbCoeff − 1; n  >=  firstPosMode1; n− − ) {
        xC = ( xS << log2SbSize ) − DiagScanOrder[ log2SbSize ][ log2SbSize ][ n ][ 0 ]
        yC = ( yS << log2SbSize ) − DiagScanOrder[ log2SbSize ][ log2SbSize ][ n ][ 1 ]
        if( abs_level_gt3_flag[ n ] )
            abs_remainder[ n ]                                           ae(v)
        AbsLevel[ xC ][ yC ] = AbsLevelPass1[ xC ][ yC ]+
                     2 * ( abs_level_gt3_flag[ n ] + abs_remainder[ n ] )
    }
    for( n = firstPosMode1; n  >  firstPosMode2; n− − ) {
        xC = ( xS << log2SbSize ) − DiagScanOrder[ log2SbSize ][ log2SbSize ][ n ][ 0 ]
        yC = ( yS << log2SbSize ) − DiagScanOrder[ log2SbSize ][ log2SbSize ][ n ][ 1 ]
```

TABLE 58

```
        if( abs_level_gt1_flag[ n ] )
            abs_remainder[ n ]                                           ae(v)
        AbsLevel[ xC ][ yC ] = AbsLevelPass1[ xC ][ yC ] + 2 * abs_remainder[ n ]
    }
    for( n = firstPosMode2; n >= 0; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        dec_abs_level[ n ]                                               ae(v)
        if(AbsLevel[ xC ][ yC ] > 0 )
            firstSigScanPosSb = n
        if( dep_quant_enabled_flap )
            QState = QStateTransTable[ QState ][ AbsLevel[ xC ][ yC ] & 1 ]
    }
    if( dep_quant_enabled_flag  ||  !sign_data_hiding_enabled_flag )
        signHidden = 0
    else
        signHidden = ( lastSigScanPosSb − firstSigScanPosSb > 3 ? 1 : 0 )
    for( n = numSbCoeff − 1; n >= 0; n− − ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
        if( sig_coeff_flag[ xC ][ yC ]  &&
            ( !signHidden  ||  ( n  !=  firstSigScanPosSb ) ) )
            coeff_sign_flag[ n ]                                         ae(v)
    }
    if( dep_quant_enabled_flag )  {
        QState = startQStateSb
        for( n = numSbCoeff  ); n  >= 0; n     ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] )
                TransCoeffLevel[ x0 ][ y0 ][ cIdx ][ xC ][ yC ] =
                    ( 2 * AbsLevel[ xC ][ yC ]  −  ( QState > 1 ? 1 : 0 ) ) *
                    ( 1  −  2 * coeff_sign_flag[ n ] )
            QState = QStateTransTable[ QState ][ par_level_flag[ n ] ]
    } else {
        sumAbsLevel = 0
        for( n = numSbCoeff − 1; n  >=  0; n− − ) {
            xC = ( xS << log2SbSize ) +
                DiagScanOrder[ log2SbSize ][ log2SbSize ][ n ][ 0 ]
            yC = ( yS << log2SbSize ) +
                DiagScanOrder[ log2SbSize ][ log2SbSize ][ n ][ 1 ]
            if( sig_coeff_flag[ xC ][ yC ] ) {
                TransCoeffLevel[ x0 ][ y0 ][ cIdx ][ xC ][ yC ]  =
                    AbsLevel[ xC ][ yC ] * ( 1 − 2 * coeff_sign_flag[ n ] )
                if( signHidden )  {
                    sumAbsLevel  +=   AbsLevel[ xC ][ yC ]
                    if( ( n  = =  firstSigScanPosSb )  &&  ( sumAbsLevel % 2 )  = =  1 ) )
```

TABLE 59

```
TransCoeffLevel[ x0 ][ y0 ][ cIdx ][ xC ][ yC ] =
    −TransCoeffLevel[ x0 ][ y0 ][ cIdx ][ xC ][ yC ]
      }
     }
    }
   }
  }
 }
}
```

For example, as illustrated in Tables 6 to 9 or Tables 56 to 59 described above, the information represented by the syntax elements included in the residual coding syntax or semantics of the syntax elements may be represented as described above with Tables 6 to 9.

Meanwhile, for example, an embodiment of the present document may perform a scaling or transform procedure based on at least some of the aforementioned syntax or syntax elements. For example, an embodiment may derive the residual samples (or residual sample array) for the samples of the current (transform) block, as illustrated in Table 60.

TABLE 60

Scaling and transformation process

Inputs to this process are:
- a luma location ( xTbY, yTbY ) specifying the top-left sample of the current luma transform block relative to the top-left luma sample of the current picture.
- a variable cIdx specifying the colour component of the current block,
- a variable nTbW specifying the transform block width,
- a variable nTbH specifying the transform block height.

Output of this process is the (nTbW)x(nTbH) array of residual samples resSamples[ x ][ y ] with x − 0..nTbW − 1, y = 0..nTbH − 1.

The variables bitDepth, bdShift and tsShift are derived as follows:
    bitDepth = ( cIdx  ==  0 ) ? $BitDepth_Y$ : $BitDepth_C$
    bdShift = Max( 20 − bitDepth, 0 )
    tsShift = 5 + ( ( Log2( nTbW ) + Log2( nTbH ) ) / 2 )

The (nTbW)x(nTbH) array of residual samples resSamples is derived as follows:
1. The scaling process for transform coefficients as specified in clause 8.5.3 is invoked with the transform block location ( xTbY, yTbY ), the transform block width nTbW and the transform block height nTbH, the colour component variable cIdx and the bit depth of the current colour component bitDepth as inputs, and the output is an (nTbW)x(nTbH) array of scaled transform coefficients d.
2. The (nTbW)x(nTbH) array of residual samples r is derived as follows:
   - If IsTrafoSkip is equal to 1 and cIdx is equal to 0, the residual sample array values r[ x ][ y ] with x = 0..nTbW − 1, y = 0..nTbH − 1 are derived as follows:
     r[ x ][ y ] = d[ x ][ y ] << tsShift
   - Otherwise (IsTrafoSkip is equal to 0 or cIdx is not equal to 0), the transformation process for scaled transform coefficients as specified in clause 8.5.4.1 is invoked with the transform block location ( xTbY, yTbY ), the transform block width nTbW and the transform block height nTbH, the colour component variable cIdx and the (nTbW)x(nTbH) array of scaled transform coefficients d as inputs, and the output is an (nTbW)x(nTbH) array of residual samples r.
3. The residual samples resSamples[ x ][ y ]with x = 0..nTbW − 1, y = 0..nTbH − 1 are derived as follows:
   resSamples[ x ][ y ] = ( r[ x ][ y ] + ( 1  <<  ( bdShift − 1 ) ) )  >>  bdShift Meanwhile, alternatively, for example, an embodiment of the present document may perform the transform procedure for the transform coefficient based on at least some of the aforementioned syntax or syntax elements. For example, an embodiment may derive the residual samples (or residual sample array) based on the information about the (scaled) transform coefficients as illustrated in Table 61.

TABLE 61

Transformation process for scaled transform coefficients 8.5.4.1 General
Inputs to this process are:
- a luma location ( xTbY, yTbY ) specifying the top-left sample of the current luma transform block relative to the top-left luma sample of the current picture.
   a variable nTbW specifying the width of the current transform block.
- a variable nTbH specifying the height of the current transform block.
- a variable cIdx specifying the colour component of the current block,
   an (nTbW)x(nTbH) array d[ x ][ y ] of scaled transform coefficients with x − 0..nTbW − 1, y − 0..nTbH − 1.

Output of this process is the (nThW)x(nTbH) array r[ x ][ y ] of residual samples with x = 0..nTbW − 1, y = 0..nTbH  1.

The variables nonZeroW and nonZeroH are derived as follows:
    nonZeroW = Min( nTbW, 32 )
    nonZeroH = Min( nTbH, 32 )

The (nTbW)x(nTbH) array r of residual samples is derived as follows:
4. Each (vertical) column of scaled transform coefficients d[ x ][ y ]with x = 0..nonZeroW − 1, y = 0..nonZeroH − 1 is transformed to c[ x ][ y ] with x = 0..nonZeroW − 1, y = 0..nTbH − 1 by invoking the one-dimensional transformation process as specified in clause 8.5.4.2 for each column x = 0..nonZeroW − 1 with the height of the transform block nTbH, the non-zero height of the scaled transform coefficients

TABLE 61-continued

Transformation process for scaled transform coefficients nonZeroH, the list d[ x ][ y ]with y = 0..nonZeroH − 1 and the transform type variable trType set equal to TrVerType as inputs, and the output is the list c[ x ][ y ] with y = 0..nTbH − 1.

5. The intermediate sample values g[ x ][ y ]with x = 0..nonZeroW − 1, y = 0..nTbH − 1 are derived as follows:
   g[ x ][ y ] = Clip3( CoeffMin, CoeffMax, ( e[ x ][ y ] + 64 )  >>  7 )

6. Each (horizontal) row of the resulting array g[ x ][ y ] with x = 0..nonZeroW − 1, y = 0..nTbH − 1 is transformed to r[ x ][ y ] with x = 0..nTbW − 1, y = 0..nThH − 1 by invoking the one-dimensional transformation process as specified in clause 8.5.4.2 for each row y = 0..nTbH 1 with the width of the transform block nTbW, the non-zero width of the resulting array g[ x ][ y ] nonZeroW, the list g[ x ][ y ]with x = 0..nonZeroW − 1 and the transform type variable trType set equal to TrHorType as inputs, and the output is the list r[ x ][ y ] with x − 0..nTbW − 1.

Meanwhile, for example, in an embodiment of the present document, the binarization as illustrated in Tables 62 and 63 may be used for at least some of the aforementioned syntax or syntax elements. Alternatively, an embodiment may encode/decode at least some of the aforementioned syntax elements by using the binarization as illustrated in Tables 62 and 63.

TABLE 62

| | | Binarization | |
|---|---|---|---|
| Syntax structure | Syntax element | Process | Input parameters |
| tile_group_data( ) | end_of_tile_group_flag | FL | cMax = 1 |
| coding_tree_unit( ) | alf_ctb_flag[ ][ ][ ] | FL | cMax − 1 |
| sao( ) | sao_merge_left_flag | FL | cMax = 1 |
| | sao_merge_up_flag | FL | cMax = 1 |
| | sao_type_idx_luma | TR | cMax − 2, cRiceParam − 0 |
| | sao_type_idx_chroma | TR | cMax − 2, cRiceParam − 0 |
| | sao_offset_abs[ ][ ][ ][ ] | TR | cMax = (1 << ( Min( bitDepth, 10 ) − 5 ) ) − 1, cRiceParain = 0 |
| | sao_offset_sign[ ][ ][ ][ ] | FL | cMax − 1 |
| | sao_band_position[ ][ ][ ] | FL | cMax  31 |
| | sao_eo_class_luma | FL | cMax − 3 |
| | sao_eo_class_chroma | FL | cMax = 3 |
| coding_quadtree( ) | qt_split_cu_flag[ ][ ] | FL | cMax − 1 |
| multi_type_tree( ) | mtt_split_cu_flag | FL | cMax − 1 |
| | mtt_split_cu_vertical_flag | FL | cMax = 1 |
| | mtt_split_cu_binary_flag | FL | cMax = 1 |
| coding_unit( ) | cu_skip_flag[ ][ ] | FL | cMax − 1 |
| | pred_mode_flag | FL | cMax − 1 |
| | pcm_flag[ ][ ] | FL | cMax − 1 |
| | intra_luma_ref_idx[ ][ ] | TR | cMax − 2, cRiceParam = 0 |
| | intra_luma_mpm_flag[ ][ ] | FL | cMax − 1 |
| | intra_luma_mpm_idx[ ][ ] | TR | cMax − 5, cRiceParam − 0 |
| | intra_luma_mpm_remainder[ ][ ] | TR | cMax − 60 |
| | intra_chroma_pred_mode[ ][ ] | 9.5.3.7 | — |
| | merge_flag[ ][ ] | FL | cMax − 1 |
| | inter_pred_idc[ x0 ][ y0 ] | 9.5.3.8 | cbWidth, cbHeight |
| | inter_affine_flag[ ][ ] | FL | cMax − 1 |
| | cu_affine_type_flag[ ][ ] | FL | cMax = 1 |
| | ref_idx_l0[ ][ ] | TR | cMax = num_ref_idx_l0_active_minus1, cRiceParam = 0 |
| | mvp_l1_flag[ ][ ] | FL | cMax − 1 |
| | ref_idx_l1[ ][ ] | TR | cMax − num_ref_idx_l1_active_minus1, cRiceParam − 0 |
| | mvp_l1_flag[ ][ ] | FL | cMax − 1 |
| | avmr_flag[ ][ ] | FL | cMax − 1 |
| | amvr_4pel_flag[ ][ ] | FL | cMax − 1 |
| | gbi_idx[ ][ ] | TR | cMax − NoBackwardPredFlag ? 4: 2 |
| | cu_cbf | FL | cMax − 1 |

TABLE 63

| | | Binarization | |
|---|---|---|---|
| Syntax structure | Syntax element | Process | Input parameters |
| merge_data( ) | mmvd_flag[ ][ ] | FL | cMax − 1 |
| | mmvd_merge_flag[ ][ ] | FL | cMax = 1 |
| | nmvd_distance_idx[ ][ ] | TR | cMax = 7, cRiceParam = 0 |

TABLE 63-continued

| Syntax structure | Syntax element | Binarization Process | Input parameters |
|---|---|---|---|
| | mmvd_direction_idx[ ][ ] | FL | cMax = 3 |
| | ciip_flag[ ][ ] | FL | cMax = 1 |
| | ciip_luma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | EG1 | — |
| | merge_idx[ ][ ] | TR | cMax = MaxNumMergeCand 1, cRiceParam = 0 |
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | mvd_sgn_flag[ ] | FL | cMax = 1 |
| transform_unit( ) | tu_cbf_luma[ ][ ][ ] | FL | cMax = 1 |
| | tu_cbf_cb[ ][ ][ ] | FL | cMax = 1 |
| | tu_cbf_cr[ ][ ][ ] | FL | cMax = 1 |
| | cu_qp_delta_abs | 9.5.3.9 | — |
| | cu_qp_delta_sign_flag | FL | cMax = 1 |
| | tu_mts_idx[ ][ ] | TR | cMax = MaxMtsIdx, cRiceParam = 0 |
| residual_coding( ) | last_sig_coeff_x_prefix | TR | cMax = ( log2TbWidth << 1 ) 1, cRiceParam = 0 |
| | last_sig_coeff_y_prefix | TR | cMax = ( log2TbHeight << 1 ) − 1, cRiceParam = 0 |
| | last_sig_coeff_x_suffix | FL | cMax = ( 1 << ( ( last_sig_coeff_x_prefix >> 1 ) 1 ) 1 ) |
| | last_sig_coeff_y_suffix | FL | cMax = ( 1 << ( ( last_sig_coeff_y_prefix >> 1 ) − 1 ) − 1 ) |
| | coded_sub_block_flag[ ][ ] | FL | cMax = 1 |
| | sig_coeff_flag[ ][ ] | FL | cMax = 1 |
| | par_level_flag[ ] | FL | cMax = 1 |
| | abs_level_gt1_flag[ ] | FL | cMax = 1 |
| | abs_level_gt3_flag[ ] | FL | cMax = 1 |
| | abs_remainder[ ] | 9.5.3.10 | cIdx, current sub-block index i, x0, y0 |
| | dec_abs_level[ ] | 9.5.3.11 | cIdx, x0, y0, xC, yC, log2TbWidth, log2TbHeight |
| | coeff_sign_flag[ ] | FL | cMax = 1 |

Meanwhile, for example, an embodiment of the present document may assign the context index increment (ctxInc) to derive (or represent) the context index (ctxIdx) as illustrated in Tables 64 and 65 with respect to at least some of the aforementioned syntax or syntax elements.

TABLE 64

| Syntax element | binIdx | | | | | |
| | 0 | 1 | 2 | 3 | 4 | >=5 |
|---|---|---|---|---|---|---|
| end_of_tile_group_flag | terminate | na | na | na | na | na |
| alf_ctb_flag[ ][ ][ ] | 0 . . . 8 (clause 9.5.4.2.2) | na | na | na | na | na |
| sao_merge_left_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | na |
| sao_offset_sign[ ][ ][ ][ ] | bypass | na | na | na | na | na |
| sao_band_position[ ][ ][ ] | bypass | bypass | bypass | bypass | bypass | bypass |
| sao_eo_class_luma | bypass | bypass | na | na | na | na |
| sao_eo_class_chroma | bypass | bypass | na | na | na | na |
| qt_split_cu_flag[ ][ ] | 0 . . . 5 (clause 9.5.4.2.2) | na | na | na | na | na |
| mtt_split_cu_flag | 0 . . . 12 (clause 9.5.4.2.2) | na | na | na | na | na |
| mtt_split_cu_vertical_flag | ( cbWidth == cbHeight ) ? 0 : ( (cbWidth > cbHeight ) ? 1 : 2) | na | na | na | na | na |
| mtt_split_cu_binary_flag | 0 | na | na | na | na | na |
| cu_skip_flag[ ][ ] | 0 . . . 12 (clause 9.5.4.2.2) | na | na | na | na | na |
| pred_mode_flag | 0 | na | na | na | na | na |
| pcm_flag[ ][ ] | terminate | na | na | na | na | na |
| intra_luma_ref_idx[ ][ ] | 0 | 1 | 2 | na | na | na |
| intra_luma_mpm_flag[ ][ ] | 0 | na | na | na | na | na |
| intra_luma_mpm_idx[ ][ ] | bypass | bypass | bypass | bypass | bypass | na |
| intra_luma_mpm_remainder[ ][ ] | bypass | bypass | bypass | bypass | bypass | bypass |
| intra_chroma_pred_mode[ ][ ] | 0 | bypass | bypass | na | na | na |
| sps_cclm_enabled_flag == 0 | | | | | | |
| intra_chroma_pred_mode[ ][ ] | | | | | | |

TABLE 64-continued

|  | binIdx | | | | | |
| --- | --- | --- | --- | --- | --- | --- |
| Syntax element | 0 | 1 | 2 | 3 | 4 | >=5 |
| sps_cclm_enabled_flag == 1 && bin at binIdx equal to 2 - - 0 intra_chroma_pred_mode[ ][ ] | 0 | 1 | 2 | bypass | bypass | na |
| sps_cclm_enabled_flag == 1 && bin at binIdx equal to 2 - - 1 | 0 | 1 | 2 | 2 | na | na |
| merge_subblack_flag[ ][ ] | 0, 1, 2 (clause 9.5.4.2.2) | na | na | na | na | na |
| merge_subblock_idx[ ][ ] sps_sbtmvp_enabled_flag - - 0 | 0 | bypass | bypass | bypass | bypass | bypass |
| merge_subblock_idx[ ][ ] sps_sbtmvp_enabled_flag - -1 | 0 | 1 | 2 | 3 | 4 | 4 |
| merge_flag[ ][ ] | 0 | na | na | na | na | na |
| mmvd_flag[ ][ ] | 0 | na | na | na | na | na |
| mmvd_merge_flag[ ][ ] | 0 | na | na | na | na | na |
| mmvd_distance_idx[ ][ ] | 0 | bypass | bypass | bypass | bypass | bypass |
| mmvd_direction_idx[ ][ ] | bypass | bypass | na | na | na | na |
| merge_triangle_flag[ ][ ] | 0, 1, 2 (clause 9.5.4.2.2) | na | na | na | na | na |
| merge_triangle_idx[ ][ ] | 0 | bypass | bypass | bypass | bypass | bypass |
| merge_idx[ ][ ] | 0 | bypass | bypass | bypass | bypass | na |
| ciip_flag[ ][ ] | 0 | na | na | na | na | na |
| ciip_luma_mpm_flag[ ][ ] | 0 | na | na | na | na | na |
| ciip_luma_mpm_idx[ ][ ] | 0 | bypass | na | na | na | na |

TABLE 65

|  | binIdx | | | | | |
| --- | --- | --- | --- | --- | --- | --- |
| Syntax element | 0 | 1 | 2 | 3 | 4 | >=5 |
| inter_pred_idc[ x0 ][ y0 ] | ( cbWidth + cbHeight ) != 8 ? ( ( 1 + Log2( cbWidth ) + Log2( cbHeight ) ) >> 1 ) : 4 | 4 | na | na | na | na |
| inter_affine_flag[ ][ ] | 0, 1, 2 (clause 9.5.4.2.2) | na | na | na | na | na |
| cu_affine_type_flag[ ][ ] | 0 | na | na | na | na | na |
| ref_idx_l0[ ][ ] | 0 | 1 | bypass | bypass | bypass | bypass |
| ref_idx_l1[ ][ ] | 0 | 1 | bypass | bypass | bypass | bypass |
| mvp_l0_flag[ ][ ] | 0 | na | na | na | na | na |
| mvp_l1_flag[ ][ ] | 0 | na | na | na | na | na |
| amvr_flag[ ][ ] | 0, 1, 2 (clause 9.5.4.2.2) | na | na | na | na | na |
| amvr_4pel_flag[ ][ ] | 0 | na | na | na | na | na |
| gbi_idx[ ][ ] NoBackwardPredFlag - - 0 | 0 | 1 | na | na | na | na |
| gbi_idx[ ][ ] NoBackwardPredFlag == 1 | 0 | 1 | 2 | 3 | na | na |
| cu_cbf | 0 | na | na | na | na | na |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |
| tu_cbf_luma[ ][ ][ ] | trDepth == 0 ? 1 : 0 | na | na | na | na | na |
| tu_cbf_cb[ ][ ][ ] | trDepth == 0 ? 1 : 0 | na | na | na | na | na |
| tu_cbf_cr[ ][ ][ ] | tu_cbf_cb[ ][ ][ ] | na | na | na | na | na |
| cu_qp_delta_abs | 0 | 1 | 1 | 1 | 1 | bypass |
| cu_qp_delta_sign_flag | bypass | na | na | na | na | na |
| tu_mts_idx[ ][ ] MaxMtsIdx == 1 | 0 | na | na | na | na | na |
| tu_mts_idx[ ][ ] MaxMtsIdx - - 4 | 1 . . . 6 (1 + eqtDepth) | 7 | 8 | 9 | na | na |
| tu_mts_idx[ ][ ] MaxMtsIdx - - 5 | 0 | 1 . . . 6 (1 + eqtDepth) | 7 | 8 | 9 | na |
| last_sig_coeff_x_prefix | 0 . . . 23 (clause 9.5.4.2.3) | | | | | |
| last_sig_coeff_y_prefix | 0 . . . 23 (clause 9.5.4.2.3) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | 0 . . . 3 (clause 9.5.4.2.4) | na | na | na | na | na |
| sig_coeff_flag[ ][ ] | 0 . . . 89 (clause 9.5.4.2.6) | na | na | na | na | na |
| par_level_flag[ ] | 0 . . . 32 (clause 9.5.4.2.7) | na | na | na | na | na |
| abs_level_gt1_flag[ ] | 0 . . . 32 (clause 9.5.4.2.7) | na | na | na | na | na |
| abs_level_gt3_flag[ ] | 0 . . . 32 (clause 9.5.4.2.7) | na | na | na | na | na |

TABLE 65-continued

| Syntax element | binIdx | | | | | |
|---|---|---|---|---|---|---|
| | 0 | 1 | 2 | 3 | 4 | >=5 |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] | bypass | na | na | na | na | na |

Figure 13:
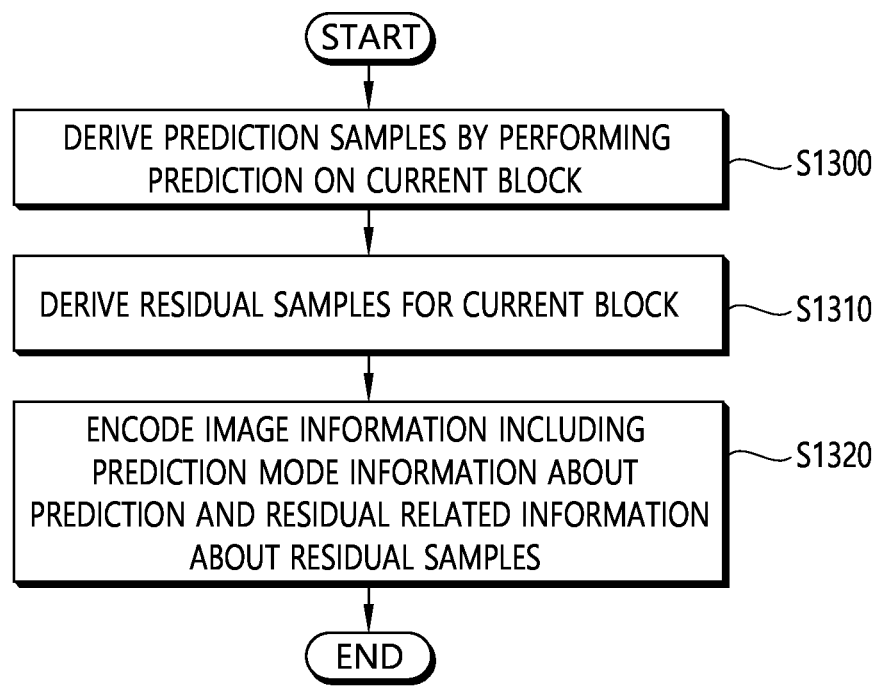
FIGS. 13 and 14 are diagrams schematically illustrating an example of a video/image encoding method and related components according to embodiment (s) of the present document.
Figure 14:
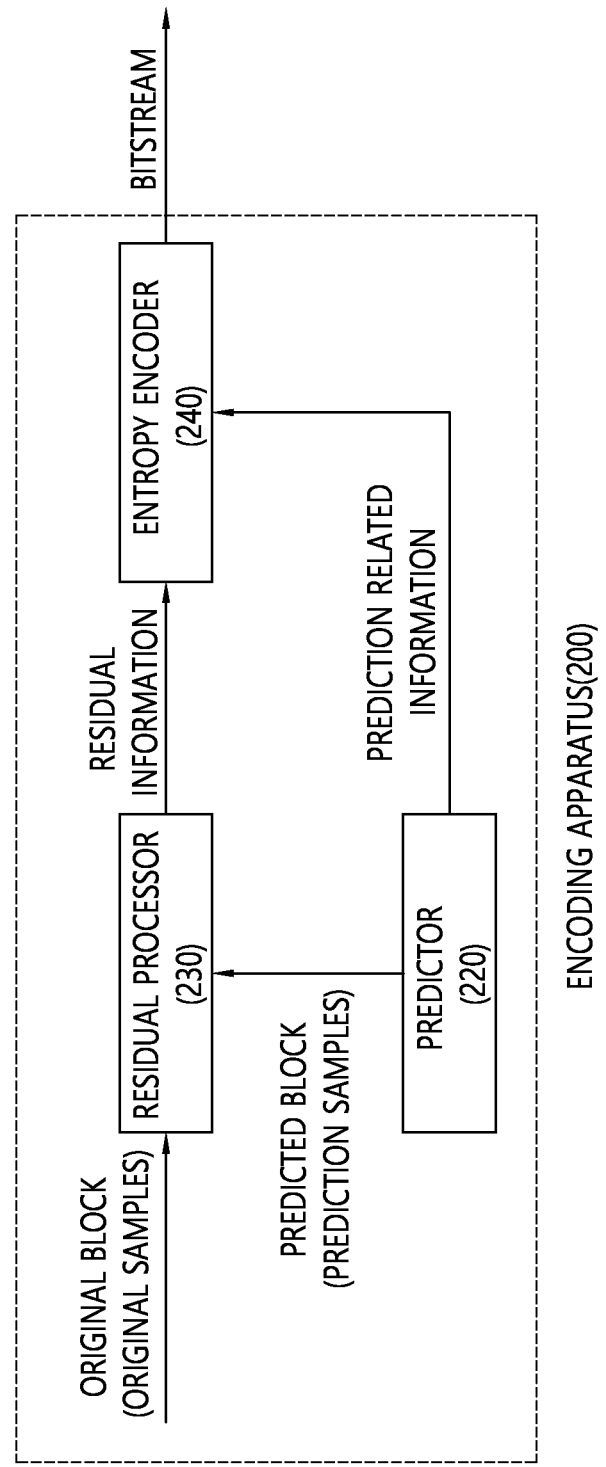

FIGS. 13 and 14 schematically illustrate an example of a video/image encoding method and related components according to an embodiment (s) of the present document.

The method disclosed in FIG. 13 may be performed by the encoding apparatus disclosed in FIG. 2. Specifically, for example, S1300 illustrated in FIG. 13 may be performed by the predictor 220 of the encoding apparatus in FIG. 14, S1310 illustrated in FIG. 13 may be performed by the residual processor 230 of the encoding apparatus in FIG. 14, and S1320 illustrated in FIG. 13 may be performed by the entropy encoder 240 of the encoding apparatus in FIG. 14. The method disclosed in FIG. 13 may include the aforementioned embodiments in the present document.

Referring to FIG. 13, the encoding apparatus may derive prediction samples by performing prediction on the current block (S1300). For example, the encoding apparatus may derive the prediction samples by performing the prediction on the current block, and may derive information about a prediction mode which performs the prediction. For example, the prediction mode may be an intra prediction mode or an inter prediction mode. For example, when the prediction mode is the intra prediction mode, the encoding apparatus may derive the prediction samples based on samples around the current block. Alternatively, when the prediction mode is the inter prediction mode, the encoding apparatus may derive the prediction samples based on reference samples within a reference picture of the current block.

The encoding apparatus may derive residual samples for the current block (S1310). For example, the encoding apparatus may derive the residual samples (or residual blocks) for the current block based on the original samples and the prediction samples (or predicted blocks) for the current block. Here, the residual samples may also be represented by a residual sample array. Alternatively, for example, although not illustrated in FIG. 13, the encoding apparatus may generate reconstruction samples of the current block based on the prediction samples and the residual samples. For example, the encoding apparatus may also generate the reconstruction samples (or reconstructed blocks) by adding the residual samples (or residual blocks) to the prediction samples (or predicted blocks).

The encoding apparatus may encode image information including prediction mode information about the prediction and residual related information about the residual samples (S1320).

For example, the encoding apparatus may generate prediction mode information based on the prediction mode, and the image information may include the prediction mode information. That is, when the current block performs the prediction through the intra prediction mode, the prediction mode information may include the information about the intra prediction mode, and when the current block performs the prediction through the inter prediction mode, the prediction mode information may include the information about the inter prediction mode.

For example, the encoding apparatus may generate the residual related information including the information about the residual samples (or residual sample array), and the image information may include the residual related information. The information related to the residual samples or the residual related information may include the information about the transform coefficients related to the residual samples.

For example, the residual related information may include residual coding information (or residual coding syntax). Alternatively, the residual related information may include transform unit information (or transform unit syntax). Alternatively, the residual related information may also include the residual coding information and the transform unit information.

For example, the residual related information may include the transform skip flag based on a size of the current block and a maximum transform skip size. Alternatively, whether the residual related information includes the transform skip flag may be determined based on the size of the current block and the maximum transform skip size. For example, the transform skip flag may represent whether the transform skip is applied to the current block. Alternatively, the transform skip flag may also be represented by the transform_skip_flag syntax element. For example, when the value of the transform_skip_flag syntax element is 0, the transform skip may be applied to the current block, and when the value of the transform_skip_flag syntax element is 1, the transform skip may not be applied to the current block. Alternatively, according to the setting, when the value of the transform_skip_flag syntax element is 1, the transform skip may be applied to the current block, and when the value of the transform_skip_flag syntax element is 0, the transform skip may not be applied to the current block.

For example, the size of the current block may represent the width of the current block and/or the height of the current block. The maximum transform skip size may represent the maximum size of the block in which the Transform Skip (TS) is enabled. Alternatively, the maximum transform skip size may also be represented by MaxTs Size. For example, when the width of the current block or the height of the current block is smaller than or equal to the maximum transform skip size, the residual related information may include the transform skip flag.

For example, the image information may include information about the maximum transform skip size. Alternatively, the information about the maximum transform skip size may be (entropy) encoded by being included in the image information. For example, the maximum transform size may be represented based on the information about the maximum transform skip size. For example, the information about the maximum transform skip size may be included in the high level syntax, and the high level syntax may be (entropy) encoded by being included in the image information. For example, the high level syntax may be a Network Abstraction Layer (NAL) unit syntax, a Sequence Parameter Set (SPS) syntax, a Picture Parameter Set (PPS) syntax, or a slice header syntax.

Alternatively, for example, the information about the maximum transform skip size may be included in the SPS, and the maximum transform size may be represented based on the information about the maximum transform skip size included in the SPS. Alternatively, for example, the information about the maximum transform skip size may be included in the PPS, and the maximum transform size may be represented based on the information about the maximum transform skip size included in the PPS. Here, the SPS or the PPS may represent the SPS syntax or the PPS syntax, and other syntaxes may also be used by omitting the term syntax.

For example, the information about the maximum transform skip size may include information about a value obtained by adding −2 to a log value, and the log value may be a log value having a base 2 for the maximum transform skip size. That is, the information about the maximum transform skip size may represent information about a value obtained by adding −2 to the log value having the base 2 of the maximum transform skip size. Alternatively, for example, the information about the maximum transform skip size may also include the information about the log value (having the base 2) of the maximum transform skip size.

For example, the information about the maximum transform skip size may include a log 2_transform_skip_max_size_minus2 syntax element. Alternatively, the information about the maximum transform skip size may represent the log 2_transform_skip_max_size_minus2 syntax element. For example, the log 2_transform_skip_max_size_minus2 syntax element may be included in the high level syntax, the SPS syntax, or the PPS syntax.

For example, referring to Table 41, the maximum transform skip size may be represented based on MaxTsSize=1<< (log 2_transform_skip_max_size_minus2+2). Here, the MaxTsSize may represent the maximum transform skip size, and the log 2_transform_skip_max_size_minus2 may represent the value of the log 2_transform_skip_max_size_minus2 syntax element. In addition, the << may represent an arithmetic shift operator. That is, the log 2_transform_skip_max_size_minus2 syntax element may represent the MaxTsSize by using the MaxTsSize=1<<(log 2_transform_skip_max_size_minus2+2). Alternatively, the log 2_transform_skip_max_size_minus2 syntax element may represent the value of the log 2_transform_skip_max_size_minus2 syntax element according to the MaxTsSize. Alternatively, the log 2_transform_skip_max_size_minus2 syntax element may represent the value of the log 2_transform_skip_max_size_minus2 syntax element corresponding to the MaxTsSize. For example, the value of the log 2_transform_skip_max_size_minus2 syntax element may be represented by one of the candidate values of 0 to 3, but is not limited thereto. Alternatively, the value of the log 2_transform_skip_max_size_minus2 syntax element may be represented by 0, 1, 2, or 3, but is not limited thereto.

In addition, for example, the maximum transform skip size may be represented by one of candidate sizes including 4, 8, 16, or 32. The maximum transform skip size may be represented based on the value of the log 2_transform_skip_max_size_minus2 syntax element. Alternatively, the maximum transform skip size may be represented by one of candidate sizes including 4, 8, 16, or 32 based on the value of the log 2_transform_skip_max_size_minus2 syntax element. For example, when the value of the log 2_transform_skip_max_size_minus2 syntax element is 0, the maximum transform skip size may be represented by 4 based on the aforementioned 1<<(log 2_transform_skip_max_size_minus2+2). Alternatively, when the value of the log 2_transform_skip_max_size_minus2 syntax element is 1, the maximum transform skip size may be represented by 8 based on the aforementioned 1<<(log 2_transform_skip_max_size_minus2+2). Alternatively, when the value of the log 2_transform_skip_max_size_minus2 syntax element is 2, the maximum transform skip size may be represented by 16 based on the aforementioned 1<<(log 2_transform_skip_max_size_minus2+2). Alternatively, when the value of the log 2_transform_skip_max_size_minus2 syntax element is 3, the maximum transform skip size may be represented by 32 based on the aforementioned 1<<(log 2_transform_skip_max_size_minus2+2).

For example, the fact that the maximum transform skip size is N may represent that all of the width and the height have the sizes which are smaller than or equal to N. Alternatively, the fact that the maximum transform skip size is N may represent that a larger value of the width and the height has the size which is smaller than or equal to N. Alternatively, the fact that the maximum transform skip size is N may represent that a length of one side has the size which is smaller than or equal to N in the case of a square block.

Alternatively, for example, the information about the maximum transform skip size may also be included in the high level syntax, the SPS syntax, or the PPS syntax based on the information about whether the transform skip is enabled. For example, when the information about whether the transform skip is enabled represents the information that the transform skip is enabled, the information about the maximum transform skip size may be included in the high level syntax, the SPS syntax, or the PPS syntax. Alternatively, when the information about whether the transform skip is enabled represents information that the transform skip is not enabled, the information about the maximum transform skip size may not be included in the high level syntax, the SPS syntax, or the PPS syntax either.

Alternatively, for example, the maximum transform skip size may also be represented based on the information about whether the Multiple Transform Selection (MTS) is enabled. Alternatively, the maximum transform skip size may be represented based on the information about whether the MTS is enabled and whether the TS is enabled.

For example, the high level syntax may include the information about whether the Multiple Transform Selection (MTS) is enabled or the information about whether the TS is enabled. Alternatively, the information about whether the MTS is enabled or the information about whether the TS is enabled may be included in the SPS syntax or the PPS syntax.

For example, the information about whether the MTS is enabled may be represented by the sps_mts_enabled_flag syntax element. Alternatively, the information about whether the MTS is enabled may include the sps_mts_intra_enabled_flag syntax element or the sps_mts_inter_enabled_flag syntax element. For example, the sps_mts_intra_enabled_flag syntax element or the sps_mts_inter_enabled_flag syntax element may be included in the SPS syntax based on the sps_mts_enabled_flag syntax element. The sps_mts_intra_enabled_flag syntax element may be represented by the sps_explicit_mts_intra_enabled_flag syntax element, and the sps_mts_inter_enabled_flag syntax element may be represented by the sps_explicit_mts_inter_enabled_flag syntax element. For example, the information about whether the MTS is enabled may also be represented by the MTS enabled information.

For example, when the information about whether the MTS is enabled represents information that the MTS is enabled, it may be represented that the MTS enabled=1 or the value of the sps_mts_enabled_flag syntax element is 1. Alternatively, it may be represented that the value of the sps_mts_enabled_flag syntax element is 1, and the value of the sps_explicit_mts_intra_enabled_flag syntax element or sps_explicit_mts_inter_enabled_flag syntax element is 1. Alternatively, when the information about whether the MTS is enabled represents information that the MTS is not enabled, it may be represented that the MTS enabled=0 or the value of the sps_mts_enabled_flag syntax element is 0. Alternatively, it may be represented that the value of the sps_mts_enabled_flag syntax element is 1, and the value of the sps_explicit_mts_intra_enabled_flag syntax element or the sps_explicit_mts_inter_enabled_flag syntax element is 0. For example, according to the setting, the value may also represent the information corresponding to the value inversely.

For example, the information about whether the TS is enabled may be represented by the TS enabled information or the sps_transform_skip_enabled_flag syntax element. For example, the information about whether the TS is enabled may also be represented by the TS enabled information.

For example, when the information about whether the TS is enabled represents information that the TS is enabled, it may be represented that the TS enabled=1 or the value of the sps_transform_skip_enabled_flag syntax element is 1. Alternatively, when the information about whether the TS is enabled represents information that the TS is not enabled, it may be represented that TS enabled=0 or the value of the sps_transform_skip_enabled_flag syntax element is 0. For example, according to the setting, the value may represent the information corresponding to the value inversely.

For example, the maximum transform skip size may be represented by one of candidate sizes including 8, 16, and 32 based on the high level syntax. For example, the candidate sizes may further include 4. Alternatively, for example, the transform skip size may be derived based on the information about whether the MTS is enabled. Alternatively, for example, the maximum transform skip size may be represented by one of candidate sizes including 8, 16, or 32 based on the information about whether the MTS is enabled. Alternatively, the transform skip size may be represented based on the information about whether the MTS included in the high level syntax is enabled. Alternatively, for example, the information about the transform skip size may be included in the high level syntax, and the transform skip size may be represented based on the information about the transform skip size. Here, the information about the transform skip size may also include the information about whether the MTS is enabled as the information capable of deriving the transform skip size.

For example, based on the information about whether the MTS is enabled, which represents the information that the MTS is enabled, the maximum transform skip size may be determined based on the size of the MTS. That is, when the information about whether the MTS is enabled represents the information that the MTS is enabled, the maximum transform skip size may be determined based on the size of the MTS. That is, the maximum transform skip size may be dependent on the MTS. The size of the MTS may represent the maximum size of the block in which the MTS is enabled.

For example, when the size of the MTS is 32 or less, the transform skip may also be enabled for the block having the size of 32 or less.

Alternatively, for example, based on the information about whether the MTS is enabled, which represents the information that the MTS is enabled, the maximum transform skip size may be determined as a preset size. That is, when the information about whether the MTS is enabled represents the information that the MTS is enabled, the maximum transform skip size may be determined as the preset size. For example, when the preset size is 8, the maximum transform skip size may be determined as the preset size, 8.

Alternatively, for example, based on the information about whether the MTS is enabled, which represents the information that the MTS is enabled, the high level syntax may include the information about the maximum transform skip size, and the maximum transform skip size may be represented based on the information about the maximum transform skip size. That is, when the information about whether the MTS is enabled represents the information that the MTS is enabled, the high level syntax may separately include the information about the maximum transform skip size, and the maximum transform skip size may be represented based on the information about the maximum transform skip size. Alternatively, for example, when the information about whether the MTS is enabled represents the information that the MTS is enabled, the high level syntax may include the information about whether the maximum transform skip size is represented based on the size of the MTS. When the information about whether the maximum transform skip size is represented based on the size of the MTS represents the information that the maximum transform skip size is represented based on the size of the MTS, the high level syntax may include the information about the maximum transform skip size. The information about the maximum transform skip size may be included in the SPS syntax or the PPS syntax. For example, when the information about the maximum transform skip size included in the high level syntax represents the information about 32, the maximum transform skip size may be represented by 32 based on the information about the maximum transform skip size. Alternatively, when the maximum transform skip size is determined as 32, the information about the maximum transform skip size included in the high level syntax may be represented by the information about 32.

Alternatively, for example, based on the information about whether the MTS is enabled, which represents the information that the MTS is not enabled, the maximum transform skip size may be determined as the preset size. That is, when the information about whether the MTS is enabled represents the information that the MTS is not enabled, the maximum transform skip size may be determined as the preset size. For example, when the preset size is 8, the maximum transform skip size may be determined as the preset size, 8.

Alternatively, for example, based on the information about whether the MTS is enabled, which represents the information that the MTS is not enabled, the high level syntax may include the information about the maximum transform skip size, and the maximum transform skip size may be represented based on the information about the maximum transform skip size. That is, when the information about whether the MTS is enabled represents the information that the MTS is not enabled, the high level syntax may separately include the information about the maximum transform skip size, and the maximum transform skip size may be represented based on the information about the maximum transform skip size. The information about the maximum transform skip size may be included in the SPS syntax or the PPS syntax. For example, when the information about the maximum transform skip size included in the high level syntax represents the information about 32, the maximum transform skip size may be represented by 32 based on the information about the maximum transform skip size. Alternatively, when the maximum transform skip size is determined as 32, the information about the maximum transform skip size included in the high level syntax may be represented by the information about 32.

For example, the residual related information may include the MTS index information about the transform type applied to the current block. For example, the MTS index information may be represented by the tu_mts_idx syntax element or the mts_idx syntax element. For example, the MTS index information may be included in the transform unit syntax or the coding unit syntax. For example, the MTS index information may represent the information about the transform type or the transform skip applied to the current block. Alternatively, the MTS index information may represent the information about the transform type or the transform skip applied to the current block based on the information about whether the MTS is enabled and/or the information about whether the transform skip is enabled.

For example, the information represented by the MTS index information may be represented based on the bin of the bin string on the MTS index information. Alternatively, the information represented by the MTS index information may be represented based on the value of the context index of the bin. Alternatively, the information represented by the MTS index information may be represented based on the context index value of the first bin of the bin string. For example, the context index (ctxIdx) may be represented based on the context index increment (ctxInc) and the context index offset (ctxIdxOffset).

For example, the value of the context index of the first bin for the MTS index information may be represented based on the information about whether the MTS is enabled, the information about whether the transform skip is enabled, and the size of the current block. For example, the value of the context index of the first bin for the MTS index information may be represented based on Table 19 or Table 22.

For example, based on the information about whether the MTS is enabled, which represents the information that the MTS is enabled and the information about whether the transform skip is enabled, which represents that the transform skip is enabled, the value of the context index may be represented by comparing the width of the current block with the height of the current block. That is, when the information about whether the MTS is enabled represents the information that the MTS is enabled, and the information about whether the TS is enabled represents the information that the TS is enabled, the value of the context index may be represented by comparing the width of the current block with the height of the current block. Alternatively, when the width of the current block and the height of the current block are the same, the value of the context index may be represented by 0. Alternatively, when the width of the current block is greater than the height of the current block, the value of the context index may be represented by 1, and when the width of the current block is smaller than the height of the current block, the value of the context index may be represented by 2.

Alternatively, for example, based on the information about whether the MTS is enabled, which represents the information that the MTS is enabled, and the coded quad-tree depth (cqtDepth), the value of the context index may be represented. That is, when the information about whether the MTS is enabled represents the information that the MTS is enabled, the value of the context index may be represented based on the cqtDepth. For example, the value of the context index may be represented by a value obtained by adding 1 to the value of the cqtDepth, and may be represented by 1, 2, 3, 4, 5, or 6.

Alternatively, for example, based on the information about whether the transform skip is enabled, which represents the information that the transform skip is enabled, the value of the context index may be represented by comparing the width of the current block with the height of the current block. That is, when the information about whether the TS is enabled represents the information that the TS is enabled, the value of the context index may be represented by comparing the width of the current block with the height of the current block. Alternatively, when the width of the current block and the height of the current block are the same, the value of the context index may be represented by 0. Alternatively, when the width of the current block is greater than the height of the current block, the value of the context index may be represented by 1, and when the width of the current block is smaller than the height of the current block, the value of the context index may be represented by 2.

Alternatively, for example, the value of the context index may represent the ctxInc and/or the ctxIdx based on at least one of the block size, the ratio of the width-to-height of the block, whether to perform the intra or inter prediction of the block, whether to apply the transform skip to the neighbor, or the like. Alternatively, a context model based on at least one of the block size, the ratio of the width-to-height of the block, whether to perform the intra or inter prediction of the block, whether to apply the transform skip to the neighbor, or the like may be defined, and the value of the context index may be represented based on the context model. For example, the information about the transform type or the transform skip for the current block may be obtained based on the context index or the context model.

For example, the residual related information may or may not include the transform skip flag as described above. For example, when the residual related information includes the transform skip flag, the residual samples of the current block may represent ones which are derived without the transform, and the residual signal (or residual related information) for the current block may be signaled on the pixel domain (spatial domain) without the transform. Alternatively, when the residual related information does not include the transform skip flag, the residual samples of the current block may represent ones which are transformed and derived, and the residual signal (or residual related information) for the current block may be transformed and signaled on the transform domain.

The encoding apparatus may generate a bitstream by encoding image information including all or some of the aforementioned information (or syntax elements). Alternatively, the encoding apparatus may output the encoded information in the form of the bitstream. In addition, the bitstream may be transmitted to the decoding apparatus through a network or a storage medium. Alternatively, the bitstream may be stored on a computer readable storage medium. For example, the bitstream may also be represented by image information or video information.

Figure 15:
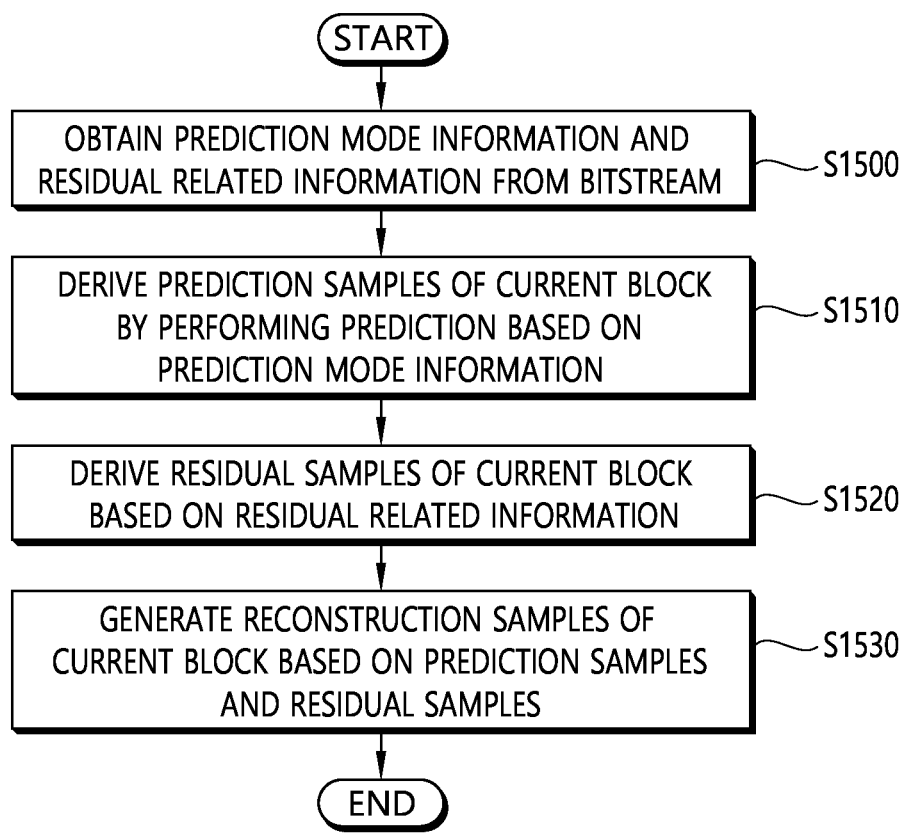
FIGS. 15 and 16 are diagrams schematically illustrating an example of the video/image decoding method and related components according to the embodiment (s) of the present document.
Figure 16:
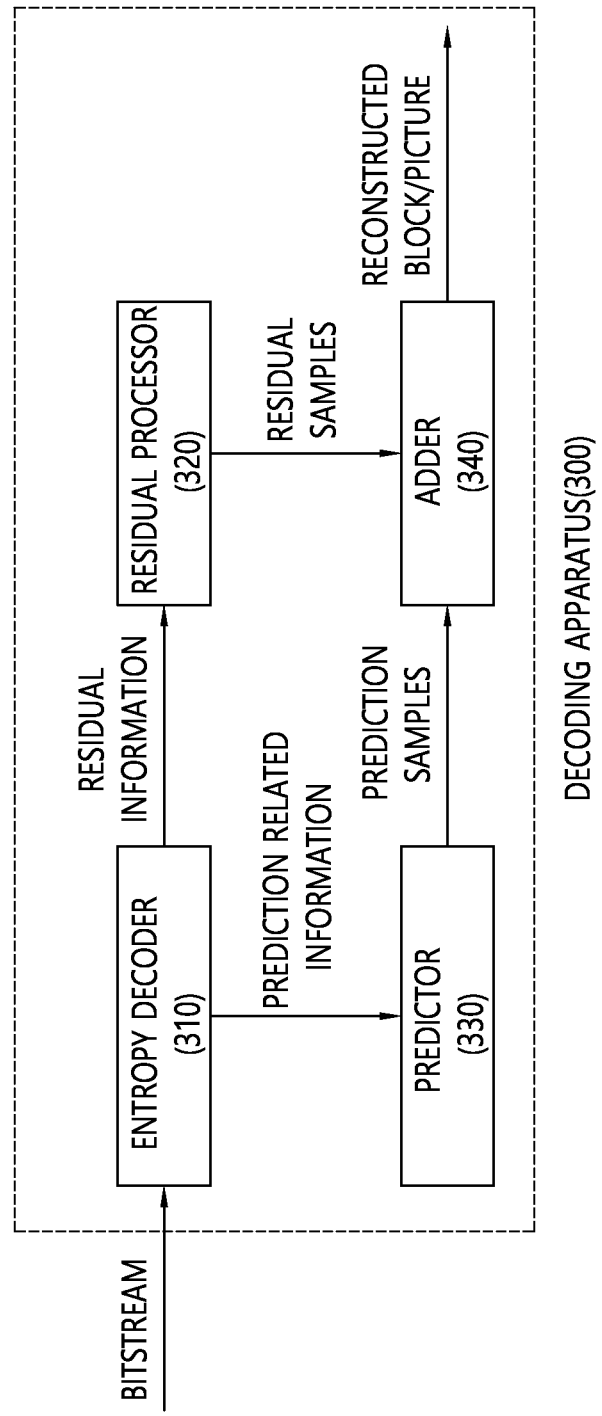

FIGS. 15 and 16 schematically illustrate an example of a video/image decoding method and related components according to an embodiment (s) of the present document.

FIGS. 15 and 16 schematically illustrate an example of a video/image decoding method and related components according to an embodiment (s) of the present document. The method disclosed in FIG. 15 may be performed by the decoding apparatus disclosed in FIG. 3. Specifically, for example, S1500 illustrated in FIG. 15 may be performed by the entropy decoder 310 of the decoding apparatus in FIG. 16, S1510 illustrated in FIG. may be performed by the predictor 330 of the decoding apparatus in FIG. 16, S1520 illustrated in FIG. 15 may be performed by the residual processor 320 of the decoding apparatus in FIG. 16, and S1530 illustrated in FIG. 15 may be performed by the adder 340 of the decoding apparatus in FIG. 16. The method disclosed in FIG. 15 may include the aforementioned embodiments in the present document.

Referring to FIG. 15, the decoding apparatus may obtain prediction mode information and residual related information from the bitstream (S1500). Alternatively, the decoding apparatus may obtain the prediction mode information or the residual related information by (entropy) decoding the bitstream.

For example, the prediction mode information may include information about the prediction mode of the current block. Alternatively, the prediction mode information may include information about the intra prediction mode or the inter prediction mode.

For example, the residual related information may include residual coding information (or residual coding syntax). Alternatively, the residual related information may include transform unit information (or transform unit syntax). Alternatively, the residual related information may also include the residual coding information and the transform unit information.

For example, the residual related information may include the transform skip flag based on the size of the current block and the maximum transform skip size. Alternatively, whether the residual related information includes a transform skip flag may be determined based on the size of the current block and the maximum transform skip size. For example, the transform skip flag may represent whether the transform skip is applied to the current block. Alternatively, the transform skip flag may be represented by a transform_skip_flag syntax element. For example, when the value of the transform_skip_flag syntax element is 0, the transform skip may be applied to the current block, and when the value of the transform_skip_flag syntax element is 1, the transform skip may not be applied to the current block. Alternatively, according to the setting, when the value of the transform_skip_flag syntax element is 1, the transform skip may be applied to the current block, and when the value of the transform_skip_flag syntax element is 0, the transform skip may not be applied to the current block.

For example, the size of the current block may represent the width of the current block and/or the height of the current block. The maximum transform skip size may represent the maximum size of the block in which the Transform Skip (TS) is enabled. Alternatively, the maximum transform skip size may also be represented by MaxTs Size. For example, when the width of the current block or the height of the current block is smaller than or equal to the maximum transform skip size, the residual related information may include the transform skip flag.

For example, the information about the maximum transform skip size may be obtained from the bitstream. Alternatively, the information about the maximum transform skip size may be obtained by (entropy) decoding the bitstream. For example, the maximum transform size may be derived based on the information about the maximum transform skip size. For example, the information about the maximum transform skip size may be included in the high level syntax, and the high level syntax may be obtained from the bitstream. Alternatively, the high level syntax may be obtained by (entropy) decoding the bitstream. For example, the high level syntax may be a Network Abstraction Layer (NAL) unit syntax, a Sequence Parameter Set (SPS) syntax, a Picture Parameter Set (PPS) syntax, or a slice header syntax.

Alternatively, for example, the information about the maximum transform skip size may be included in the SPS, and the maximum transform size may be derived based on the information about the maximum transform skip size included in the SPS. Alternatively, for example, the information about the maximum transform skip size may be included in the PPS, and the maximum transform size may be derived based on the information about the maximum transform skip size included in the PPS. Here, the SPS or the PPS may represent the SPS syntax or the PPS syntax, and other syntaxes may also be used by omitting the term syntax.

For example, the information about the maximum transform skip size may include information about a value obtained by adding −2 to a log value, and the log value may be a log value having a base 2 for the maximum transform skip size. That is, the information about the maximum transform skip size may represent the information about the value obtained by adding −2 to the log value having the base 2 of the maximum transform skip size. Alternatively, for example, the information about the maximum transform skip size may also include the information about the log value (having the base 2) of the maximum transform skip size.

For example, the information about the maximum transform skip size may include the log 2_transform_skip_max_size_minus2 syntax element. Alternatively, the information about the maximum transform skip size may represent the log 2_transform_skip_max_size_minus2 syntax element. For example, the log 2_transform_skip_max_size_minus2 syntax element may be included in the high level syntax, the SPS syntax, or the PPS syntax.

For example, referring to Table 41, the maximum transform skip size may be derived based on MaxTs Size=1<< (log 2_transform_skip_max_size_minus2+2). Here, the MaxTsSize may represent the maximum transform skip size, and the log 2_transform_skip_max_size_minus2 may represent the value of the log 2_transform_skip_max_size_minus2 syntax element. In addition, the << may represent an arithmetic shift operator. For example, the value of the log 2_transform_skip_max_size_minus2 syntax element may be represented by one of candidate values of 0 to 3, but is not limited thereto. Alternatively, the value of the log 2_transform_skip_max_size_minus2 syntax element may be derived as 0, 1, 2, or 3, but is not limited thereto.

In addition, for example, the maximum transform skip size may be derived as one of candidate sizes including 4, 8, 16, or 32. The maximum transform skip size may be derived based on the value of the log 2_transform_skip_max_size_minus2 syntax element. Alternatively, the maximum transform skip size may be derived as one of candidate sizes including 4, 8, 16, or 32 based on the value of the log 2_transform_skip_max_size_minus2 syntax element. For example, when the value of the log 2_transform_skip_max_size_minus2 syntax element is 0, the maximum transform skip size may be derived as 4 based on the aforementioned 1<<(log 2_transform_skip_max_size_minus2+2). Alternatively, when the value of the log 2_transform_skip_max_size_minus2 syntax element is 1, the maximum transform skip size may be derived as 8 based on the aforementioned 1<<(log 2_transform_skip_max_size_minus2+2). Alternatively, when the value of the log 2_transform_skip_max_size_minus2 syntax element is 2, the maximum transform skip size may be derived as 16 based on the aforementioned 1<<(log 2_transform_skip_max_size_minus2+2). Alternatively, when the value of the log 2_transform_skip_max_size_minus2 syntax element is 3, the maximum transform skip size may be derived as 32 based on the aforementioned 1<<(log 2_transform_skip_max_size_minus2+2).

For example, the fact that the maximum transform skip size is N may represent that all of the width and the height have the sizes which are smaller than or equal to N. Alternatively, the fact that the maximum transform skip size is N may represent that a larger value of the width and the height has the size which is smaller than or equal to N. Alternatively, the fact that the maximum transform skip size is N may represent that a length of one side has the size which is smaller than or equal to N in the case of a square block.

Alternatively, for example, the information about the maximum transform skip size may also be included in the high level syntax, the SPS syntax, or the PPS syntax based on the information about whether the transform skip is enabled. For example, when the information about whether the transform skip is enabled represents the information that the transform skip is enabled, the information about the maximum transform skip size may be included in the high level syntax, the SPS syntax, or the PPS syntax. Alternatively, when the information about whether the transform skip is enabled represents the information that the transform skip is not enabled, the information about the maximum transform skip size may not be included in the high level syntax, the SPS syntax, or the PPS syntax either.

Alternatively, for example, the maximum transform skip size may also be derived based on the information about whether a Multiple Transform Selection (MTS) is enabled. Alternatively, the maximum transform skip size may be derived based on the information about whether the MTS is enabled and the information about whether the TS is enabled.

For example, the high level syntax may include the information about whether the Multiple Transform Selection (MTS) is enabled or the information about whether the TS is enabled. Alternatively, the information about whether the MTS is enabled or the information about whether the TS is enabled may be included in the SPS syntax or the PPS syntax.

For example, the information about whether the MTS is enabled may be represented by the sps_mts_enabled_flag syntax element. Alternatively, the information about whether the MTS is enabled may include the sps_mts_intra_enabled_flag syntax element or the sps_mts_inter_enabled_flag syntax element. For example, the sps_mts_intra_enabled_flag syntax element or the sps_mts_inter_enabled_flag syntax element may be included in the SPS syntax based on the sps_mts_enabled_flag syntax element. The sps_mts_intra_enabled_flag syntax element may be represented by the sps_explicit_mts_intra_enabled_flag syntax element, and the sps_mts_inter_enabled_flag syntax element may be represented by the sps_explicit_mts_inter_enabled_flag syntax element. For example, the information about whether the MTS is enabled may also be represented by the MTS enabled information.

For example, when the information about whether the MTS is enabled represents the information that the MTS is enabled, it may be represented that the MTS enabled=1 or the value of the sps_mts_enabled_flag syntax element is 1. Alternatively, it may be represented that the value of the sps_mts_enabled_flag syntax element is 1, and the value of the sps_explicit_mts_intra_enabled_flag syntax element or the sps_explicit_mts_inter_enabled_flag syntax element is 1. Alternatively, when the information about whether the MTS is enabled represents the information that the MTS is not enabled, it may be represented that the MTS enabled=0 or the value of the sps_mts_enabled_flag syntax element is 0. Alternatively, it may be represented that the value of the sps_mts_enabled_flag syntax element is 1, and the value of the sps_explicit_mts_intra_enabled_flag syntax element or the sps_explicit_mts_inter_enabled_flag syntax element is 0. For example, according to the setting, the value may also represent information corresponding to the value inversely.

For example, the information about whether the TS is enabled may be represented by the TS enabled information or the sps_transform_skip_enabled_flag syntax element. For example, the information about whether the TS is enabled may also be represented by the TS enabled information.

For example, when the information about whether the TS is enabled represents the information that the TS is enabled, it may be represented that the TS enabled=1 or the value of the sps_transform_skip_enabled_flag syntax element is 1. Alternatively, when the information about whether the TS is enabled represents the information that the TS is not enabled, it may be represented that the TS enabled=0 or the value of the sps_transform_skip_enabled_flag syntax element is 0. For example, according to the setting, the value may also represent information corresponding to the value inversely.

For example, based on the information about whether the MTS is enabled, which represents the information that the MTS is enabled, the maximum transform skip size may be derived based on the size of the MTS. That is, when the information about whether the MTS is enabled represents the information that the MTS is enabled, the maximum transform skip size may be derived based on the size of the MTS. That is, the maximum transform skip size may be dependent on the MTS. The size of the MTS may represent the maximum size of the block in which the MTS is enabled. For example, when the size of the MTS is 32 or less, the transform skip may also be enabled for the block having the size of 32 or less.

Alternatively, for example, based on the information about whether the MTS is enabled, which represents the information that the MTS is enabled, the maximum transform skip size may be derived as a preset size. That is, when the information about whether the MTS is enabled represents the information that the MTS is enabled, the maximum transform skip size may be derived as the preset size. For example, when the preset size is 8, the maximum transform skip size may be derived as the preset size, 8.

Alternatively, for example, based on the information about whether the MTS is enabled, which represents the information that the MTS is enabled, the high level syntax may include the information about the maximum transform skip size, and the maximum transform skip size may be derived based on the information about the maximum transform skip size. That is, when the information about whether the MTS is enabled represents the information that the MTS is enabled, the high level syntax may separately include the information about the maximum transform skip size, and the maximum transform skip size may be derived based on the information about the maximum transform skip size. Alternatively, for example, when the information about whether the MTS is enabled represents the information that the MTS is enabled, the high level syntax may include the information about whether the maximum transform skip size is derived based on the size of the MTS. When the information about whether the maximum transform skip size is derived based on the size of the MTS represents the information that the maximum transform skip size is derived based on the size of the MTS, the high level syntax may include the information about the maximum transform skip size. The information about the maximum transform skip size may be included in the SPS syntax or the PPS syntax. For example, when the information about the maximum transform skip size included in the high level syntax represents 32, the maximum transform skip size may be derived as 32 based on the information about the maximum transform skip size.

Alternatively, for example, based on the information about whether the MTS is enabled, which represents the information that the MTS is not enabled, the maximum transform skip size may be derived as a preset size. That is, when the information about whether the MTS is enabled represents the information that the MTS is not enabled, the maximum transform skip size may be derived as the preset size. For example, when the preset size is 8, the maximum transform skip size may be derived as the preset size, 8.

Alternatively, for example, based on the information about whether the MTS is enabled, which represents the information that the MTS is not enabled, the high level syntax may include the information about the maximum transform skip size, and the maximum transform skip size may be derived based on the information about the maximum transform skip size. That is, when the information about whether the MTS is enabled represents the information that the MTS is not enabled, the high level syntax may separately include the information about the maximum transform skip size, and the maximum transform skip size may be derived based on the information about the maximum transform skip size. The information about the maximum transform skip size may be included in the SPS syntax or the PPS syntax. For example, when the information about the maximum transform skip size included in the high level syntax represents 32, the maximum transform skip size may be derived as 32 based on the information about the maximum transform skip size.

For example, the residual related information may include the MTS index information about the transform type applied to the current block. For example, the MTS index information may be represented by the tu_mts_idx syntax element or the mts_idx syntax element. For example, the MTS index information may be included in the transform unit syntax or the coding unit syntax. For example, the MTS index information may represent the information about the transform type or the transform skip applied to the current block. Alternatively, the MTS index information may represent the information about the transform type or the transform skip applied to the current block based on the information about whether the MTS is enabled and/or the information about whether the transform skip is enabled.

For example, the information represented by the MTS index information may be derived based on the bin of the bin string for the MTS index information. Alternatively, the information represented by the MTS index information may be derived based on the value of the context index of the bin. Alternatively, the information represented by the MTS index information may be derived based on the value of the context index of the first bin of the bin string. For example, the context index (ctxIdx) may be derived based on the context index increment (ctxInc) and the context index offset (ctxIdxOffset).

For example, the value of the context index of the first bin for the MTS index information may be derived based on the information about whether the MTS is enabled, the information about whether the transform skip is enabled, and the size of the current block. For example, the value of the context index of the first bin for the MTS index information may be derived based on Table 19 or Table 22.

For example, based on the information about whether the MTS is enabled, which represents the information that the MTS is enabled and the information about whether the transform skip is enabled, which represents the information that the transform skip is enabled, the value of the context index may be derived by comparing the width of the current block with the height of the current block. That is, when the information about whether the MTS is enabled represents the information that the MTS is enabled, and the information about whether the TS is enabled represents the information that the TS is enabled, the value of the context index may be derived by comparing the width of the current block with the height of the current block. Alternatively, when the width of the current block and the height of the current block are the same, the value of the context index may be derived as 0. Alternatively, when the width of the current block is greater than the height of the current block, the value of the context index may be derived as 1, and when the width of the current block is smaller than the height of the current block, the value of the context index may be derived as 2.

Alternatively, for example, the value of the context index may be derived based on the information about whether the MTS is enabled, which represents the information that the MTS is enabled, and the coded quad-tree depth (cqtDepth). That is, when the information about whether the MTS is enabled represents the information that the MTS is enabled, the value of the context index may be derived based on the cqtDepth. For example, the value of the context index may be derived as a value obtained by adding 1 to the value of the cqtDepth, and may be derived as 1, 2, 3, 4, 5, or 6.

Alternatively, for example, based on the information about whether the transform skip is enabled, which represents the information that the transform skip is enabled, the value of the context index may be derived by comparing the width of the current block with the height of the current block. That is, when the information about whether the TS is enabled represents the information that the TS is enabled, the value of the context index may be derived by comparing the width of the current block with the height of the current block. Alternatively, when the width of the current block and the height of the current block are the same, the value of the context index may be derived as 0. Alternatively, when the width of the current block is greater than the height of the current block, the value of the context index may be derived as 1, and when the width of the current block is smaller than the height of the current block, the value of the context index may be derived as 2.

Alternatively, for example, the value of the context index may determine the ctxInc and/or the ctxIdx based on at least one of the block size, the ratio of the width-to-height of the block, whether to perform the intra or inter prediction of the block, whether to apply the transform skip to the neighbor, or the like. Alternatively, a context model based on at least one of the block size, the ratio of the width-to-height of the block, whether to perform the intra or inter prediction of the block, whether to apply the transform skip to the neighbor, or the like may be defined, and the value of the context index may be derived based on the context model. For example, the information about the transform type or the transform skip for the current block may be obtained based on the context index or the context model.

The decoding apparatus may derive prediction samples of the current block by performing prediction based on the prediction mode information (S1510). For example, the decoding apparatus may derive a prediction mode of the current block based on the prediction mode information. For example, the prediction mode information may include information about the intra prediction mode or information about the inter prediction mode, and the prediction mode of the current block may be derived as the intra prediction mode or the inter prediction mode based on the information.

For example, the decoding apparatus may derive the prediction samples of the current block based on the prediction mode. For example, when the prediction mode is the intra prediction mode, the decoding apparatus may derive the prediction samples based on samples around the current block. Alternatively, when the prediction mode is the inter prediction mode, the decoding apparatus may derive the prediction samples based on reference samples within a reference picture of the current block.

The decoding apparatus may derive residual samples of the current block based on the residual related information (S1520). For example, the residual related information may include information about a transform coefficient for the residual samples. Alternatively, the residual related information may also include the transform skip flag.

For example, when the residual related information includes the transform skip flag, the residual signal (or residual related information) for the current block may be signaled on the pixel domain (spatial domain) without the transform. Alternatively, when the residual related information does not include the transform skip flag, the residual signal (or residual related information) for the current block may be transformed and signaled on the transform domain. For example, the decoding apparatus may derive the residual samples based on the residual signal which is not transformed or transformed and signaled.

The decoding apparatus may generate reconstruction samples of the current block based on the prediction samples and the residual samples (S1530). Alternatively, the decoding apparatus may derive a reconstructed block or a reconstructed picture based on the reconstruction samples. As described above, the decoding apparatus may later apply an in-loop filtering procedure such as a deblocking filtering and/or a SAO procedure to the reconstructed picture in order to improve subjective/objective image quality, if necessary.

The decoding apparatus may obtain image information including all or some of the aforementioned information (or syntax elements) by decoding the bitstream. In addition, the bitstream may be stored in a computer readable digital storage medium, and may cause the aforementioned decoding method to be performed. For example, the bitstream may also be represented by image information or video information.

In the aforementioned embodiments, while the methods are described based on the flowcharts as a series of steps or blocks, the present document is not limited to the order of steps, and a certain step may occur in different order from or simultaneously with a step different from that described above. In addition, those skilled in the art will understand that the steps shown in the flowchart are not exclusive and other steps may be included or one or more steps in the flowcharts may be deleted without affecting the scope of the present document.

The aforementioned method according to the present document may be implemented in the form of software, and the encoding apparatus and/or the decoding apparatus according to the present document may be included in the apparatus for performing image processing of, for example, a TV, a computer, a smartphone, a set-top box, a display device, and the like.

When the embodiments in the present document are implemented in software, the aforementioned method may be implemented as a module (process, function, and the like) for performing the above-described function. The module may be stored in a memory and executed by a processor. The memory may be located inside or outside the processor, and may be coupled with the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium and/or other storage devices.

Figure 17:
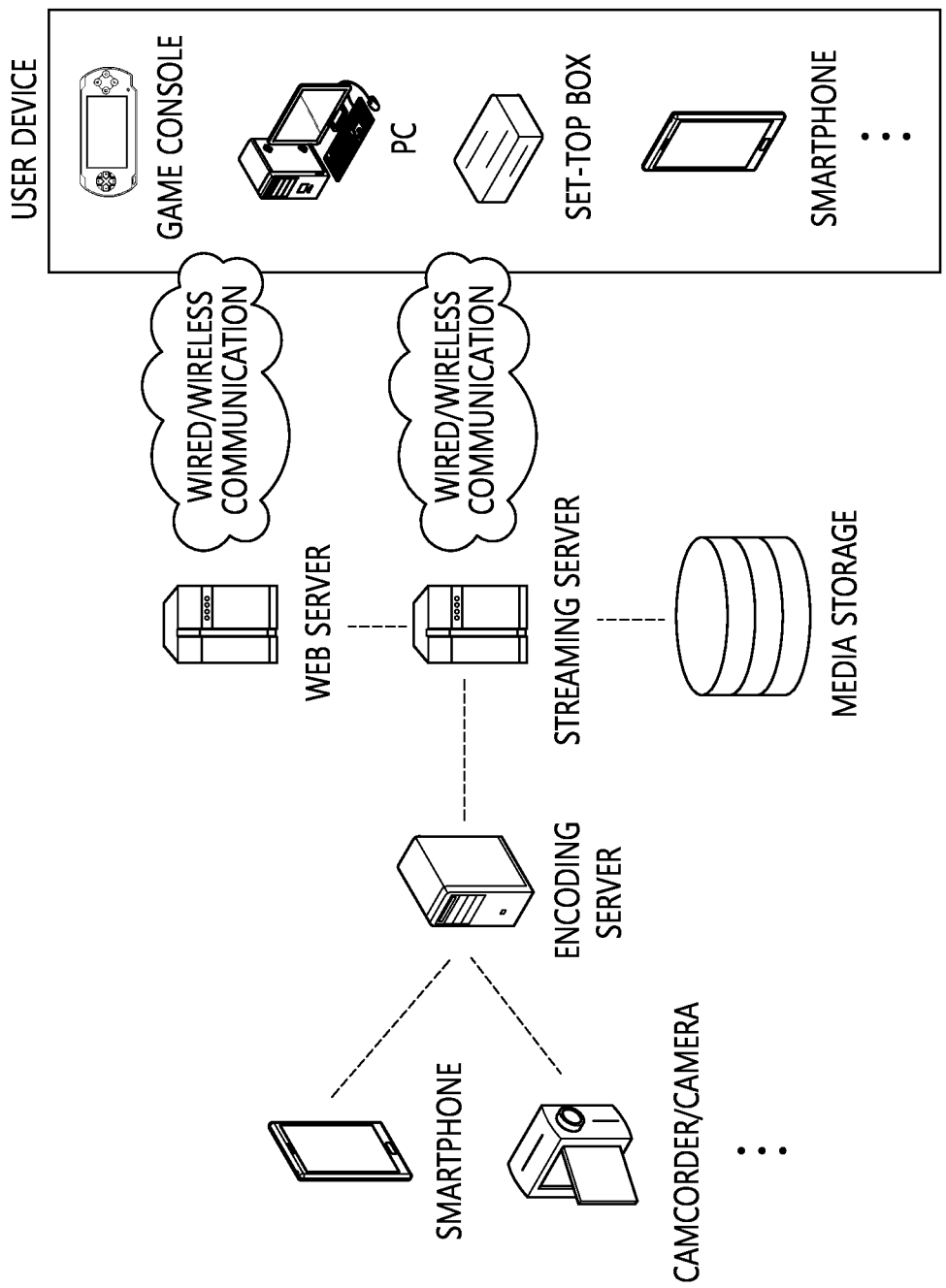
FIG. 17 is a diagram schematically illustrating a contents streaming system structure.

FIG. 17 schematically illustrates a structure of a contents streaming system.

That is, the embodiments described in the present document may be performed by being implemented on a processor, a microprocessor, a controller, or a chip. For example, the functional units illustrated in each drawing may be performed by being implemented on the computer, the processor, the microprocessor, the controller, or the chip.

In addition, the decoding apparatus and the encoding apparatus to which the present document is applied may be included in a multimedia broadcast transceiver, a mobile communication terminal, a home cinema video device, a digital cinema video device, a surveillance camera, a video communication device, a real-time communication device such as video communication, a mobile streaming device, a storage medium, a camcorder, a Video on Demand (VoD) service provider, an Over the top video (OTT video) device, an Internet streaming service provider, a three-dimensional (3D) video device, a video telephony video device, and a medical video device, and the like, and may be used to process video signals or data signals. For example, the Over the top video (OTT video) device may include a game console, a Blu-ray player, an Internet-connected TV, a home theater system, a smartphone, a tablet PC, a Digital Video Recorder (DVR), and the like.

In addition, the processing method to which the present document is applied may be produced in the form of a program executed by a computer, and may be stored in a computer readable recording medium. The multimedia data having a data structure according to the present document may also be stored in the computer readable recording medium. The computer readable recording medium includes all kinds of storage devices and distributed storage devices in which computer readable data are stored. The computer readable recording medium includes, for example, a Blu-ray Disc (BD), a Universal Serial Bus (USB), a ROM, a PROM, an EPROM, an EEPROM, a RAM, a CD-ROM, a magnetic tape, a floppy disk, and an optical data storage device. In addition, the computer readable recording medium includes media implemented in the form of a carrier wave (for example, transmission via the Internet). In addition, the bitstream generated by the encoding method may be stored in the computer readable recording medium or transmitted through wired/wireless communication networks. In addition, the embodiments of the present document may be implemented as a computer program product by a program code, and the program code may be executed on the computer according to the embodiments of the present document. The program code may be stored on a computer readable carrier by the computer.

In addition, the contents streaming system to which the present document is applied may largely include an encoding server, a streaming server, a web server, a media storage, a user device, and a multimedia input device.

The encoding server serves to compact the contents, which are input from multimedia input devices such as a smartphone, a camera, and a camcorder into digital data, to generate the bitstream and to transmit the bitstream to the streaming server. As another example, when the multimedia input devices such as a smartphone, a camera, and a camcorder directly generate the bitstream, the encoding server may be omitted. The bitstream may be generated by the encoding method or the bitstream generating method to which the present document is applied, and the streaming server may temporarily store the bitstream in the process of transmitting or receiving the bitstream.

The streaming server performs the role of transmitting multimedia data to a user device based on a user request through a web server, and the web server performs the role of informing the user of which services are available. If the user requests a desired service from the web server, the web server transmits the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or encoding server. For example, if contents are received from the encoding server, the contents may be received in real-time. In this case, to provide a smooth streaming service, the streaming server may store the bitstream for a predetermined time period.

Examples of the user device may include a mobile phone, smartphone, laptop computer, digital broadcast terminal, personal digital assistant (PDA), portable multimedia player (PMP), navigation terminal, slate PC, tablet PC, ultrabook, wearable device (for example, a smart watch or a smart glass), digital TV, desktop computer, and digital signage. Each individual server within the contents streaming system may be operated as a distributed server, and in this case, data received by each server may be processed in a distributed manner.

What is claimed is:

1. A method for decoding an image performed by a decoding apparatus, the method comprising:
   obtaining prediction mode information and residual related information from a bitstream;
   deriving prediction samples of a current block by performing prediction based on the prediction mode information;
   deriving residual samples of the current block based on the residual related information; and
   generating reconstruction samples of the current block based on the prediction samples and the residual samples,
   wherein the residual related information comprises a transform skip flag based on a size of the current block and a maximum transform skip size,
   wherein the transform skip flag represents whether a transform skip is applied to the current block,
   wherein information about the maximum transform skip size is obtained from the bitstream,
   wherein the information about the maximum transform skip size is comprised in one of a picture parameter set or a sequence parameter set,
   wherein one of the picture parameter set or the sequence parameter set comprises a transform skip enabled flag related to whether the transform skip is enabled or not, and
   wherein the information about the maximum transform skip size is comprised in one of the picture parameter set or the sequence parameter set based on a value of the transform skip flag being equal to 1.

2. The method of claim 1,
   wherein the information about the maximum transform skip size includes a log 2 transform skip max size minus2 syntax element,
   wherein the maximum transform skip size is derived based on the following equation, $$\text{MaxTsSize}=1<<(\text{log\_2transform\_skip\_max\_size\_minus2}+2)$$

where the MaxTsSize represents the maximum transform skip size, and the log 2 transform skip max size minus2 represents a value of the log 2 transform skip max size minus2 syntax element.

3. The method of claim 2, wherein the value of the log 2 transformskipmaxsize minus2 syntax element is represented by one of candidate values of 0 to 3.

4. The method of claim 1, wherein the maximum transform skip size is derived as one of candidate sizes comprising 4, 8, 16, or 32.

5. A non-transitory computer-readable medium storing instructions that, when executed, cause a decoding apparatus to perform operations comprising:
   obtaining prediction mode information and residual related information from a bitstream;
   deriving prediction samples of a current block by performing prediction based on the prediction mode information; deriving residual samples of the current block based on the residual related information; and
   generating reconstruction samples of the current block based on the prediction samples and the residual samples, wherein the residual related information comprises a transform skip flag based on a size of the current block and a maximum transform skip size,
   wherein the transform skip flag represents whether a transform skip is applied to the current block,
   wherein the information about the maximum transform skip size is comprised in one of a picture parameter set or a sequence parameter set, and
   wherein one of the picture parameter set or the sequence parameter set comprises a transform skip enabled flag related to whether the transform skip is enabled or not, and
   wherein the information about the maximum transform skip size is comprised in one of the picture parameter set or the sequence parameter set based on a value of the transform skip flag being equal to 1.

6. The non-transitory computer-readable medium of claim 5,
   wherein the information about the maximum transform skip size includes a log 2 transform skip max size minus2 syntax element,
   wherein the maximum transform skip size is derived based on the following equation, $$\text{MaxTsSize}=1<<(\text{log 2\_transform\_skip\_max\_size\_minus2}+2)$$

where the MaxTsSize represents the maximum transform skip size, and the log 2 transform skip max size minus2 represents a value of the log 2 transform skip max size minus2 syntax element.

7. The non-transitory computer-readable medium of claim 6, wherein the value of the log 2 transformskipmaxsize minus2 syntax element is represented by one of candidate values of 0 to 3.

8. The non-transitory computer-readable medium of claim 5, wherein the maximum transform skip size is derived as one of candidate sizes comprising 4, 8, 16, or 32.

9. A decoding apparatus, comprising a memory storing instructions that, when executed, cause one or more processors to perform operations comprising:
obtaining prediction mode information and residual related information from a bitstream;
deriving prediction samples of a current block by performing prediction based on the prediction mode information; deriving residual samples of the current block based on the residual related information; and
generating reconstruction samples of the current block based on the prediction samples and the residual samples, wherein the residual related information comprises a transform skip flag based on a size of the current block and a maximum transform skip size,
wherein the transform skip flag represents whether a transform skip is applied to the current block,
wherein the information about the maximum transform skip size is comprised in one of a picture parameter set or a sequence parameter set,
wherein one of the picture parameter set or the sequence parameter set comprises a transform skip enabled flag related to whether the transform skip is enabled or not, and
wherein the information about the maximum transform skip size is comprised in one of the picture parameter set or the sequence parameter set based on a value of the transform skip flag being equal to 1.

10. The decoding apparatus of claim 9,
wherein the information about the maximum transform skip size includes a log 2 transform skip max size minus2 syntax element,
wherein the maximum transform skip size is derived based on the following equation, $$\text{MaxTsSize} = 1 << (\log 2\_transform\_skip\_max\_size\_minus2 + 2)$$

where the MaxTsSize represents the maximum transform skip size, and the log 2 transform skip max size minus2 represents a value of the log 2 transform skip max size minus2 syntax element.

11. The decoding apparatus of claim 10, wherein the value of the log 2 transformskipmaxsize minus2 syntax element is represented by one of candidate values of 0 to 3.

12. The decoding apparatus of claim 9, wherein the maximum transform skip size is derived as one of candidate sizes comprising 4, 8, 16, or 32.

* * * * *